(12) United States Patent
Glommen et al.

(10) Patent No.: US 9,753,898 B1
(45) Date of Patent: Sep. 5, 2017

(54) DEPLOYABLE TAG MANAGEMENT IN COMPUTER DATA NETWORKS

(71) Applicant: Tealium Inc., San Diego, CA (US)

(72) Inventors: Charles Glommen, Oceanside, CA (US); Larry Xu, San Diego, CA (US); Beaucfus Jeremiah Burrier, San Diego, CA (US)

(73) Assignee: TEALIUM INC., San Diego, CA (US)

( * ) Notice: Subject to any disclaimer, the term of this patent is extended or adjusted under 35 U.S.C. 154(b) by 0 days.

(21) Appl. No.: 15/585,037

(22) Filed: May 2, 2017

Related U.S. Application Data

(60) Provisional application No. 62/330,719, filed on May 2, 2016.

(51) Int. Cl.
| | |
|---|---|
| *G06F 17/21* | (2006.01) |
| *G06F 17/30* | (2006.01) |
| *G06F 17/24* | (2006.01) |
| *G06F 3/0484* | (2013.01) |
| *H04L 29/08* | (2006.01) |

(52) U.S. Cl.
CPC .......... *G06F 17/218* (2013.01); *G06F 3/0484* (2013.01); *G06F 17/248* (2013.01); *G06F 17/3089* (2013.01); *H04L 67/22* (2013.01); *H04L 67/02* (2013.01)

(58) Field of Classification Search
CPC .... G06F 17/218; G06F 17/248; G06F 3/0484; G06F 17/3089; H04L 67/22; H04L 67/02
See application file for complete search history.

(56) References Cited

U.S. PATENT DOCUMENTS

| | | |
|---|---|---|
| 8,805,946 B1 | 8/2014 | Glommen et al. |
| 8,843,827 B2 | 9/2014 | Koo et al. |
| 8,904,278 B1 | 12/2014 | Anderson et al. |
| 8,990,298 B1 | 3/2015 | Anderson |
| 9,081,789 B2 | 7/2015 | Anderson |
| 9,116,608 B2 | 8/2015 | Koo et al. |
| 9,313,287 B2 | 4/2016 | Glommen et al. |
| 9,357,023 B2 | 5/2016 | Glommen et al. |
| 9,363,311 B1 | 6/2016 | McWilliams et al. |
| 9,479,609 B2 | 10/2016 | Anderson |
| 9,537,964 B2 | 1/2017 | Glommen et al. |
| 9,635,100 B2 | 4/2017 | McWilliams et al. |

(Continued)

OTHER PUBLICATIONS

U.S. Appl. No. 15/494,355, Delivery of Instructions in Host Applications, filed Apr. 21, 2017.

(Continued)

*Primary Examiner* — John B Walsh
(74) *Attorney, Agent, or Firm* — Knobbe, Martens, Olson & Bear LLP

(57) ABSTRACT

A tag management system in a computer data network can be used to manage one or more tag configurations with templates. A template may enable efficient tag configuration by causing presentation of an improved user interface that facilitates user-specified mappings between a custom content site and predefined tag management attributes. By completing a template, which may depend on other templates or have templates that depend on it, the tag management system can automatically deploy complex tag management configurations to track end user interactions over a data network.

20 Claims, 57 Drawing Sheets

(56) References Cited

U.S. PATENT DOCUMENTS

| | | |
|---|---|---|
| 2014/0282036 A1* | 9/2014 | Shottan et al. ....... G06F 3/0484 715/738 |
| 2015/0066587 A1 | 3/2015 | Glommen |
| 2015/0169784 A1 | 6/2015 | Anderson |
| 2015/0212992 A1 | 7/2015 | Anderson et al. |
| 2016/0381122 A1 | 12/2016 | Glommen et al. |
| 2017/0041426 A1 | 2/2017 | Anderson |

OTHER PUBLICATIONS

U.S. Appl. No. 15/394,469, System and Method for Separating Content Site Visitor Profiles, filed Dec. 29, 2016.

* cited by examiner

Starter Pack - Base
5 Steps | This play is to identify your base data source definitions.

This play requires the following components:

This play generates:
- Customer Phone
- Page Category - Visit
- Last Visit - Days Since
- Page Sub Category
- Customer City
- Customer ID
- Event Name
- Customer Postal Code
- Converted - Visitor
- PDP Pageviews - Visitor Next
Close

FIG. 25B

Identify Your Page Variables

This question is to identify your page variables

Page Name : [ ⚡ page name ▾ ]
Site Section : [ ⚡ site_section ▾ ]
Page Type : [ ⚡ page type ▾ ]
Page Category : [ ⚡ site_category ▾ ]
Page Sub Category : [ ⚡ page_subcategory ▾ ]

[Previous] [Close] [Next ▸]

FIG. 25C

Identify Your Page Types

This question is to identify your page types

Home Page : [⚡ page_type] = [eg. home]   Category Page : [⚡ page_type] = [eg. category]

Product Page : [⚡ page_type] = [eg. product]

Confirmation Page : [⚡ page_type] = [eg. confirmation]

Account Page : [⚡ page_type] = [eg. account]

FIG. 25D

How do you identify your customers?

This question is to identify your page customers

Customer ID : [customer_id ▾]   Customer Email Address :
[customer_email ▾]   Customer Loyalty ID : [customer_loyalty_id ▾]
Customer Type : [customer_type ▾]   Customer City : [customer_city ▾]
Customer State : [customer_state ▾]   Customer County :
[customer_country ▾]   Customer Postal Code : [customer_postal_code ▾]
Customer Phone : [customer_phone ▾]

2500

◂ Previous    Close    Next ▸

FIG. 25E

Identify your event variables

This question is to identify your events

Event Name : [event_name ▾]
Event Target : [event_target ▾]

Event Category : [event_category ▾]
Event Type : [event_type ▾]

Next ▸
Close
◂ Previous

Identify your event names

Email Signup : ⚡ event_name =

Link Clink : ⚡ event_name

User Login : ⚡ event_name =

User Register : ⚡ event_name =

User Logout : ⚡ event_name

User Update : ⚡ event_name = eg. file download

File Download : ⚡ event_name =

Video Play : ⚡ event_name = eg. video_play

Next ▸

Close

◂ Previous

How will we identify product and order dimensions?

Please identify using the table below

| | |
|---|---|
| Product ID | ▼ _cprod |
| Product Category | ▼ _ccat |
| Order ID | ▼ _corder |
| Order Total | ▼ _ctotal |
| Order Customer ID | ▼ _ccustid |

◀ Previous Close  Next

FIG. 27C

How will we identify product and order dimensions?

Please identify using the table below

Product ID ..........
Product Category ..........
Order ID ..........
Order Total ..........
Order Customer ID ..........

2708

_cprod ▶

Tealium iQ Data Sources
- _as_ttl_
- _bf_page_name
- _bf_page_name
- _dc_ttl_
- _domain Previous    Close    Next

Let's review play: Set up Back End Data Layer

1. How will we identify product and order dimensions?

- Product ID [p_id]
- Product Category [_cat]
- Order ID [purch_id]
- Order Total [_total]
- Order Customer ID [cust_visitor_id]

FIG. 27F

Let's review play: Window Shopper

1. How will we know when a visitor has viewed a product?
   Window Shopper Choice : [Product Page Visited]

2. How will we identify visitors that have viewed an item?
   Assign visitors the [Window Shopper] Badge.

◀ Previous

Close    Complete Play ❯

FIG. 27L

TEMPLATE ATTRIBUTE

3000 —

```
{
"id": "bfd4d00e-1d3b-4d62-a806-491f81768882",
"account": "tealium",
"profile": "main",
"title": "VIP Badge",
"titleCustomValue": "",
"description": "",
"type": "badge",
"context": "VISITOR",
"defaultValue": "",
"placeholderText": "",
"autoCreateAvailable": true,
"icon": "pictonic icon-cur-usd",
"color": "green",
"favoriteTrait": "asdf",
"favoriteOf": "asdf",
"allowMultipleChoice": true,
"version": 1,
"revision": 1452703220123,
"publishStatus": "PUBLISHED",
"hasActivePublish": true,
"majorChange": false,
"modifiedBy": "...."
}
```

TEMPLATE OPERATOR

3050 —

```
{
"id": "a63e2e86-eb9b-4471-ba46-e2353efa4e12",
"account": "tealium",
"profile": "main",
"title": "test operator",
"available": [
  "equals_ignore_case",
  "contains_ignore_case"
],
"version": 1,
"revision": 1452703220123,
"publishStatus": "PUBLISHED",
"hasActivePublish": true,
"majorChange": false,
"modifiedBy": "...."
}
```

FIG. 30

TEMPLATE RULE

3100

```
{
"id": "fd2f3db8-2e58-4b11-b025-ca892ec19275",
"account": "tealium",
"profile": "main",
"title": "test rule",
"titleCustomValue": "",
"description": "",
"display": false,         3102
"conditions": [
    {
    "type": "logicalOperator",         2920
    "logicalOperator": "AND",
    "selectors": [
        {
        "type": "querySelector",
        "operand1": {
            "status": "playbooks_attribute_reference",
            "reference": "event_name"
        },
        "operand2": {
            "status": "playbooks_attribute_reference",
            "reference": "334fa162-5f85-45aa-a450-688e809eb8cf"
        },
        "operator": {
            "value": "contains"
        },
        "caseSensitive": true,
        "dateUnit": "days"
        }
    ]
    }
],
"version": 1,
"revision": 1452703220123,
"publishStatus": "PUBLISHED",
"hasActivePublish": true,
"majorChange": false,
"modifiedBy": "..."
}
```

TEMPLATE TRANSFORMATION

3150

```
{
"id": "4431a496-dde1-40b2-af0f-d1def043ff14",
"account": "tealium",
"profile": "main",
"title": "shopper trait",
"description": "",
"trigger": "complete_visit",
"type": "6",        3152
"rules": [
    "fd2f3db8-2e58-4b11-b025-ca892ec19275"
],
"params": {
    "target": "53ab5740-3482-4b74-b907-ad59949e5df6",
    "propertyValue": {
        "isCustom": false,
        "isPreloaded": false,
        "value": "245508b0-7568-4172-84d8-e7ce9014b930"
    }
},
"version": 1,
"revision": 1452703220123,
"publishStatus": "PUBLISHED",
"hasActivePublish": true,
"majorChange": false,
"modifiedBy": "..."
}
```

FIG. 31

TEMPLATE AUDIENCE

3200

```
{
  "id": "ed6f3de8-2f58-ba12-a325-a8c92fc19265",
  "account": "tealium",
  "profile": "main",
  "title": "test audience",
  "titleCustomValue": "",
  "description": "",
  "conditions": [
    {
      "type": "logicalOperator",
      "logicalOperator": "AND",
      "selectors": [
        {
          "type": "querySelector",
          "operand1": {
            "status": "playbooks_attribute_reference",
            "reference": "event_name"
          },
          "operand2": {
            "status": "playbooks_attribute_reference",
            "reference": "334fa162-5f85-45aa-a450-688e809eb8cf"
          },
          "operator": {
            "value": "contains"
          }
        }
      ]
    }
  ],
  "version": 1,
  "revision": 1452703220123,
  "publishStatus": "PUBLISHED",
  "hasActivePublish": true,
  "majorChange": false,
  "modifiedBy": "..."
}
```

TEMPLATE COLLECTION

3250

```
{
  "_id": "",
  "account": "tealium",
  "profile": "main",
  "modifiedBy": "user@tealium.com",
  "modifiedAt": 134623534, // epoch date
  "isPublish": true,
  "releaseNotes": "",
  "components": {
    "1423512345": 123512345423, // component id and the revision
    "263457263": 83475384574,
    ...
  },
  "plays": {
    "739347568": 182556789334, // play id and the revision
    "834579233": 185043927783,
    ...
  }
}
```

FIG. 32

DEPLOYABLE TAG MANAGEMENT IN COMPUTER DATA NETWORKS

COPYRIGHT NOTICE

A portion of the disclosure of this patent document contains material which is subject to copyright protection. The copyright owner understands that the patent document or the patent disclosure, as it appears in the Patent and Trademark Office patent file or records, may be used in the ordinary course of business or transactions with the Patent and Trademark Office, but hereby reserves all copyright rights whatsoever.

RELATED APPLICATIONS

Any and all applications for which a foreign or domestic priority claim is identified in the Application Data Sheet as filed with the present application are hereby incorporated by reference under 37 CFR 1.57.

BACKGROUND

Some operators of content sites, such as websites, can obtain the results of analytics performed with regard to user interactions on their content sites. User analytics can include any type of data regarding interactions of end users with content sites, among other types of data. There are different approaches to gathering analytics data, one of which includes employing the use of tags.

Tags can include small pieces of website code that allow a website operator to measure traffic and visitor. Adding tags to a content site has typically required involving a developer to manually insert tag code into one or more pages of a website.

BRIEF DESCRIPTION OF THE DRAWINGS

Throughout the drawings, reference numbers are re-used to indicate correspondence between referenced elements. The drawings are provided to illustrate embodiments of the features described herein and not to limit the scope thereof.

FIGS. 5-7, 8A, 8B, 9-17, 18A, 18B, and 19-24 depict example tag management configuration-related user interfaces.

FIGS. 25A, 25B, 25C, 25D, 25E, 25F, 25G, 25H, and 25I depict example user interfaces corresponding to a template implementation process.

FIGS. 26A, 26B, and 26C depict example user interfaces following implementation of one or more templates.

FIGS. 27A, 27B, 27C, 27D, 27E, 27F, 27G, 27H, 27I, 27J, 27K, 27L, and 27M depict example user interfaces corresponding to another template implementation process.

FIG. 30 depicts an example template attribute and an example template operator.

FIG. 31 depicts an example template transformation and an example template rule.

FIG. 32 depicts an example template audience and an example template collection.

DETAILED DESCRIPTION

I. Tag Management Introduction

Figure 1:
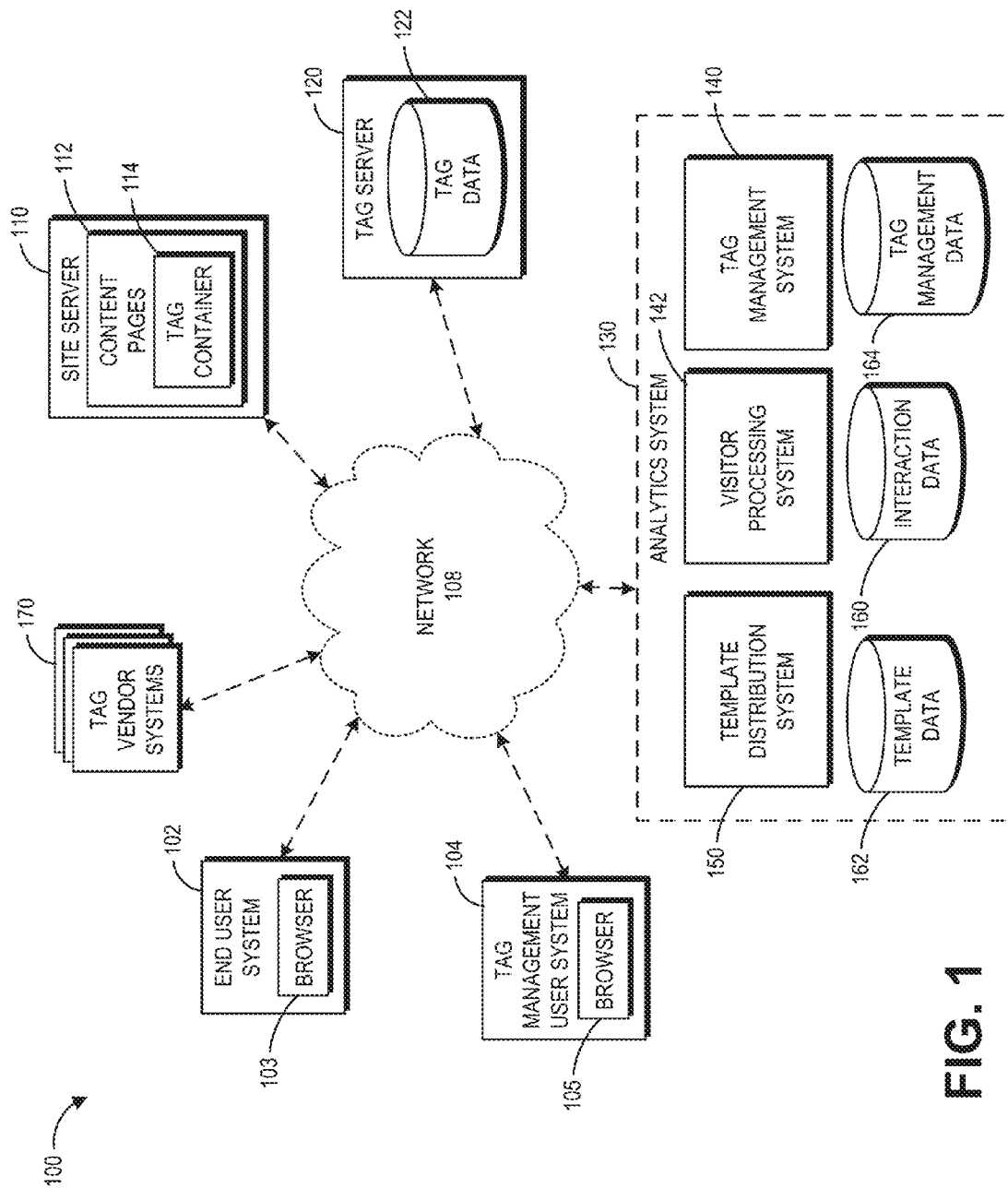
FIG. 1 depicts an embodiment of a computing environment that provides access to an analytics system including a template distribution system, a visitor processing system, or a tag management system.

Tag management systems can be used to configure tags of a content site or to manage those tags. In one embodiment, a tag management system can deploy a single tag or a tag container to a content site or network pages of a content site. Each page or any subset of web pages in the content site can incorporate the tag container as a universal tag that can be used to gather any type of end user interaction. This tag container can be used to interface with any number of third party vendor tags without requiring, in certain embodiments, such tags to be coded expressly in the code of the web pages of the content site. Thus, changes to the tagging of a content site may be made through a user interface provided by the tag management system without having to use a developer to add the tags to the web pages manually. Despite the efficacy of a tag management system for configuration users without IT or programming knowledge, it may be advantageous to further automate the deployment of complex tag management configurations.

II. Tag Management Templates

The present disclosure describes embodiments, systems, methods, and non-transitory computer readable media that can address the complexities of tag management configuration. For example, there may be general tag management patterns that are usable across multiple different content sites to perform various functions such as tracking end user interactions. However, the implementation of such patterns may require the configuration of many tag management attributes or instructions that may be difficult or time consuming to configure, or the configuration user may not be aware of such patterns. While a tag management pattern may be applicable to multiple content sites, each content site may require custom configuration due to content site differences such as differences in uniform resource identifier patterns or variables or parameters of those uniform resource identifier patterns. Accordingly, a template object may include the instructions to perform the tag management configuration. A template object may also include one or more prompts configured to be presented to a configuration user. A tag management system may use the user input responses to the prompts and the template object to generate output that configures the tag management system. A tag distribution system may also control the distribution, version control, or access to template objects to configuration users or accounts.

In some embodiments, an advantage of the systems and techniques described herein can include more efficient tag management configuration through templates. For example, the template objects may be configured or curated with one or more dependencies. In the example, a first template object may include many base configurations that facilitate near completion or completion of second template objects. Additionally or alternatively to the ability of template objects to receive configuration user input, the template objects may include conditional instructions or may allow the configuration user to provide conditional instructions. Thus, instead of a configuration user needing months or years to learn effective tag management patterns, those effective patterns can be embedded within the template objects. Accordingly, as opposed to lower level configurations that may be difficult for configuration users to set up, understand, or explore, a template object may be a higher level data container that configuration users can explore, add, remove, or update within the tag management system.

The systems and techniques described herein may be intrinsically tied to network and/or computer technology because such solutions are related to tags and the tag management of network content sites such as websites. For example, the tag management deployment techniques described herein may configure a tag management system to analyze captured network data. Example network data includes HTTP data and uniform resource identifier data (such as uniform resource locators ("URLs")) that are intrinsically tied to computer technology.

The systems and techniques described herein may improve computer technology. For example, as described herein, a tag management implementation may require the configuration of many tag management attributes or instructions that may be difficult or time consuming to configure, or the configuration user may unable to complete the configuration properly. The template objects may contain rules that automatically configure a tag management system. Accordingly, the systems and techniques described herein may enable rapid deployment or configuration of a tag management system through the use of template objects. Further, the implementation of template objects may deploy tag management configurations in a predetermined or memory-efficient manner, which reduces superfluous or redundant manual configurations, such as those that may arise from human error, thereby reducing memory requirements. Further, the template objects may be viewable in an improved graphical user interface. Accordingly, an improved graphical user interface may enable faster setup times of configurations. The improved graphical user interfaces may also enable improvement in user search times of tag management configurations since an example template object represents a logical grouping of configurations that would otherwise be difficult for a configuration user to search or review without the user-friendly logical grouping.

As used herein, in addition to having its ordinary meaning, a "template object" refers to a data object associated with the configuration of the tag management system. The template object may configure user interfaces of the tag management system to present prompts and receive user input from a configuration user. A template object may include components. Example components include attributes, rules, transformations, instructions, operators, or audiences, as described herein. Rules, transformations, or audiences may include instruction sets. The completion of an implementation process associated with the template object may output attributes, an audience, or an action connector, as described herein. A tag management object may be generated by the completion of the template process. A tag management object may correspond to the inputs and outputs of a completed template object. The tag management system may also generate visualizations corresponding to the implemented templates. For example, the visualizations may report on the performance of an implemented template. Template objects may be curated by administrators or analysts that have the appropriate knowledge to configure such objects. The terms "template," "template object," and "play" may be used interchangeably in the present disclosure. As used herein, "workflow" may refer to the process of presenting user interfaces associated with a template object or the implementation of a template object.

As used herein, in addition to having its ordinary meaning, an "audience" may refer to a collection of end user such as a specific group of end users or visitor attributes. Audiences may be useful because the collection of end users may be targeted in some way. Audiences that are generated from a template can be acted on via action connectors.

As used herein, in addition to having its ordinary meaning, an "action connector" may refer to an integration between the tag management system and a third-party vendor. An example action connector includes a recipient such as a vendor. The example action connector may specify sending audience data or other interaction data to the recipient. A template that generates connectors will setup appropriate actions that may be configured with the data that can be sent to the vendor including an audience that the connector may be targeting. The terms "action connector" and "connector" may be used interchangeably in the present disclosure.

As used herein, in addition to having its ordinary meaning, an "end user" may refer to a user of a content site. The terms "end user" and "visitor" may be used interchangeably in the present disclosure. As used herein, in addition to having its ordinary meaning, a "configuration user" may refer to a user of the tag management system. The terms "configuration user," "analytics user," and "tag management user" may be used interchangeably in the present disclosure.

III. Example Tag Management Template System Processes

FIG. 1 illustrates a computing environment 100 for implementing various tag features, including some or all of the tag management features or end user processing features described herein. In the computing environment 100, an end user system 102 communicates over a network 108 with a site server 110. The end user system 102 can include any form of computing device and may be a desktop, laptop, smartphone, tablet, or the like. A browser 103 or other application software installed in the end user system 102 accesses one or more content pages of a content site stored in content pages storage 112 of the site server 110. The content pages can be files that may be accessed remotely and provided to the end user system 102. Accordingly, the content pages may be web pages, documents (such as pdf documents), videos, images, text, combinations of the same, or the like. The site server 110 may be a web server, an application server, a database server, combinations of the same, or the like. Further, the network 108 can include a local area network (LAN), a wide area network (WAN), a company intranet, the public Internet, combinations of the same, or the like.

As shown, one or more content pages 112 of the content site 110 can include a tag container 114. The tag container 114 can be an example of the tag container described above and can be a universal tag that is installed or incorporated in one or more content pages 112 in place of, or instead of, incorporating numerous tags in each page. The tag container 114 can communicate with one or more data collection tags implemented on one or more tag servers 120. The data collection tags can include third party tags provided by tag vendors that are different entities than an operator of, or provider of, the tag container 114. In addition, the tags can include a visitor tag or tags that can be provided by the same provider as the provider of the tag container 114 (or a different provider in some embodiments). Tags and tag containers are described in detail in U.S. Pat. No. 8,805,946, titled "SYSTEM AND METHOD FOR COMBINING CONTENT SITE VISITOR PROFILES," which is incorporated by reference herein in its entirety.

The tag management system 140 can enable analytics users (described herein) to configure the types of data tracked for different visitors of the content site 110, as well as analyze and report on this visitor data. For instance, in one embodiment, the tag management system 140 can provide one or more user interfaces that enable customization of collecting information about visitors to the content site 110. This information can be obtained initially by the visitor tag(s), which may be provided through the tag container 114 to the end user system 102 for execution in the browser 103. Upon execution in the browser 103, the visitor tag(s) can supply visitor data to the analytics system 130 (optionally through the tag servers 120). Such visitor data can be stored in the interaction data storage 160. Analytics users can subsequently query the interaction data to obtain reports or other information about visitors to the content site 110. Other uses for visitor profile data are described herein.

The analytics system 130 can include a visitor processing system 142 and a tag management system 140. The visitor processing and tag management systems 140, 142 are shown separately for illustrative purposes, although their functionality may be implemented by a single system. The analytics system 130 can be implemented without the visitor processing system 142, and thus, the functionality of the tag management system 140 can be implemented independent of any visitor processing functionality.

The visitor processing system 142 can enable tag management users to configure the types of data tracked for different visitors of a content site, as well as to analyze and report on this visitor data. For instance, the visitor processing system 142 can provide one or more user interfaces that enable customization of collecting information about visitors to a content site. This information can be obtained initially from a tag object or one or more tags, which may be provided through the tag server 120 to the end user system 102 for execution in the browser 103. Upon execution in the browser 103, the tag object or one or more tags can supply visitor data to the visitor processing system 142 (optionally through the tag server 120). Such visitor data can be stored in visitor profiles in the visitor profiles storage 136. Tag management users can, for example, subsequently query the visitor profiles to obtain reports or other information about visitors to a content site.

The tag management system 140 can be used to manage the one or more tags associated with the content pages stored in the content pages storage 112 or the content objects stored in the content objects storage 142. For instance, the tag management system 140 can provide functionality for tag management users to select which tags to associate with which one or more content pages or one or more content objects for a variety of vendor-specific processing purposes or customize the tags for particular content pages or content objects. These purposes can include obtaining analytics for data analysis or business intelligence, tracking affiliate activity with respect to a content site, obtaining user data for displaying targeted ads, obtaining user data for customizing search functionality or email campaigns targeted to the end users, obtaining user data for personalizing content of a content page, obtaining user data for integration with social networking functionality, obtaining user data for big data analysis, combinations of the same, or the like. As described herein, the tag management system 140 can further use or template objects to manage or configure the one or more tags. For example, the tag management system 140 accesses or template objects from the template data storage 162 and presents a user interface corresponding to the one or more template objects in the tag management user system 104. Accordingly, the tag management system 140 can store the output of the implementation of the one or more templates in the tag management data storage 164. Further, the template distribution system 150 can manage the distribution of the one or more template objects to the tag management user system 104.

Data collected by the tag object or tags can be provided to the tag vendor systems 170, which can perform any of this vendor-specific processing. The data collected or related data may additionally or alternatively be passed to the tag vendor systems 170 through the site server 110, the tag server 120, or the analytics system 130. In some embodiments, the tag management system 140 can include a publish engine that generates or revises tag objects, tags, or tag containers.

A tag management user system 104 can access the tag server 120 or the analytics system 130 via the network 108. Like the end user system 102, the tag management user system 104 can include a browser 105 or other application software that can access network applications over the network 108. The tag management user system 104 can also be any type of computing device including, but not limited to, a desktop, laptop, tablet, smartphone, or the like. The tag management user system 104 can be operated by tag management users such as marketing professionals, website operators, business users, operators of a content site or the site server 110, or any other individual who uses tag objects or tags or data obtained therefrom. Tag management users are not the end users of a content site in certain embodiments. The tag management users can use the tag management user system 104 to dynamically update the types of data tracked or analyzed for different visitors of a content site. In addition, the tag management user can use the tag management user system 104 to customize tag objects or tags for particular content pages or content objects.

The computing environment 100 can additionally include more end user systems and tag management user systems than just the end user system 102 and the tag management user system 104 shown in FIG. 1. Multiple end user systems can thus, for instance, access content pages from the site server 110 via the network 108, and multiple tag management user systems can interact with the analytics system 130 via the network 108.

Figure 2:
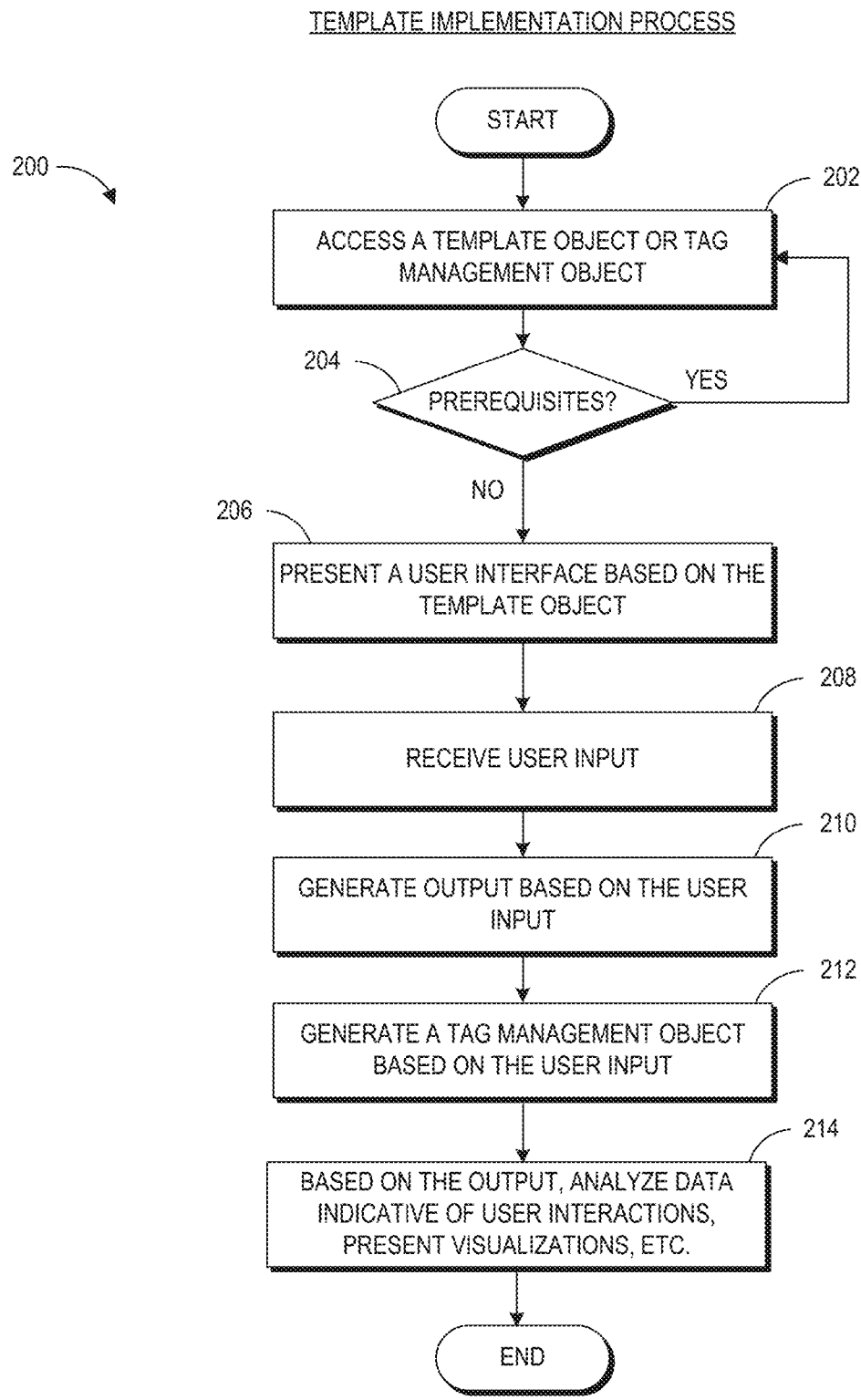
FIG. 2 depicts an embodiment of a template implementation process.

Turning to FIG. 2, an example template implementation process 200 is shown. The process 200 illustrates an example mode of operation of the computing environment 100 and may be implemented by the various components shown in the computing environment 100. For convenience, the process 200 is described in the context of the computing environment 100, but may instead be implemented by other systems described herein or other computing systems not shown. The process 200 provides one example approach by which a template object can be implemented. Depending on the embodiment, the method 200 may include fewer or additional blocks and/or the blocks may be performed in order different than is illustrated.

At block 202, the tag management system 140 accesses a template object. For example, a template object may be accessed from the template data storage 162. The tag management system 140 may access a template object based on a selection by configuration user within the user interface of the tag management system 140, such as the example user interfaces 2500 or 2700 of FIG. 25A or 27A, respectively. For example, the template object may include one or more identifiers that may correspond to one or more attributes. As described herein, an example attribute includes a home page attribute that can be used by the tag management system to identify user interactions with the home page of a content site.

At block 204, the tag management system 140 determines if the template object has any prerequisites. The tag management system 140 may determine prerequisites based on the inputs of the template object. As described herein, a template object may include one or more identifiers for other objects. Accordingly, the tag management system 140 may determine prerequisites of template objects, or prerequisites of prerequisites, etc., using the identifiers. For example, a downstream template object may include an input attribute "event_name". The "event name" attribute may be the output of a parent template object. Additionally, the parent template object may have its own prerequisites, which may be determined by the tag management system 140 in a similar manner. The tag management system 140 may determine whether the prerequisite components or template objects have been assigned values or have been completed. Accordingly, the tag management system 140 may return to block 202 to recursively access prerequisite template objects, components thereof, or tag management objects. As described herein, the tag management system 140 may prompt users to complete any prerequisites before allowing the configuration user complete the present template.

In some embodiments, the tag management system 140 uses the attribute identifiers to determine prerequisites. For example, the tag management system 140 determines the prerequisites for a template object by accessing one or more identifiers of the template object. In the example, the tag management system 140 then determines another template object that also include the one or more identifiers, such as the one or more identifiers being outputs of the other template object. Thus, the tag management system 140 can dynamically, recursively, or in a precomputed manner determined the one or more prerequisites or dependencies for a particular template object.

Additionally or alternatively, the tag management system 140 may use other methods for determining prerequisites. For example, template objects may include a template identifier and a data structure, such as an array, of prerequisite template identifiers. Accordingly, the tag management system 140 may use the data structure of prerequisite template identifiers to access any prerequisite template objects or components.

At block 206, the tag management system 140 presents user interfaces based on the template object. The example template objects may include data to configure the user interfaces of the tag management system 140, which may be described in further detail with respect to the example template object 2900A-2900B of FIG. 29. The user interfaces presented by the tag management system 140 may include one or more prompts and user input elements. In some embodiments, the template object includes instructions that configure the visual presentation of the prompts and user input elements. For example, the template object can include formatting instructions (such as font and font size instructions), presentation layout instructions (such as alignment instructions), and other presentation instructions including color or images to be presented in the user interface. Example user interfaces corresponding to the template objects are described in further detail with respect to FIGS. 25B through 25I and FIGS. 27B through 27M. For example, a prompt may be presented corresponding to the home page attribute that requests a user to enter an input value for the home page attribute.

The tag management system 140 may determine if any components of the template object have pre-existing values or are assigned, as described herein. Accordingly, the tag management system 140 may present prepopulated values for user input elements where pre-existing values exist. An example of a user interface with prepopulated values may be depicted in FIG. 25C. Additionally or alternatively, the tag management system 140 may suppress prompts or user interface elements based on the determination of pre-existing values for corresponding components or attributes of the template object. For example, the tag management system 140 may determine a subset of user interface elements to present to the user. Continuing with the subset example, the template object may include data regarding one or more user interface or user input elements. The tag management system 140 may determine a subset of user interface elements based on the template object components that have unassigned data values and the components with assigned values may be excluded or not present within the subset of user interface elements. The tag management system 140 may present the subset user interface elements to a configuration user. As described herein, user input elements may be read only, editable, or editable with a warning, which may be defined by the template object.

At block 208, the tag management system 140 receives user input via the user interfaces. For example, an example prompt of the template object may request the user to specify the data value for attribute. Continuing with a specific example, the prompt may request a data value for a page type attribute whereby the user indicates what text string in the content site's URL corresponds to the site's checkout page such as the text "cart" or for the home page, which may be a custom value such as "index." Example user interfaces corresponding to the receiving user input via user interfaces are described in further detail with respect to FIGS. 25C through 25G and FIGS. 27C through 27L. For example, as depicted in FIGS. 25C through 25G and FIGS. 27C through 27L, the template objects may specify prompts and corresponding user interface elements in a series until completion.

At block 210, the tag management system 140 generates output based on the user input. For example, the tag management system 140 may output an attribute with a data value corresponding to the user input. The output may be stored in the tag management data storage 164. Continuing with a specific example, a page type attribute for a checkout page (with the value "cart") may be output to the tag management data storage 164. As another example, a home page configuration may be output to the tag management data storage 164 that enables the tag management system to identify home pages by text in the URL corresponding to "index." Additional examples of template output include rules, badges, or transformations. The tag management system 140 may use the identifiers in the template object to evaluate or retrieve the values for the objects that correspond to the identifiers, as described herein. In some embodiments that do not employ a universal tag, tags may be output by the completion of the template object. As described herein, the tag management system 140 may use the template object to output audiences or corresponding action connectors. For example, the template object may collect end users matching specific criteria into an audience, email addresses or other user identifying information may be collected for the audience members, and the action connector may specify sending the end-user information to a third-party vendor such as an email vendor. The tag management system 140 may generate visualizations associated with the completed templates, as described herein.

In some embodiments, some output of a completed template object may be non-editable or edible with a warning. For example, it may be advantageous to prevent or warn a user about editing or removing an individual output attribute associated with a template object because such an action may break the tag management functionality represented by the template or any other configurations associated with the attribute. Accordingly, the tag management system 140 may enable the configuration user to repeat a template process if the configuration user wants to update a value associated with an output, which may advantageously preserve the integrity of the tag management configurations.

At block 212, the tag management system 140 generates a tag management object based on the user input. For example, the tag management system 140 may store a tag management object corresponding to the user input and elements of the template object to the tag management data storage 164. Thus, the tag management system 140 may be able to display to the configuration user the completed templates and the collection of attributes and outputs corresponding to the completed template. In some embodiments, a configuration user may remove a tag management object from the tag management system 140, which may automatically remove all of the outputs associated with the tag management object. Such functionality to automatically remove attributes associated with a tag management object may be advantageous because individually removing attributes from a tag management system may be difficult since the attributes may be linked with other attributes such as rules, transformations, etc. Thus, template or tag management objects may be useful for organizing a tag management system, especially in the case of new configuration users where the learning curve to become proficient in setting up tag management configurations may be rather steep. Additionally or alternatively, if the tag management object to be removed is a prerequisite for other tag management objects, then the tag management system 140 may warn or require the user to remove the dependent tag management objects as well.

At block 214, the visitor processing system 142 or the tag management system 140 may use the output configurations to analyze received interaction data from a content site. As described herein, the visitor processing system 142 processes interaction data based on the configurations from the tag management system 140. Accordingly, data from end users may be tracked or analyzed using the instructions specified in the template objects. For example, the output of the template implementation processes may include instructions sets to analyze data that further conditionally generates output. The tag management system 140 may present visualizations that are specified by the template objects. Example visualizations are described in further detail with reference to FIG. 28. Other example visualizations also include bar graphs such as the graphs depicted in FIG. 21. The analyzed interaction data or the output of the template objects may generate personalized network page experiences, promotional network pages that reflect the state of the user, targeted communications such as emails, or cross-computing device recognition data.

Figure 3:
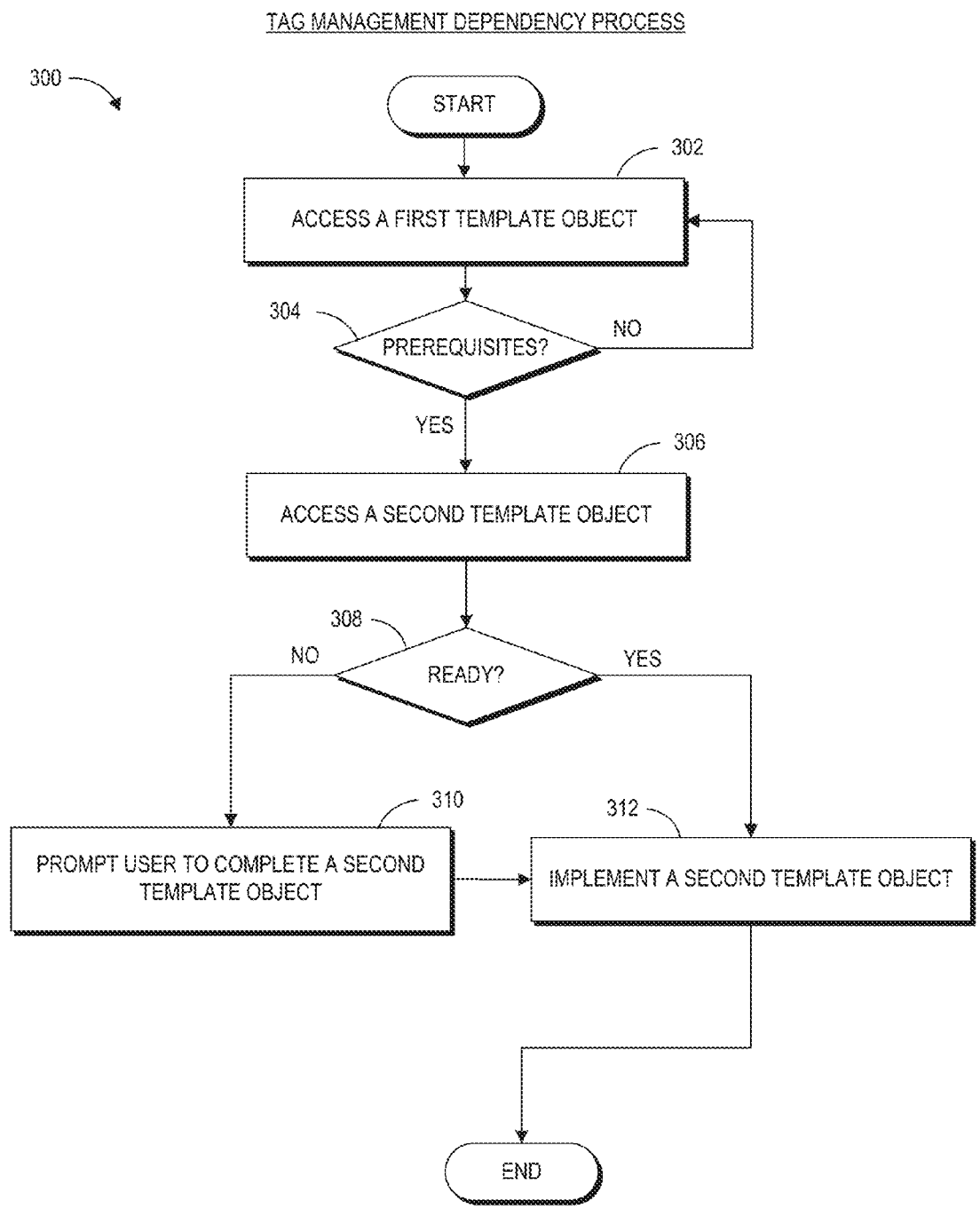
FIG. 3 depicts an embodiment of a tag management dependency process.

Turning to FIG. 3, an example tag management dependency process 300 is shown. The process 300 illustrates an example mode of operation of the computing environment 100 and may be implemented by the various components shown in the computing environment 100. For convenience, the process 300 is described in the context of the computing environment 100, but may instead be implemented by other systems described herein or other computing systems not shown. The process 300 provides one example approach by which tag management dependencies may be determined. Depending on the embodiment, the method 300 may include fewer or additional blocks and/or the blocks may be performed in order different than is illustrated.

At block 302, the tag management system 140 accesses a first template object. Block 302 may be similar to block 202 of example method 200 of FIG. 2. In some embodiments, the tag management dependency process 300 may occur during at the end of an implementation process for a template object, such as after block 212 of FIG. 2. For example, the tag management dependency process 300 may advantageously complete template objects that depend on a first template object, thereby increasing the efficiency of tag management configuration.

A block 304, the tag management system 140 determines whether the first template object is a prerequisite for other template objects. Block 304 may be similar to block 204 of the example method 200 of FIG. 2 in determining prerequisites. However, block 304 may differ from block 204 in that, instead of determining whether a template object has any prerequisites, the tag management system 140 determines whether the first template object is the parent or has any dependents that may also be completed or are near completion.

At block 306, the tag management system 140 accesses a second template object. The tag management system 140 accesses the second object that was determined to have the first object as a prerequisite. Block 302 may be similar to block 202 of example method 200 of FIG. 2.

At block 308, the tag management system 140 determines whether the second object is ready to be implemented. For example, if the components of the second template object have been initialized, which may occur via the completion of a first template object, then the tag management system 140 may proceed towards implementing the second template object at block 312. In some embodiments, a configuration user may be prompted via a user interface to confirm whether to implement the second template object. Accordingly, block 312 may correspond to some of the blocks of the example method 200 of FIG. 2 such as blocks 210 or 212 for generating output or a tag management object. Otherwise, if a component of the second template object, such as a template attribute, has an unassigned data value, the tag management system may proceed to block 310. It will be appreciated that the tag management system 140 may recursively process the second template object once it has been implemented to see if there are further children templates that could be implemented such as by returning to block 302.

At block 310, the tag management system 140 may prompt the user to complete the second template object. For example, if there are components of the second template object that require user input, then the tag management system 140 may walk the user through the implementation process for the second template object, which may correspond to the example method 200 of FIG. 2. Once the interview process has been completed for the second template object, the tag management system 140 proceeds to block 312 to implement the second template object. In some embodiments, the tag management system 140 may identify and present second template objects that are near completion to the user. The presentation of second template objects may include an indication of the completion status of the second template objects such as a percentage value (e.g., "90% complete") or a visualization such as a progress bar.

Figure 4:
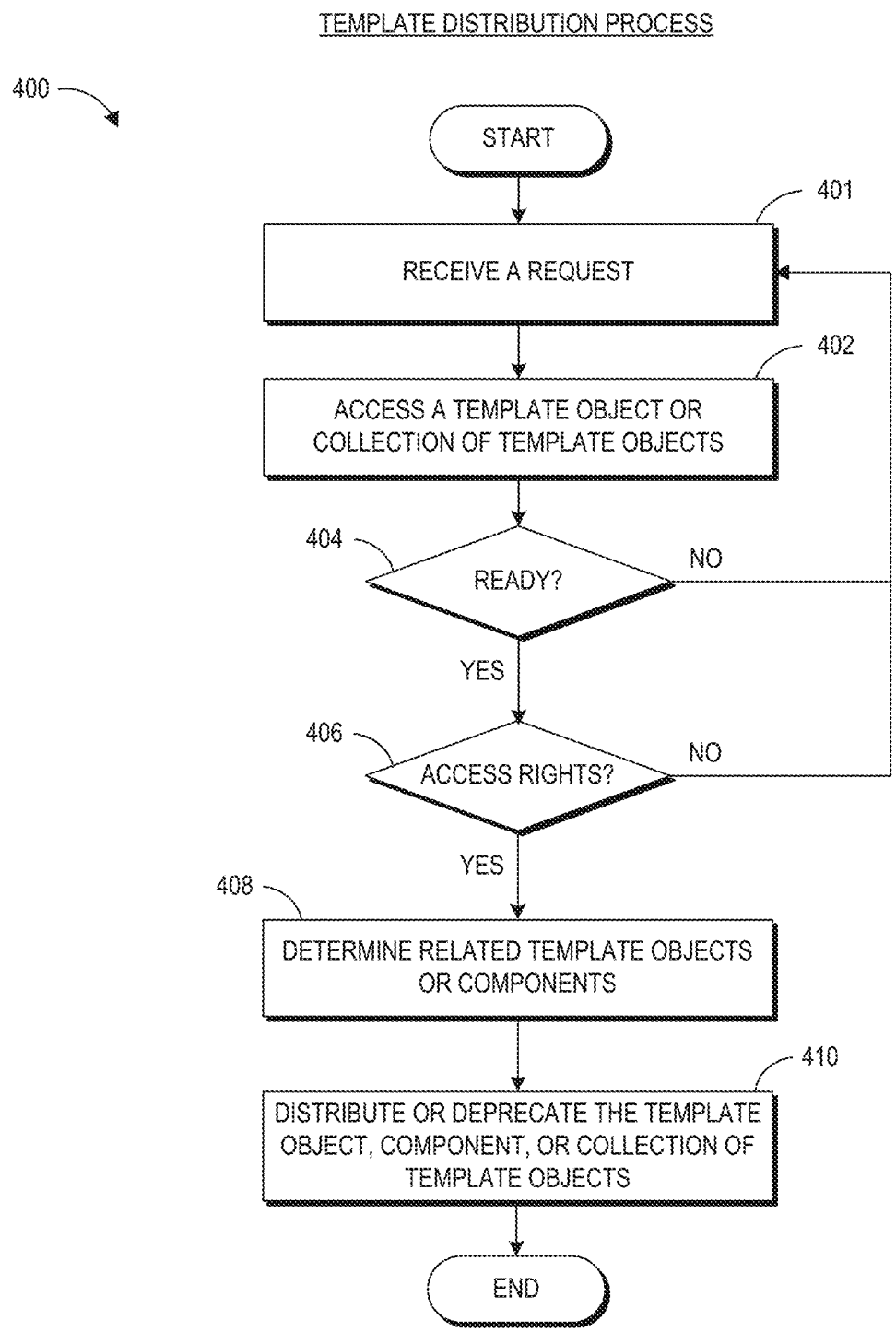
FIG. 4 depicts an embodiment of a template distribution process.

Turning to FIG. 4, an example template distribution process 400 is shown. The process 400 illustrates an example mode of operation of the computing environment 100 and may be implemented by the various components shown in the computing environment 100. For convenience, the process 400 is described in the context of the computing environment 100, but may instead be implemented by other systems described herein or other computing systems not shown. The process 400 provides one example approach by which template objects or components may be distributed. For example, the tag management system 400 may include a template marketplace for configuration users to access template objects, components, or collections of template objects. Depending on the embodiment, the method 400 may include fewer or additional blocks and/or the blocks may be performed in order different than is illustrated.

At block 401, the template distribution system 150 may receive a request for a template object, component, a collection of template objects, or some combination thereof. For example, a configuration user may request a collection of template object or a collection of template objects via the tag management system 140. The tag management system 140 may request a new version of a template object, component, or a collection of template objects. Additionally or alternatively, the template distribution system 150 may push a new version of a template object, component, or a collection of template objects. In some embodiments, the template distribution system 150 and the tag management system 140 communicate via an Application Programming Interface (API).

At block 402, the template distribution system 150 accesses a first template object or a collection of template objects. The received request at block 401 may identify objects that the template distribution system 150 should access. Block 402 may be similar to block 202 of example method 200 of FIG. 2.

At blocks 404 and 406, the template distribution system 150 determines whether the one or more template objects are ready to be distributed, should be deprecated or removed, or the requesting user or account has sufficient permissions to access the one or more objects. For example, the example objects depicted in FIGS. 29 through 32 include access right properties such as account, profile, or a published status. Example publish statuses include IN_PROGRESS, READY_FOR_PUBLISH, PUBLISHED, READY_FOR_UNPUBLISH, OUTDATED_IN_PROGRESS, OUTDATED_READY_FOR_PUBLISH, OUTDATED_PUBLISHED, or OUTDATED_READY_FOR_UNPUBLISH. If the one or more objects are not ready or the requesting account or user does not have sufficient permissions, then the template distribution system 150 may process additional requests. For example, particular templates or collections of templates may be accessible to particular users or accounts such as being behind a pay wall.

At block 408, the template distribution system 150 determines related template objects or related components. For example, as described herein, a template object or its components may be assigned a version such that newer versions of the template object or components may be accessed. The template distribution system 150 may determine related components or template objects using identifiers, as described herein.

At block 410, the template distribution system 150 distributes, deprecates, or removes the template object, components, or collections of template objects. For example, the template distribution system 150 may determine that an underlying component of a template object may be outdated, and the template distribution system 150 may transmit the newer component to a respective tag management system 140 and instruct the tag management system 140 to deprecate or remove the older component. In some embodiments, when a component, or template object has been updated, the configuration user may be notified and prompted to complete the updated template object. In some embodiments, the objects may be distributed over a network in a JavaScript Object Notation (JSON) data format.

IV. Example Tag Management User Interfaces

Figure 20:
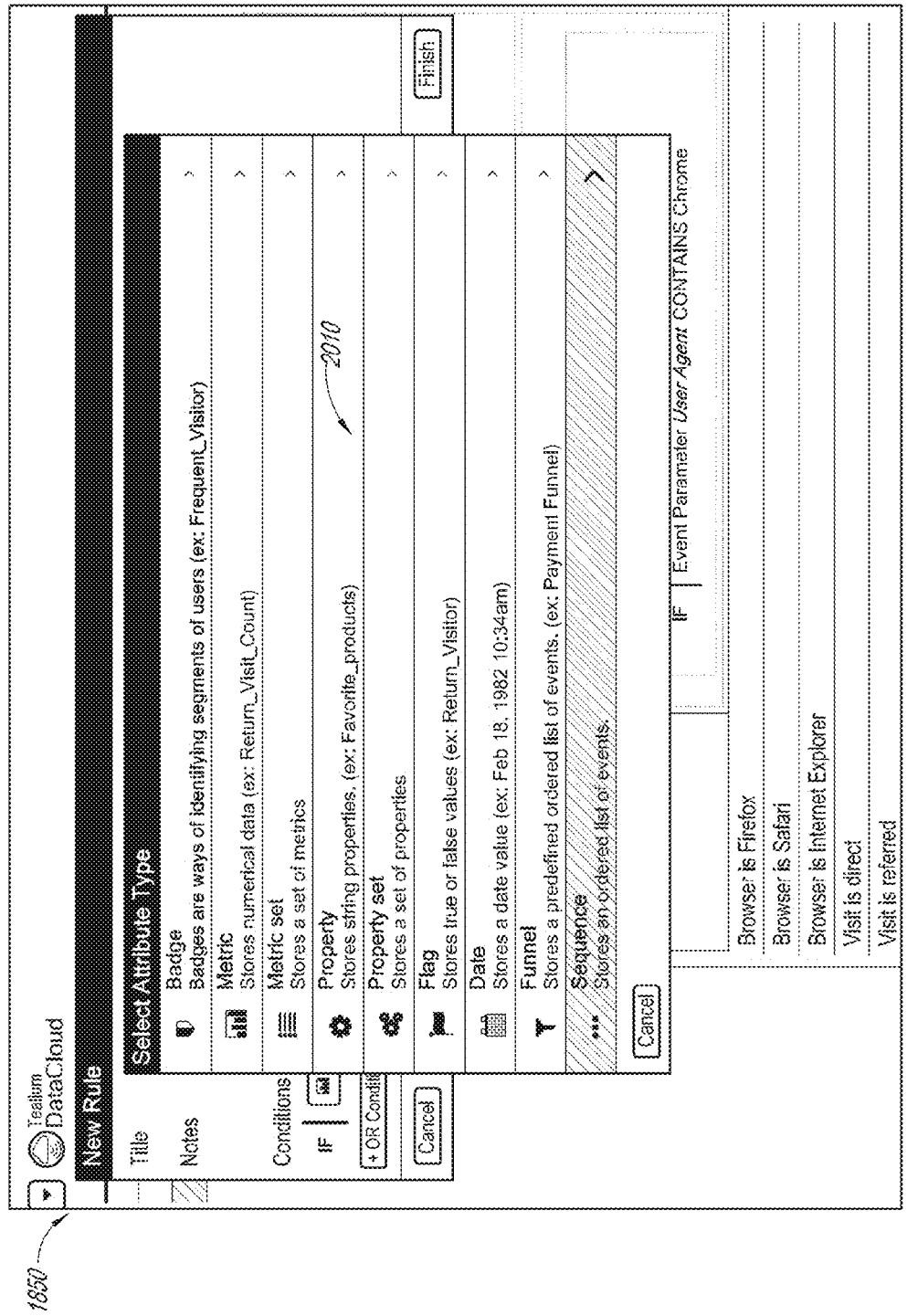
Figure 21:
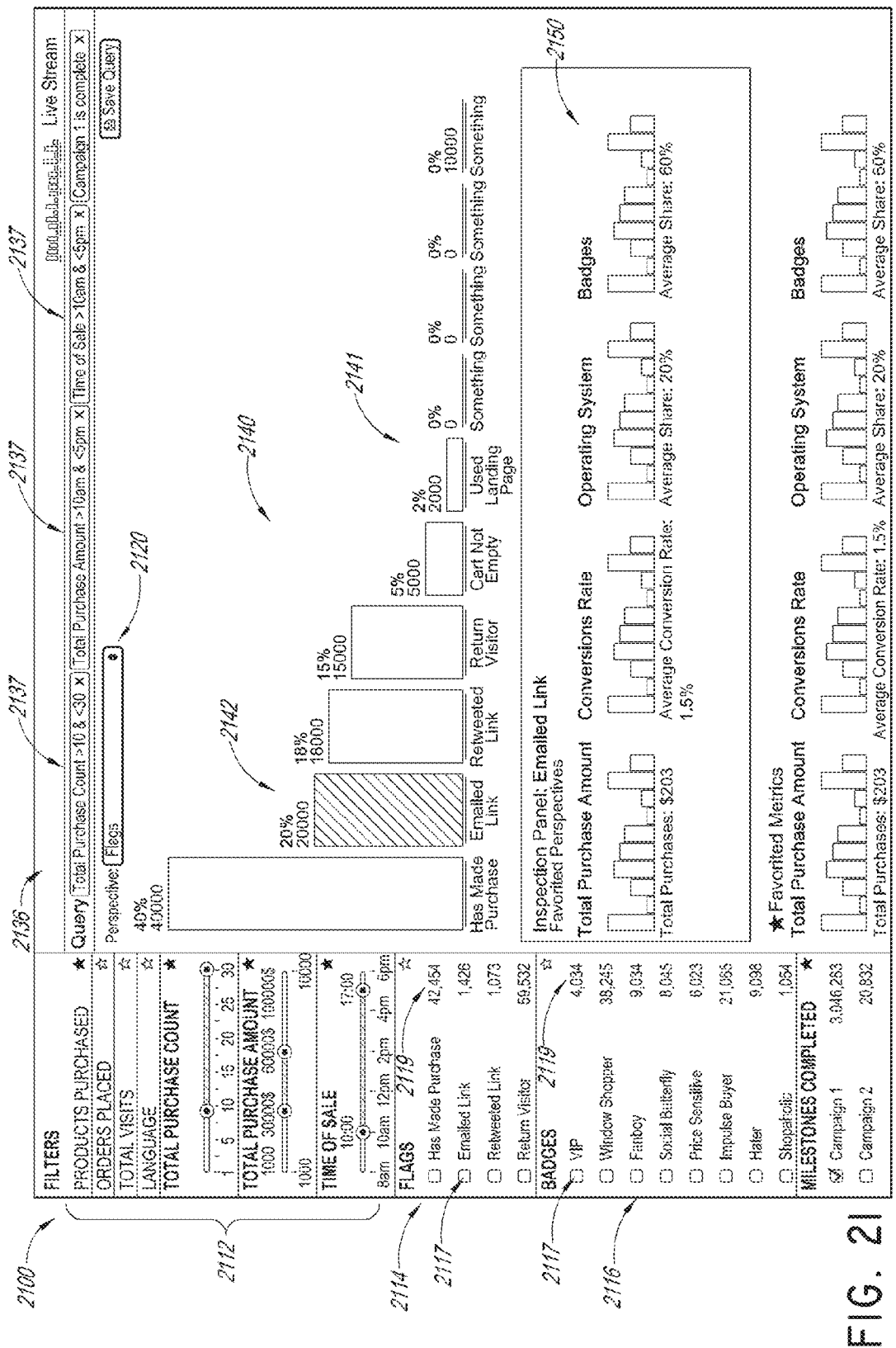
Figure 22:
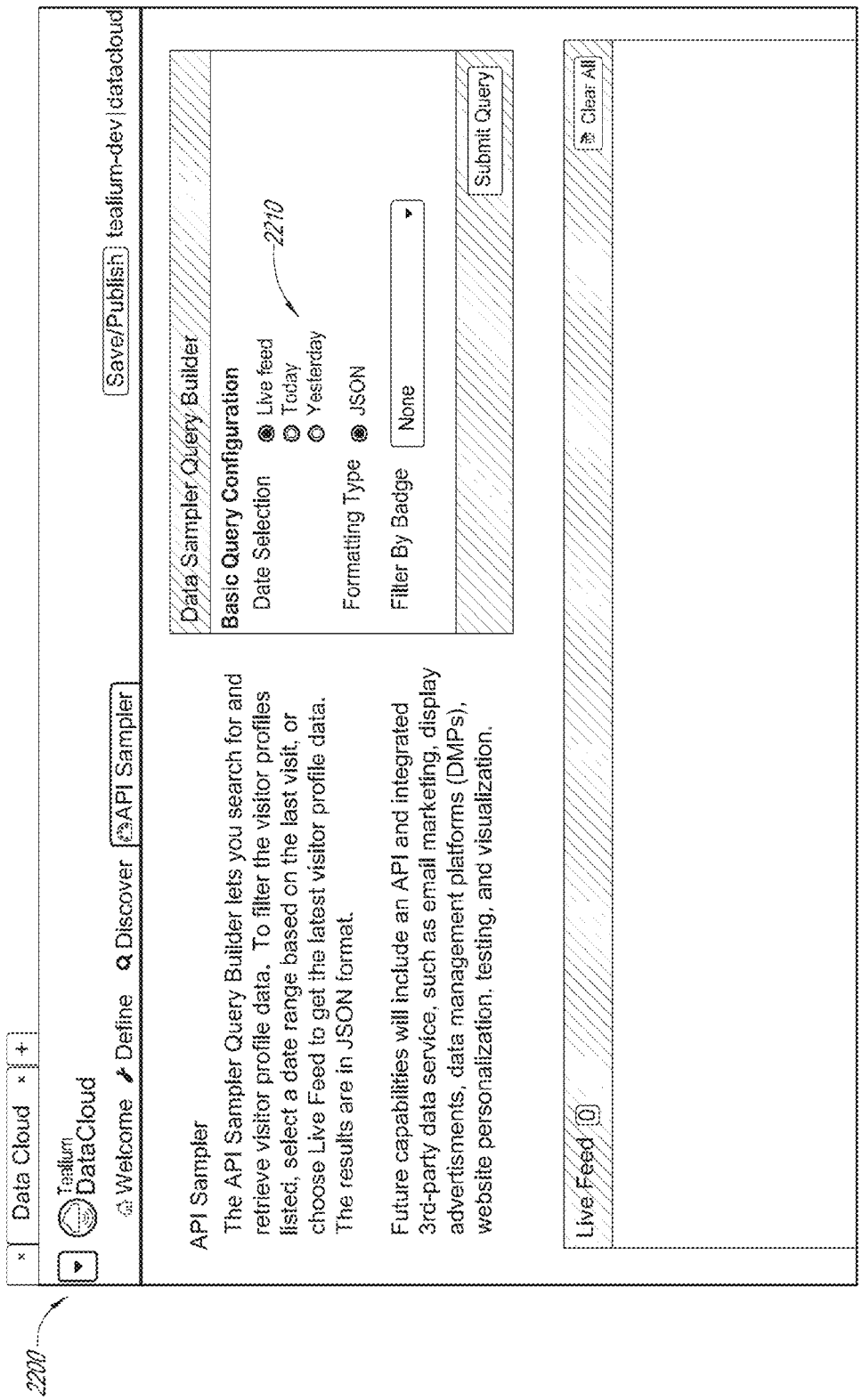
Figure 23:
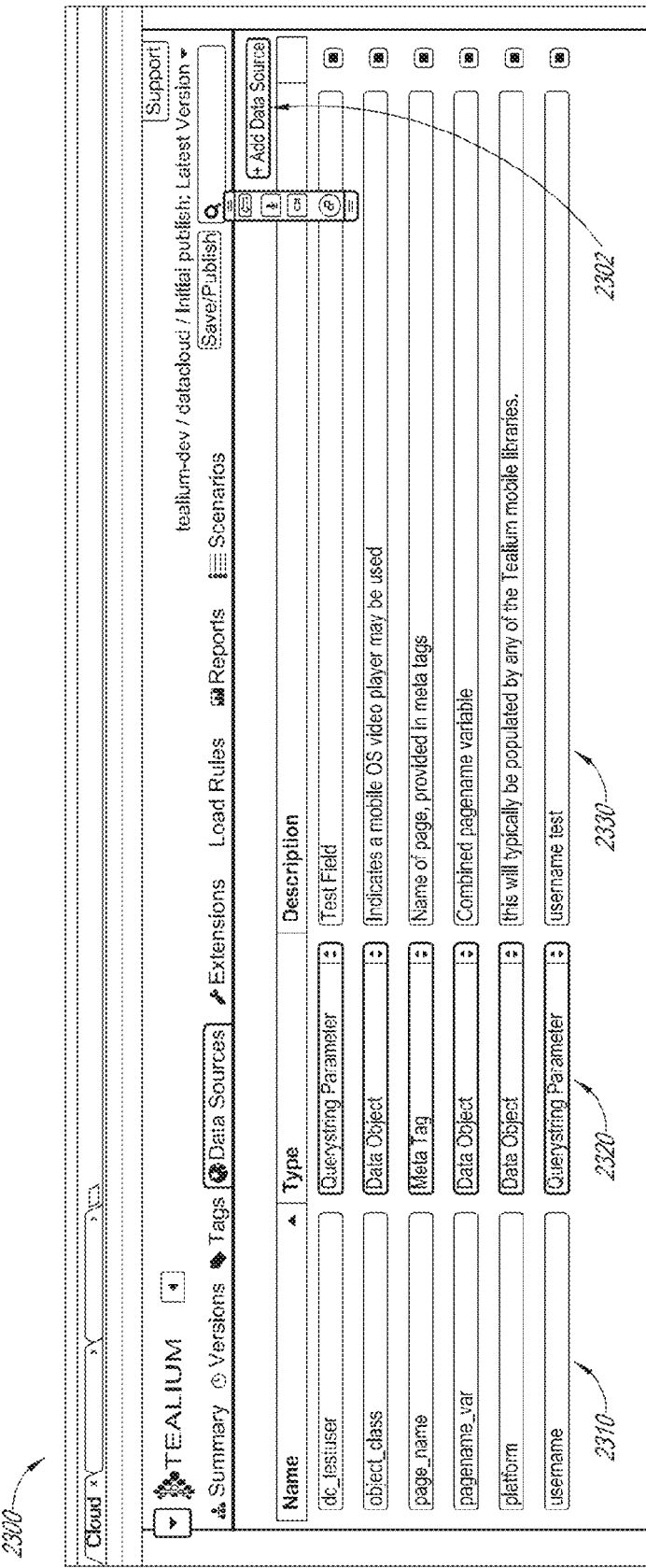

FIGS. 5 through 24 depict example tag management configuration-related user interfaces that can be output by the tag management system 140. These user interfaces include features for customizing visitor profile template configurations, analyzing and generating segment reports, integrating visitor data collected by a visitor processing system with external vendor features, and the like. In particular, FIGS. 5 through 20 depict visitor profile configuration user interfaces that can be generated by the tag management system 140, FIG. 21 is an example user reporting interface described below, and FIG. 22 is an example integration user interface which is also described below. In addition, FIG. 23 depicts an example data source user interface, and FIG. 24 depicts an example data mapping user interface. Each of these user interfaces are described in greater detail herein. Additional information regarding visitor processing or the processing of interaction is described in further detail in the U.S. Pat. No. 8,805,946, titled "SYSTEM AND METHOD FOR COMBINING CONTENT SITE VISITOR PROFILES," which was previously incorporated by reference herein in its entirety, see, e.g., col. 4 ll. 10-col. 11 ll. 56 or col. 22 ll. 45-col. 38 ll. 38. Generally, aspects of the tag management configuration depicted in FIGS. 5 through 24 may be accomplished with the templates described herein. For example, any of the attributes depicted in FIGS. 5 through 20 may be output by the template implementation processes described herein.

FIGS. 25A through 28 depict example user interfaces for template-related functionality that can be output by the tag management system 140. The functionality of the example template-related user interfaces may automate or overlap with some of the configurations or functionality depicted in FIGS. 5 through 24.

Each of the user interfaces shown includes one or more user interface controls that can be selected by a configuration user, for example, using a browser or other application software. Thus, each of the user interfaces shown may be output for presentation by a browser such as the browser 105 or the like or any other application software. The user interface controls shown are merely illustrative examples and can be varied in other embodiments. For instance, buttons, dropdown boxes, select boxes, text boxes, check boxes, slider controls, and other user interface controls shown may be substituted with other types of user interface controls that provide the same or similar functionality. Further, user interface controls may be combined or divided into other sets of user interface controls such that similar functionality or the same functionality may be provided with very different looking user interfaces. Moreover, each of the user interface controls may be selected by a user using one or more input options, such as a mouse, touch screen input, or keyboard input, among other user interface input options.

Figure 5:
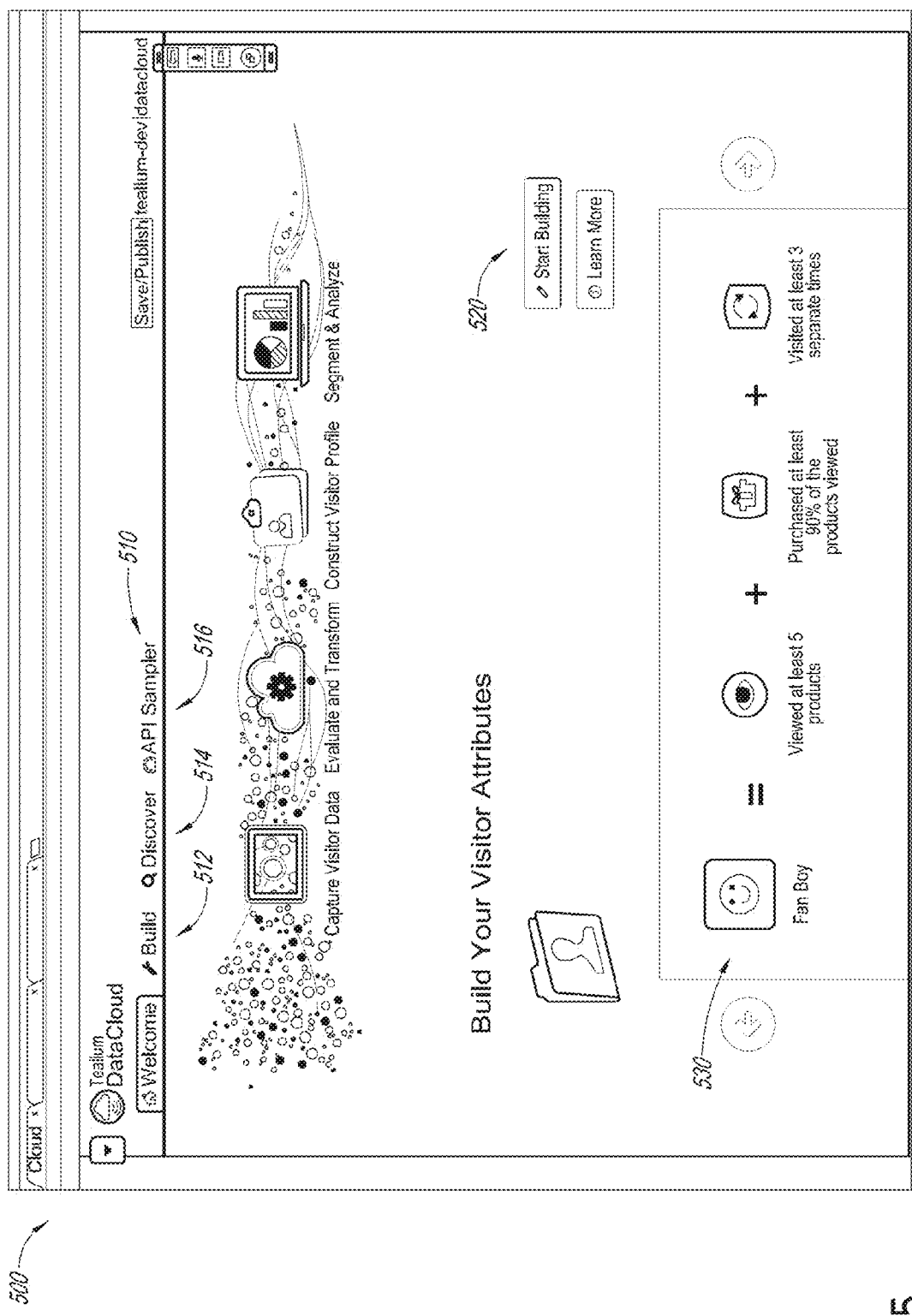

Turning to the visitor profile configuration user interfaces of FIGS. 5 through 20, a visitor profile configuration user interface 500 in FIG. 5 is shown. The user interface 500 includes features for constructing visitor profile templates, discovering data with respect to visitor profiles created from visitor data by generating reports and features for obtaining visitor profiles through API access. The example visitor profile configuration user interfaces can provide functionality for configuration users to specify different types of visitor profile templates to be used in creating visitor profiles from captured visitor data.

In FIG. 5, the user interface 500 includes various menu options 510 for accessing features of the visitor profile configuration module 242 and reporting module 248 of the visitor processing system 240. These menu options 510 include a set of tabs 512, 514 and 516 that may be selected by a user. The menu options 510 include a build option 512 which upon selection can output a user interface 600 shown in FIG. 6 (described below) or the like, a discover option 514 which upon selection can output a custom reports interface 2400 shown in FIG. 21 (described below) or the like, and an API sampler option 516 which, upon selection, can output an integration user interface 2200 shown in FIG. 22 (described below) or the like.

Using the build option 512, a configuration user can configure a visitor profile. As described herein, a visitor profile can be made up of one or more attributes (or rules, discussed below) which are defined or customized by a configuration user. Some attributes may be updated each time an event happens, such as a visitor interaction with a content page, while other attributors may be composed of multiple conditions and rely on values of other attributes created by the configuration user. As described above, badges are one example of these attributes. A badge may be assigned to a visitor based on different attributes or characteristics of that visitor's interactions with the content page, whether within a single visit or over multiple visits.

One example of such a badge is shown in FIG. 5, the badge 530. The badge 530 is shown as merely an example to illustrate one optional configuration of an attribute that may be made by a configuration user. The badge 530 is titled "fan boy" and depicts a square icon with a smiley face superimposed therein. The "fanboy" badge represents the following other attributes of a visitor, including that: the visitor has viewed at least five products on the content site, has purchased at least 90% of the products viewed, and has visited the content site at least three separate times. These attributes may be configured by a configuration user using the various user interfaces shown in FIGS. 6 through 20. Another example of a badge that might be configured by a configuration user is a window shopper badge. For instance, the window shopper might be assigned to a user having the following attributes: the user is visited at least four times to the content site, has never made a purchase, and has never added items to his shopping cart (or has added items to his or her shopping cart but has never purchased any of those items).

As another example, a frequent visitor badge might be assigned to a user who has visited a content site a total of at least 20 times and has visited at least two times in the last seven days. As another example, an impulse buyer badge might be assigned to a user who has an average product view per purchase of less than two and a total products purchased is greater than one. Further, still another example of a badge might be a VIP user badge that might be assigned if a user has visited a content site more than two times per week, has a spending total in excess of $1,000, and has tweeted a link or liked an item on the content page on Facebook (or another social networking site). These badges and the criteria that trigger their assignment to visitors are merely examples of a massively customizable number of badges that may be configured by configuration users to represent visitors to the content site based on the attributes of their visiting interactions with the content site.

As described above, data about the user visits may be obtained by the tag container and the tag on the tag server and provided to the visitor processing system. The visitor processing system can apply the attributes and rules for transforming those attributes into badges or other types of attributes which will be described in greater detail below. Further, using the reporting user interface 2100 of FIG. 21 or the like, a configuration user can analyze different segments of visitors based on the data collected about those visitors and transformed into specific attributes such as badges.

a. Attribute Creation Overview and Example Badge Attribute Creation

Figure 6:
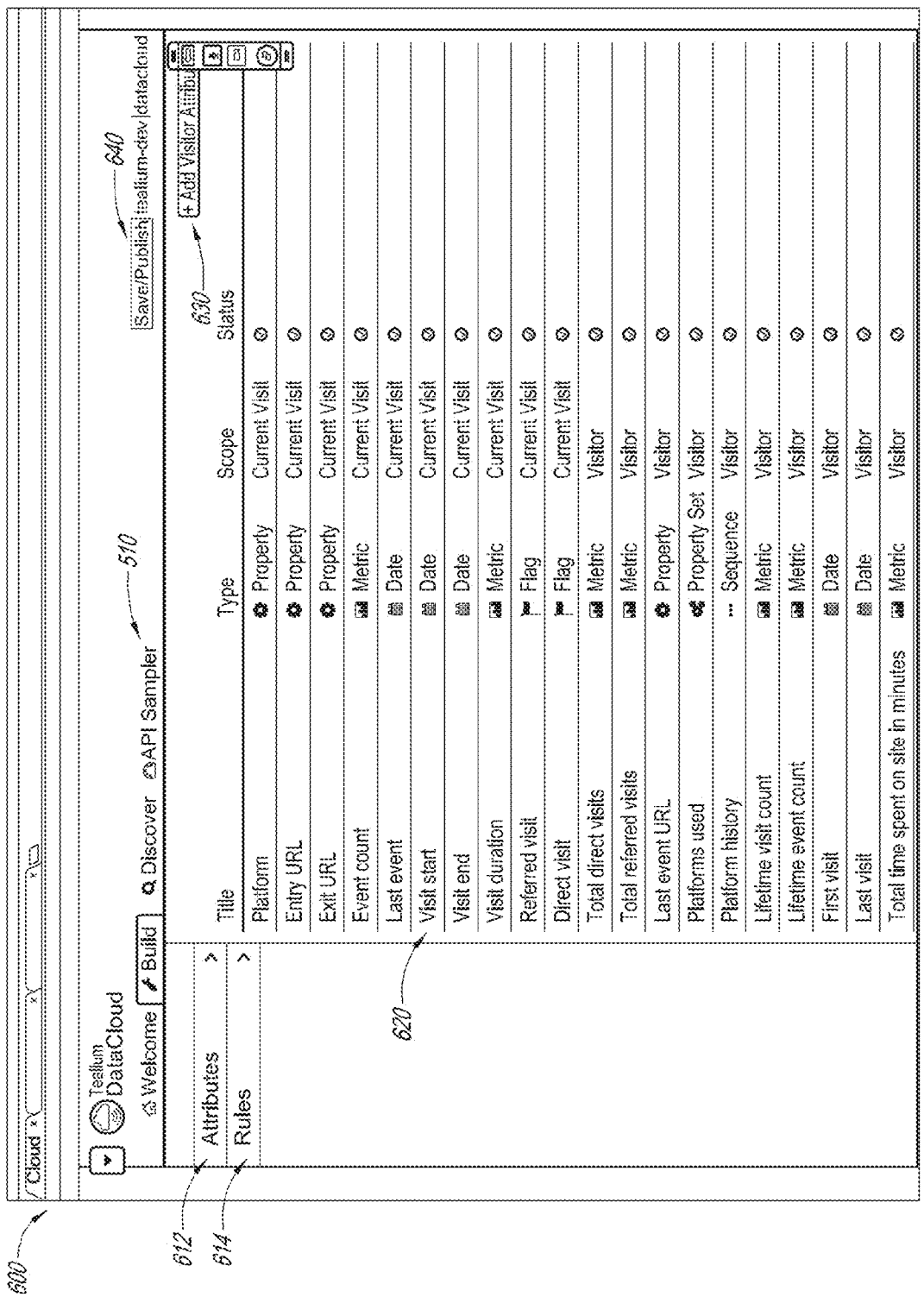

Turning to FIG. 6, a user interface 600 is shown that may be obtained by a user selecting the build menu option 512 from FIG. 5. In the user interface 600, user interface 600 options for selecting attributes 612 and rule 614 are provided. The attributes 612 can be attributes of visitors or attributes associated with visitor interactions with the content site. The attributes may be as simple as flags indicating whether a user has performed a certain interaction with respect to the content site, such as clicking on a link or purchasing a product. Conversely, the attributes may be as complex as a funnel representing a predefined ordered list of events, such as a payment funnel that occurs through a series of clicks or item selection events made by a user.

In the depicted embodiment, the attributes option 612 is selected and a plurality of example attributes 620 are shown organized by title, type, and scope. Some examples of these attributes include a "visit start date" that may be set to determine when a user started visiting a website, a "visit end date" that may be used to determine when a visitor ended his visit, a "visit duration," "lifetime visit count," and the like. The attributes 620 shown can be collected for all end users that visit the content site or a subset thereof. Options may be provided in some embodiments for a configuration user to determine which subset of users will be tracked according to the selected attributes.

The example types of attributes 620 shown include properties, metrics, dates, flags, sequences, and the like. Other attributes may also be provided, examples of which will be described in greater detail below. The scope of the attributes can relate to the current visit that a visitor is experiencing with respect to the content site. The current visit can be a current browse session, for instance, with respect to the content site. The current visit may begin when the user initially loads a content page from the content site and may end when the user leaves the content page or is otherwise inactive for a period of time (such as 30 minutes or more). Alternatively, the scope can refer to the visitor instead of the current visit and may therefore correspond to lifetime visits to the content page by the visitor. Other scopes are possible, including a configurable time period such as the past 30 days or the like.

An add visitor attribute button 630 is also shown in the depicted embodiment. The add visitor attribute button 630 may be selected by a user to add a new visitor attribute to the list of attributes 620. Likewise, any of the attributes 620 may be selected by a configuration user to edit the attribute 620. Upon selection of the visitor attribute button 630, a user interface such as the user interface 700 of FIG. 7 may be output for presentation to the user.

Figure 7:
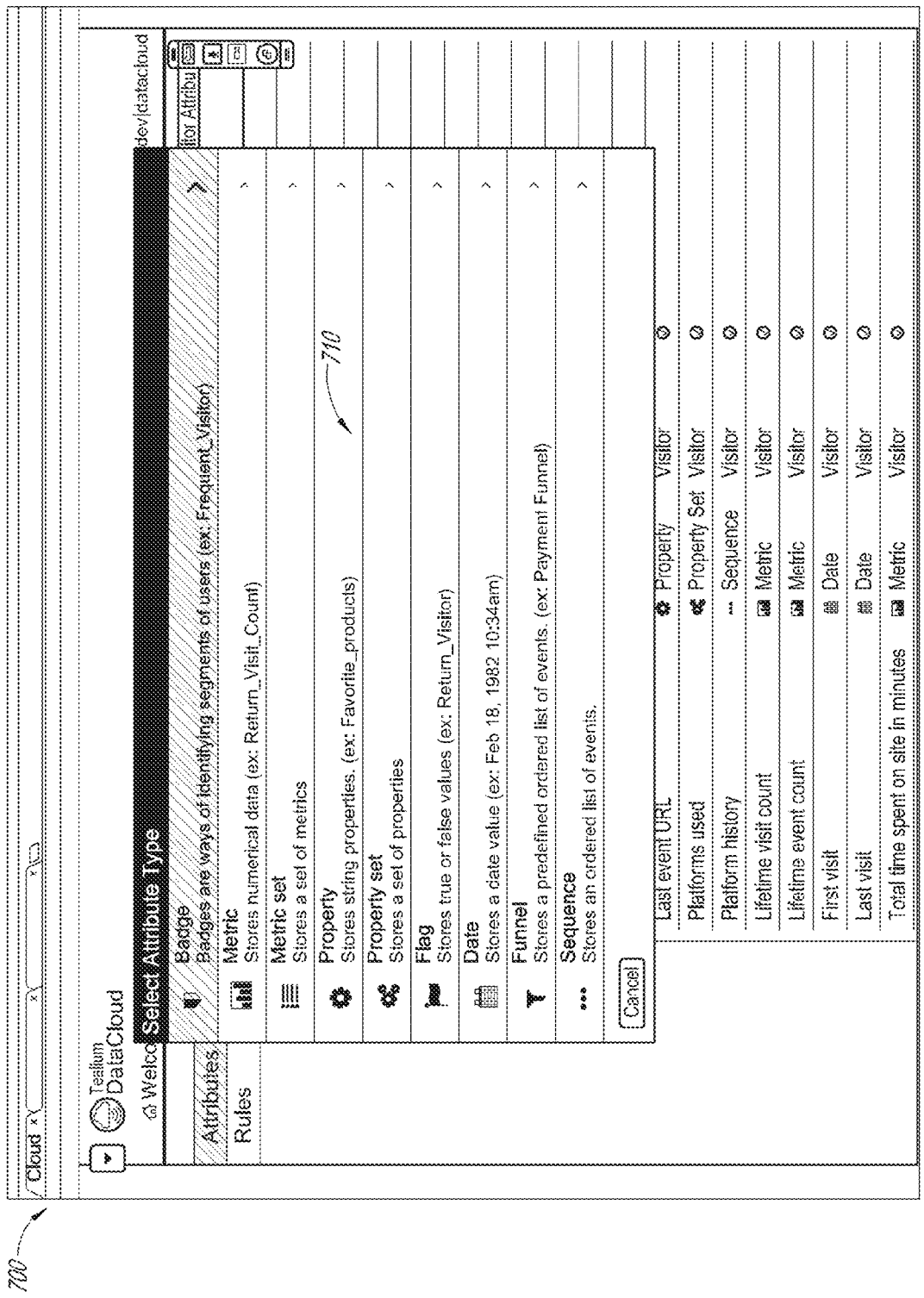

In the user interface 700 of FIG. 7, various options for selecting attribute types 710 to create a new attribute are shown. Upon selection of one of the attribute types 710, the user can define specific characteristics associated with the attribute to be used for analysis of data collected with respect to end users. Users whose characteristics in interacting with the content site satisfy characteristics or rules associated with an attribute can be assigned that attribute. In the depicted embodiment, the attribute types that can be selected from include badges, which can include labels or other indicia used to identify segments of users (e.g., frequent visitors); metrics, which can store numerical data such as a return visit count; metric sets (or tallies), which can store sets or collections of metrics; properties (or traits), which can store strings such as the name of a favorite product; property sets, which can store sets of properties; flags, which can store true or false or Boolean values; dates, which can store a date value such as a date when a user last visited the content page; funnels, which can store a predetermined order list of events such as a payment funnel; and sequences, which can store an ordered list of events. An additional example attribute type (not depicted) includes a Visitor Identifier, which can store a value that is used to identify a visitor.

For illustrative purposes, creation of an attribute of the badge type is shown in detail with respect to FIGS. 8A through 10. Example user interfaces for customizing other attribute types are described below with respect to FIGS. 11 through 17.

Figure 8A:
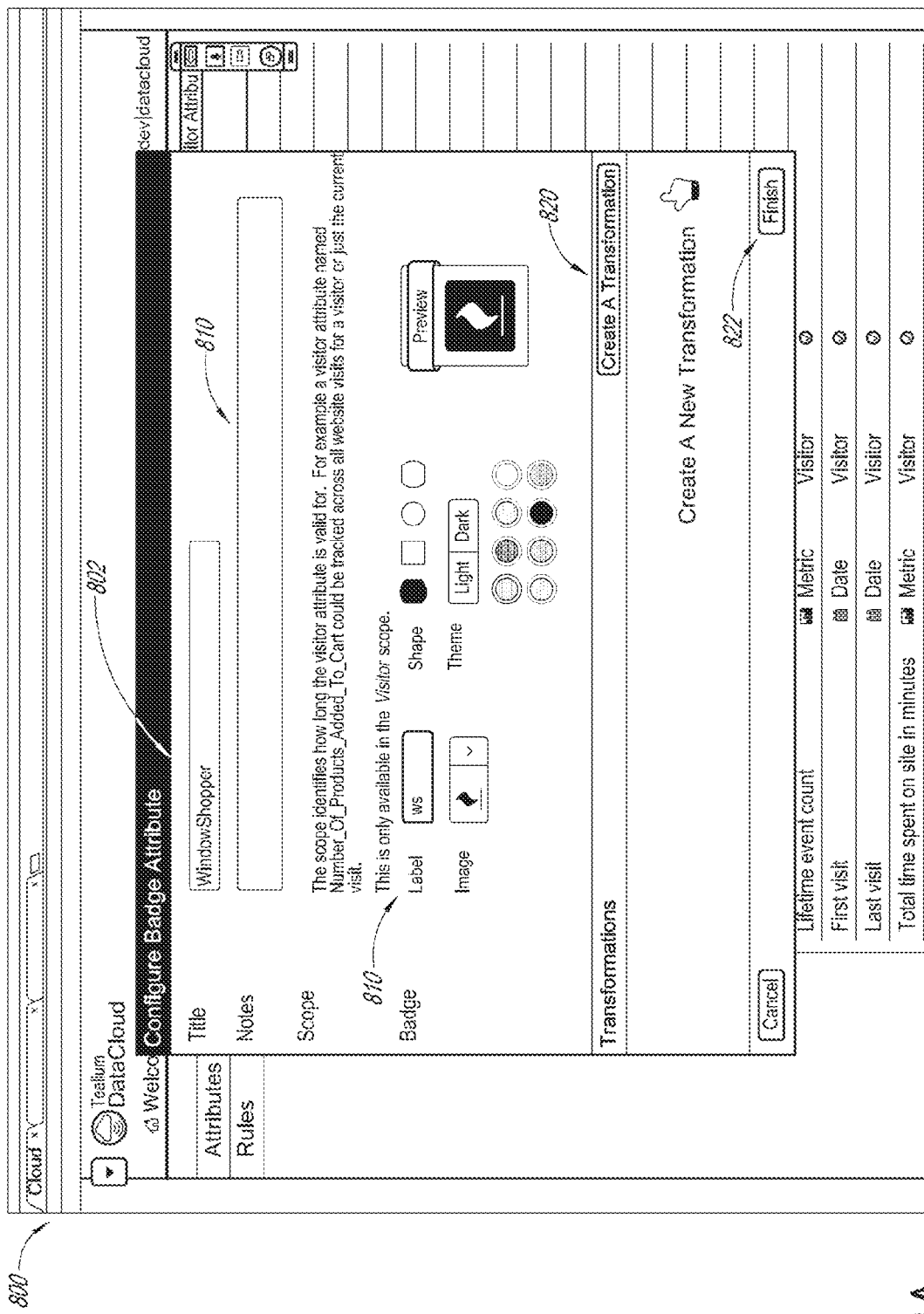

Referring to FIG. 8A, if the badge attribute type 710 is selected in FIG. 7, a user interface 800 or the like may be output for presentation to a user. In the user interface 800, various options 802 for configuring a badge attribute are output for presentation to a user. These options 802 include controls 810 for configuring characteristics of a badge, such as the title of the badge. In the depicted example, the title of the badge is "Window Shopper" and may have been entered by a configuration user. The options 802 also include controls 810 for entering any notes that a configuration user may wish to enter to describe the badge.

In the depicted embodiment, the scope for badges is the visitor scope, and thus the badge may correspond to lifetime visits by the visitor. However, in other embodiments, the scope can be for a current visit instead of the visitor scope, or for some other time period as described above. The user interface controls 810 also include functionality for specifying further details about the badge itself, such as a text label to be displayed for the badge, an image to be selected for the badge, shape, theme, and colors to be selected for the badge, and the like. Thus, a configuration user can define any characteristic to be associated with a badge to distinguish the badge from other badges and to provide customization of the look and feel of the badge.

In addition, a created transformation button 820 is also provided that can be selected by a configuration user to add a transformation for the badge. The transformation can include one or more conditions or rules that transform incoming visitor data collected by the visitor data collector 244 into data that represents the attribute shown. In particular, in the depicted embodiment, the rules can transform visitor data into an indication of whether a visitor should be assigned the "Window Shopper" badge. The transformations may be performed by the visitor data aggregator 246 of FIG. 2, which can aggregate the data and transform the data into a useable format according to the one or more conditions or rules specified in the transformation. By selecting a finish button 830, the badge attribute can be created.

If the created transformation button 820 is selected, a popup box (not shown) can provide options for either assigning a badge based on a set of conditions or removing a badge from visitors when those conditions no longer apply. Other conditions for assigning the badge to the visitor can include when the visitor is a new visitor or when it is a new visit or upon any page event or the like.

Figure 8B:
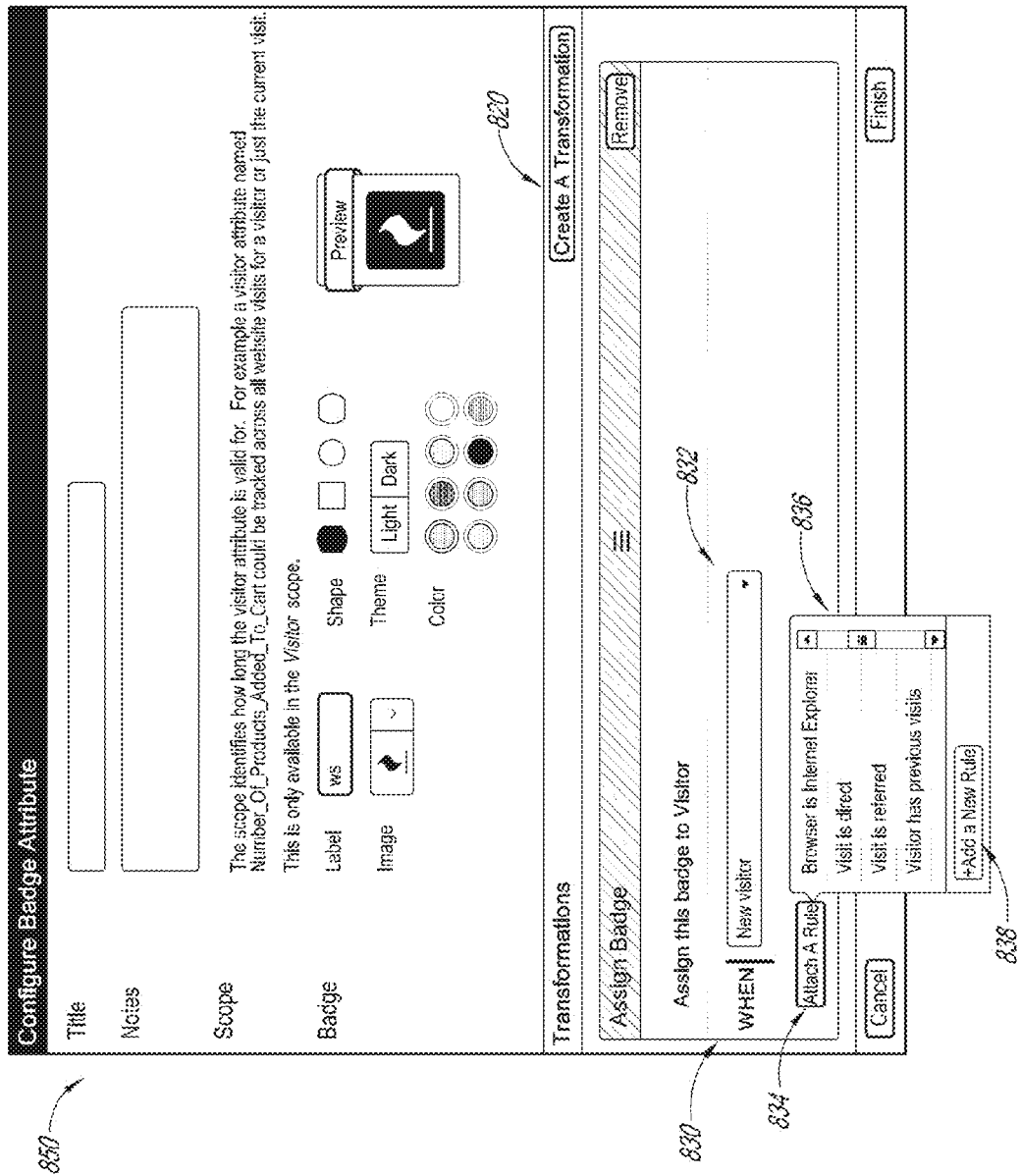

If a user selects to assign a badge from the popup box, a user interface such as user interface 850 of FIG. 8B can be displayed. In the user interface 850 of FIG. 8B, an example transformation 830 is shown. The example transformation 830 includes an example condition 932 that assigns this badge to a visitor when a visit has ended. Additional rules may be specified for triggering the assignment of this badge by selecting an "attach a rule" button 834. Upon selection of the attach rule button 834, a list of rules 836 can be displayed, from which a user can select to attach to the transformation. Some example rules are shown in the list of rules 836, including "visit is direct," "visit is referred," and so forth. Other rules may be selected by scrolling down through the list 836. These rules may be created by accessing the rules option 614 of FIG. 6, for example, as described in greater detail with respect to FIG. 18A below.

Rules can also be created by selecting an "add a new rule" button 838. Selection of this button 838 can cause a user interface 900 shown FIG. 9 to be displayed. (A similar interface can be selected from FIG. 6 to create a new rule; see FIGS. 18A and 18B) In the user interface 900 of FIG. 9, a new rule creation box is shown that includes options for creating a new rule, including a text box 910 for titling the rule. In this particular embodiment for the window shopper badge, a user has created a title "Did not purchase this" for this rule. One or more conditions 920 can be selected for the rule. The condition 920 shown is an "if" condition and includes subconditions 922, 924, 926, and 927. The subconditions include a dropdown box 922 for selecting an attribute (see also FIG. 18B). Any attribute available in the attribute list 620 of FIG. 6 can be selected or a new attribute can be created (see FIG. 18B). A dropdown box 924 includes options for comparing the attribute selected in the box 922 with some value selected from box 926. The value selected in box 926 can be an attribute, such as a metric, or some custom value that can be specified in box 927. Controls 928 are provided for adding (or removing) additional conditions to the "if" statement. An "add or condition" button 929 may also be selected to add a Boolean "OR" condition to the rule.

Figure 9:
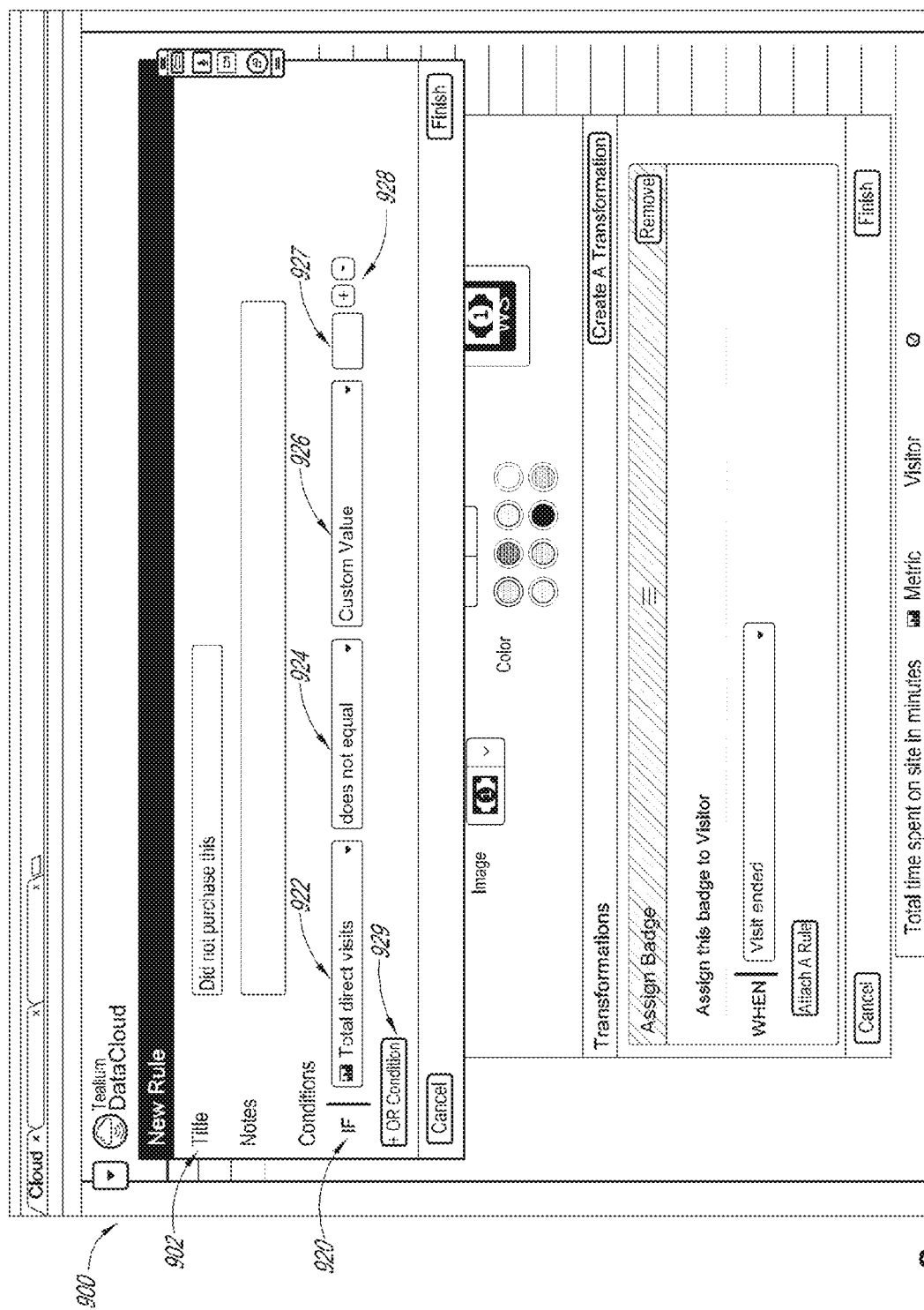
Figure 10:
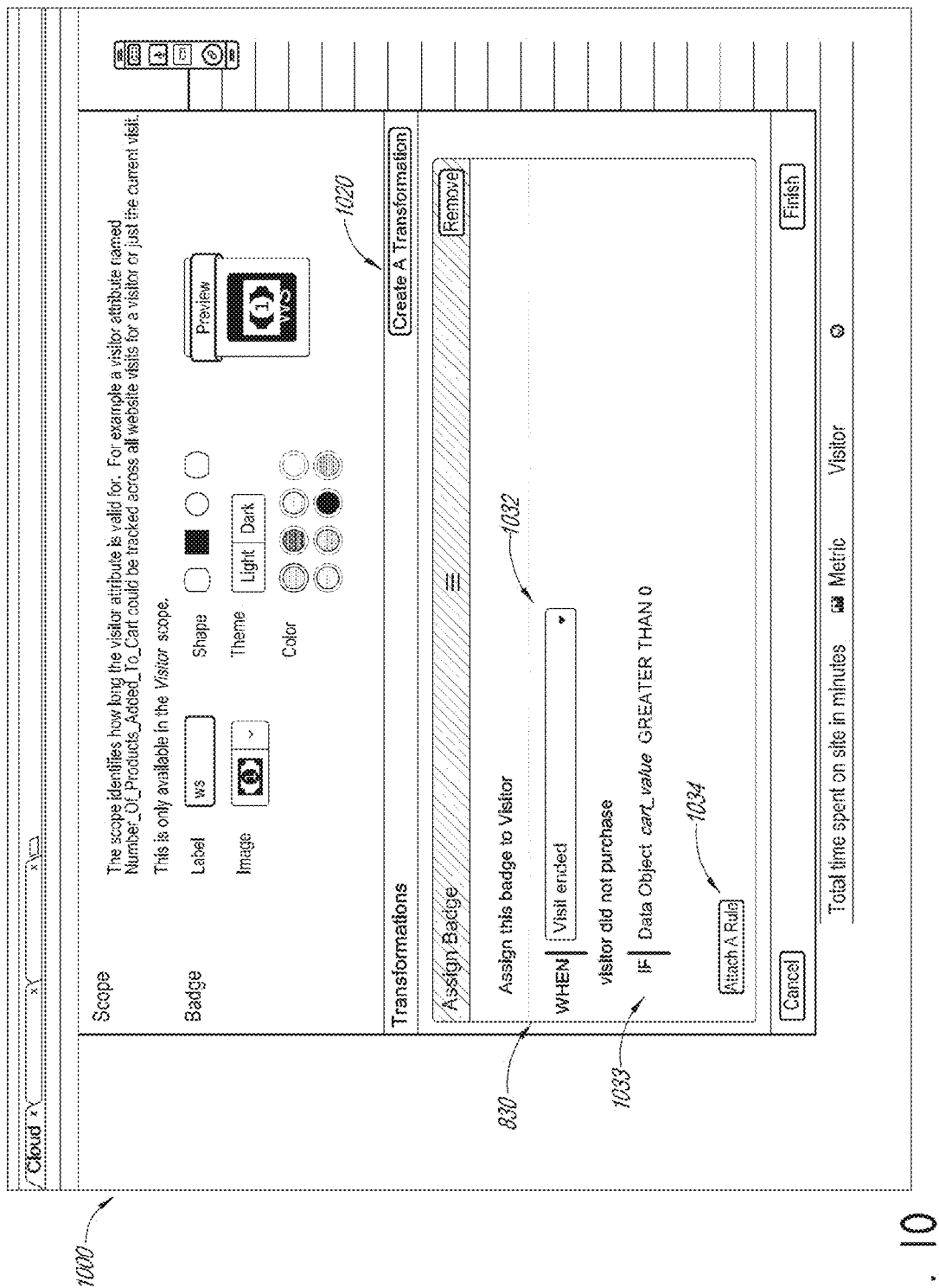

Referring to FIG. 10, a user interface 1000 is shown in which an example rule has been attached to the transformation 830 for the "Window Shopper" badge of FIG. 8B. The rule 1033 is entitled "visitor did not purchase." This rule is triggered if the data object "cart_value" is greater than zero. This rule may have been created using the user interface 900 of FIG. 9 to specify that the data object "cart_value," selected from the dropdown box 922, is greater than (box 924) a custom value (box 926) of zero (text entered into box 927).

Thus, in certain embodiments, the badge window shopper created in FIGS. 8 through 10 can be assigned to a visitor when a visit has ended and if the visitor did not purchase as specified by the rule 1033. Of course, additional rules may also be attached to any badge attribute to create a more complex set of conditions or rules that would trigger the badge being assigned to a visitor. Likewise, similar sets of one or more rules or conditions can be attached to a badge attribute to remove or deassign a badge from a visitor.

b. Example Attribute Creation—Other Attributes

Figure 11:
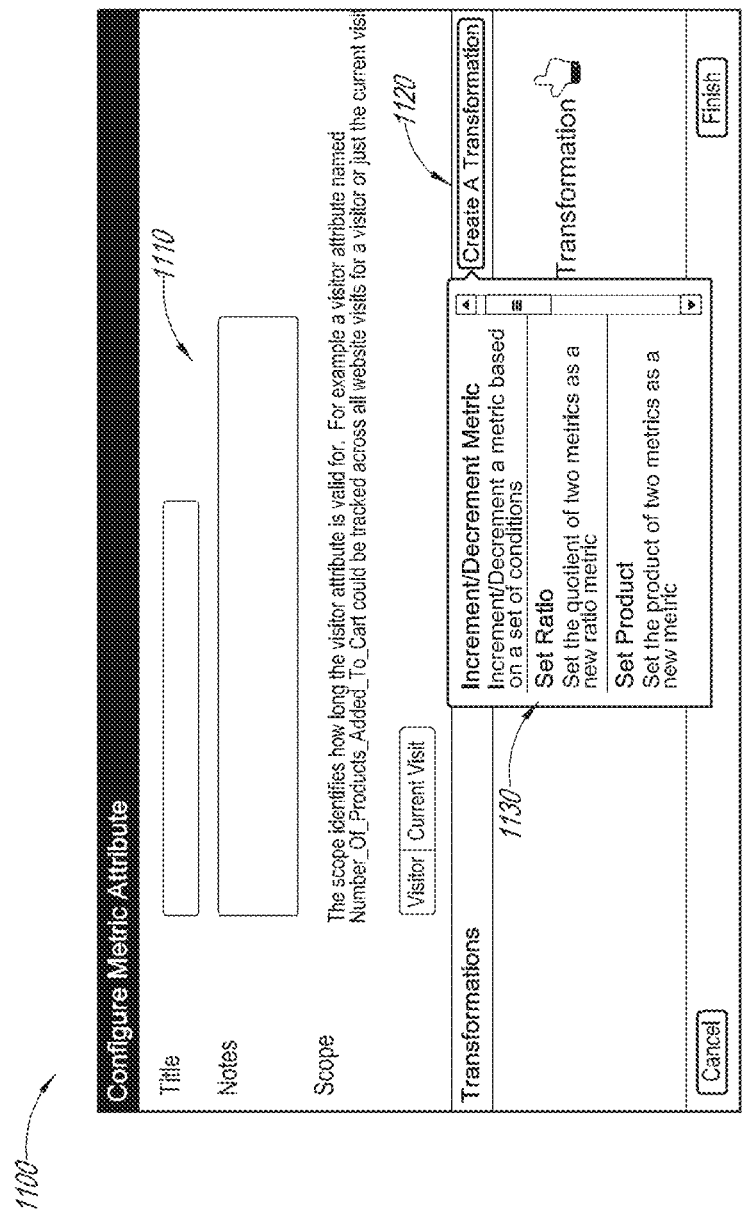

FIGS. 11 through 17 illustrate example user interfaces for creating other types of attributes. Referring specifically to FIG. 11, an example user interface 1100 is shown for configuring a metric attribute. As described above, metric attributes can store numerical data about a user visit or collection of visits. In addition, metrics can perform operations on numerical data to produce new metric values, for instance by performing transformations, much like the transformations that were discussed above with respect to the badge attribute. The user interface controls for configuring the metric attribute are similar to the user interface controls for configuring the badge attribute in some respects including, for example, controls 1110 for creating a title and entering optional notes about the metric attribute. In addition, a scope selector 1112 allows the scope to be identified for this metric attribute as being either associated with the visitor (e.g., over a collection of the visitor's visits) or for the current visit that the visitor has with the content site. Attributes created with the "current visit" scope can be triggered within each individual visit, as opposed to over several visits in some embodiments.

A "create a transformation button" 1120 may be selected by the user to create transformations. Upon selection of this button 1120, a select box 1130 is shown giving options for creating different types of transformations to associate with this metric attribute. These types can include an increment or decrement metric that increments or decrements a metric based on a set of conditions. For instance, a visit count can be a metric that uses the increment transformation such that each time an end user visits a content site, this metric is incremented by one to produce a total visit count over the lifetime of the visitor. Other metric creation options in the select box 1130 include a set ratio metric or transformation that can set the quotient of two metrics as a new ratio metric; a set product transformation that can set the product of two metrics as a new metric; a set difference transformation that can set the difference of two metrics as a new metric; a set sum transformation that can set the sum of two metrics as a new metric; set metric transformation that can set the metric to a specific number; and a set difference between two dates transformation that can set the difference between two dates as a new metric. These transformations are examples and may be further combined, for example, by creating both a product and a sum, or both a quotient and a difference, or any number of different operations to create a single metric from a plurality of data inputs related to visitor data.

Although not shown, a similar user interface could be used to define a metric set. Metric sets can include a set of metrics that is dynamic in nature, in contrast to metrics, which may be static in nature. An example of a static metric is "time on site," which can represent the amount of time a user spent in a browse session on a content site. A metric set can grow over time with name-value pairs that represent changing metrics with respect to user visit behavior. For example, a metric sent might include an array of times to be collected, such as "time-spent["football"]=120 minutes, time-spent["baseball"]=60 minutes," etc. The values in a metric set may be determined at runtime, rather than during configuration, although the opposite may be true in some embodiments.

Figure 12:
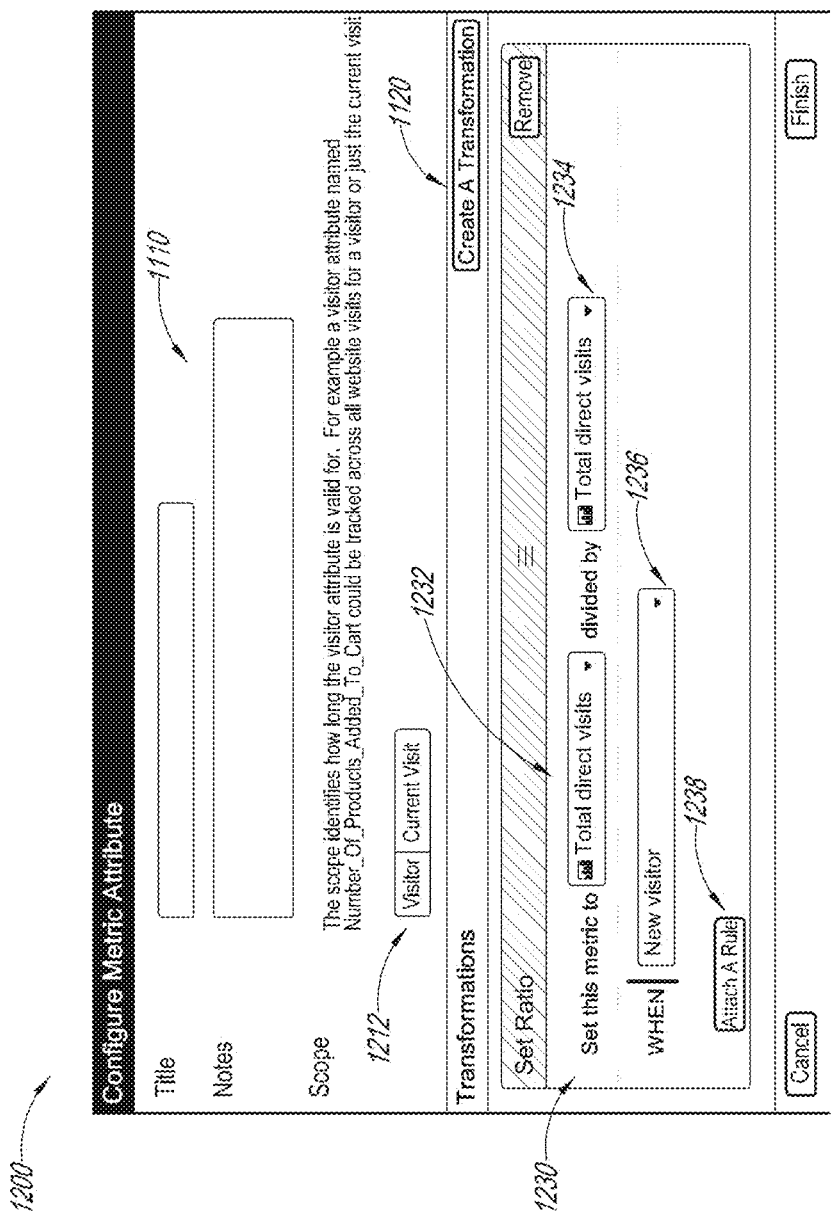

For instance, as shown in FIG. 12, an example user interface 1200 depicts a transformation 1230 selected from the create a transformation button 1120 to set a ratio. In the depicted embodiment, the options 1230 enable a metric to be set to a first attribute value 1232 selected from a dropdown box divided by a second attribute value 1234 selected from a dropdown box, when a certain triggering event occurs selected from a dropdown box 1236 (such as when the visitor is a new visitor or when the visit ends, etc.). Likewise, a rule 1238 can be attached to the metric to apply further processing or configuration to the metric. Rule creation using the attach a rule button 1238 can be similar to rule creation described above and below with respect to FIGS. 18A through 20.

Figure 13:
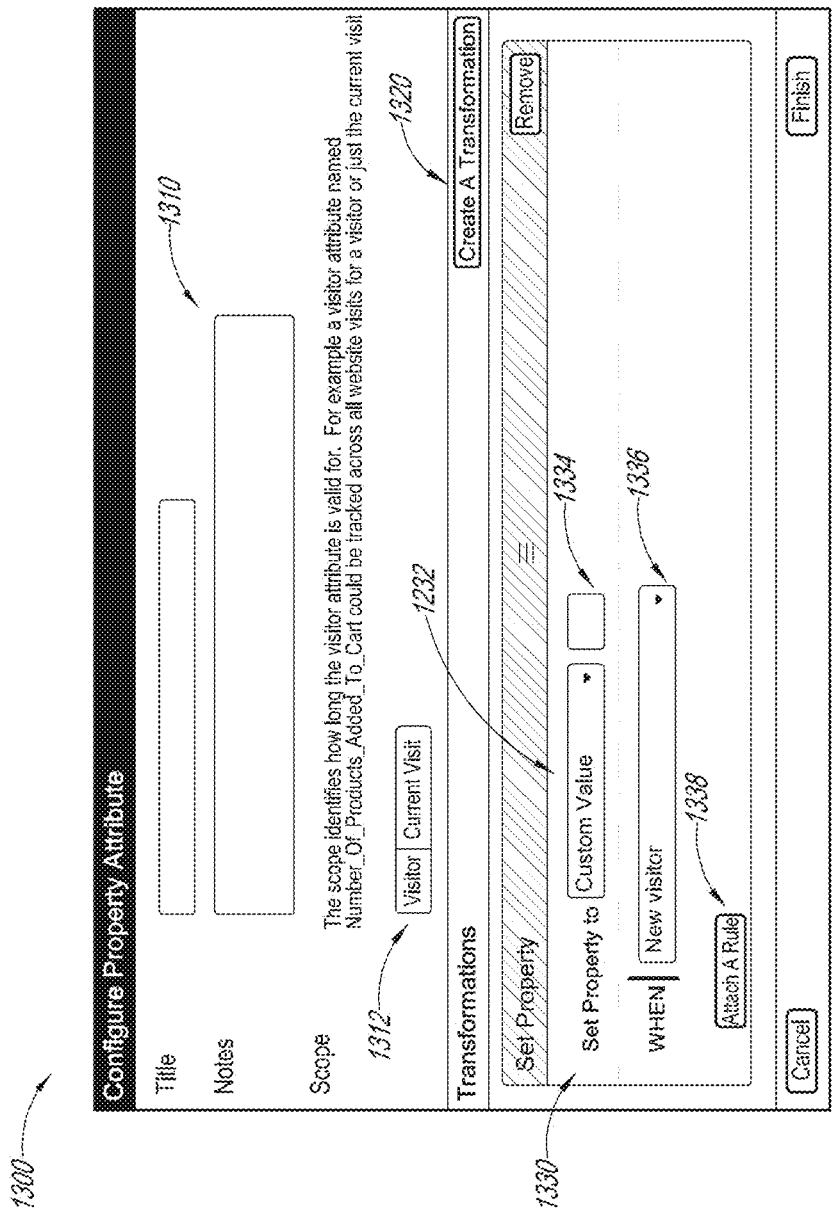

FIG. 13 depicts an example user interface 1300 for configuring a property attribute. The user interface 1300 is similar to the other user interfaces described above for creating or configuring attributes. For example, the user interface 1300 includes options 1310 for adding a title and optional notes to associate with the property attribute as well as scope buttons 1312 to determine the scope of this attribute. Upon selection of a creative transformation button 1320, transformations 1330 are shown. One or more transformations can be created for this attribute similar to the other attributes described above. The transformation 1330 provides options to set a property to a custom value or another value defined elsewhere in the visitor processing system. For instance, data sources can be specified that are provided in the content site's content pages (see, e.g., FIG. 23). These data sources can include, e.g., a user name of the visitor, page name, cart value for an electronic shopping cart value, or any other piece of data which the content page wishes to define and track. The property attribute can be set to this particular value specified by a data source or any other attribute via the transformation 1330. As a result, the property attribute can be stored and also operated upon by other attributes or rules. As an example, a "cart_value" property attribute can be checked by a rule in a "Window Shopper" badge attribute to determine whether a user ever purchases items or is merely just looking. Likewise, properties may be used to filter segments or otherwise arrange results in a reporting user interface (see, e.g., FIG. 21).

Although not shown, property sets can be configured similarly. The attribute of a property set can contain more than one assigned string property value. If a property (not a property set) called "category" is set to "football" (e.g., representing a football-related link selected by a user) and is then set again to "baseball" (e.g., representing a similar link), the result may change from "category=football" to "category=baseball." Each of these properties is a string. In contrast, as property set called "category" can be first set to "football," with the result that "category=[football]," and can then be set to "baseball," with the result that the string "baseball" is appended to the property set such that "category=[football, baseball]." Property sets can be used to detect correlations in visitor data, such as whether a visitor selected links related to both football and baseball within a visit (or multiple visits) to a content page.

Figure 14:
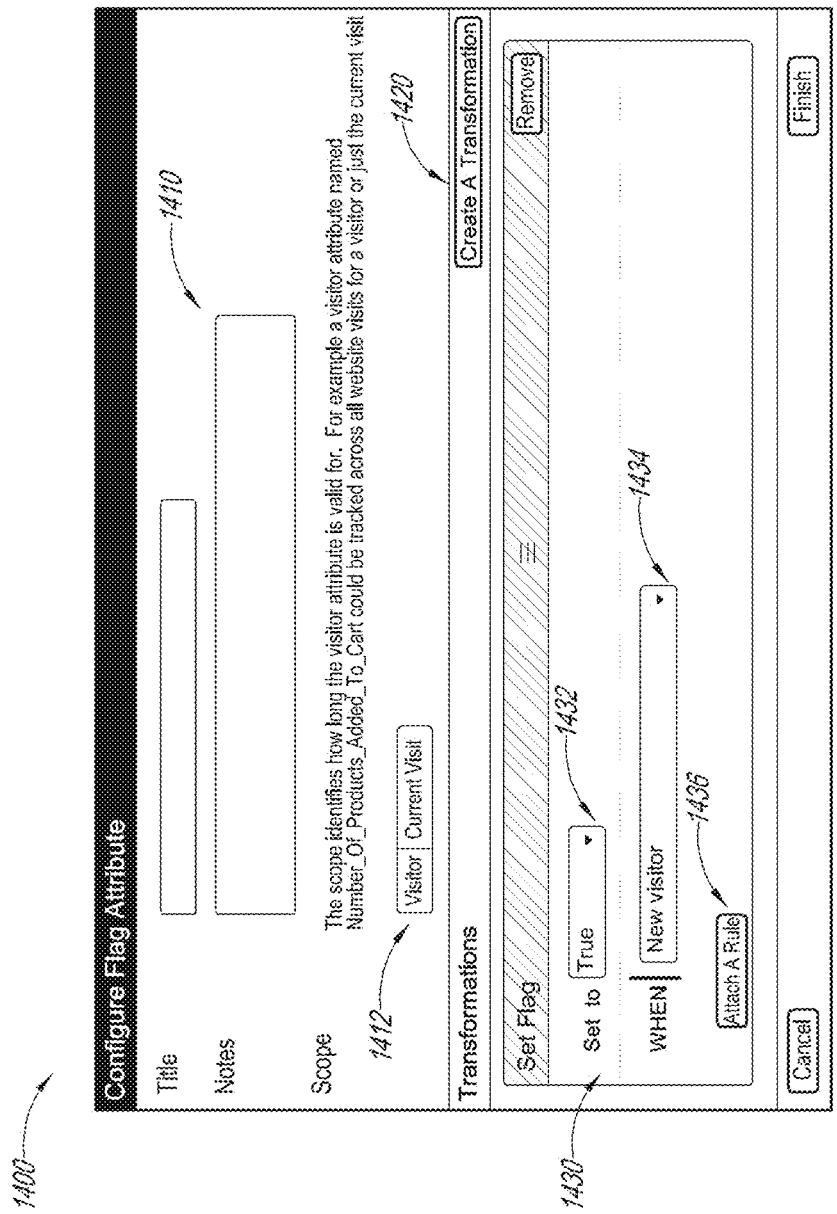

In FIG. 14, another example user interface 1400 is shown, which can be used to configure a flag attribute. The user interface 1400 also includes options 1410 for assigning a title and optional notes to the attribute as well as a scope button set 1412 to define the scope of the attribute. A create a transformation button 1420 is also shown, which can allow one or more transformations to be created. An example transformation 1430 shown can allow the flag to be set to a Boolean value such as true or false when a triggering condition or conditions occur, as defined by the dropdown box 1434, and optionally when one or more rules are satisfied as may be defined by attaching a rule 1436. In a simple example, the flag attribute may be a new visitor attribute and may be assigned when the condition of a new visitor being detected occurs. In another example, the flag attribute may be titled "added item to cart" and may be triggered when the condition of a visitor adding an item to a shopping cart has occurred. This condition may be detected by a rule that detects when their cart value associated with the visitor is greater than zero.

Figure 15:
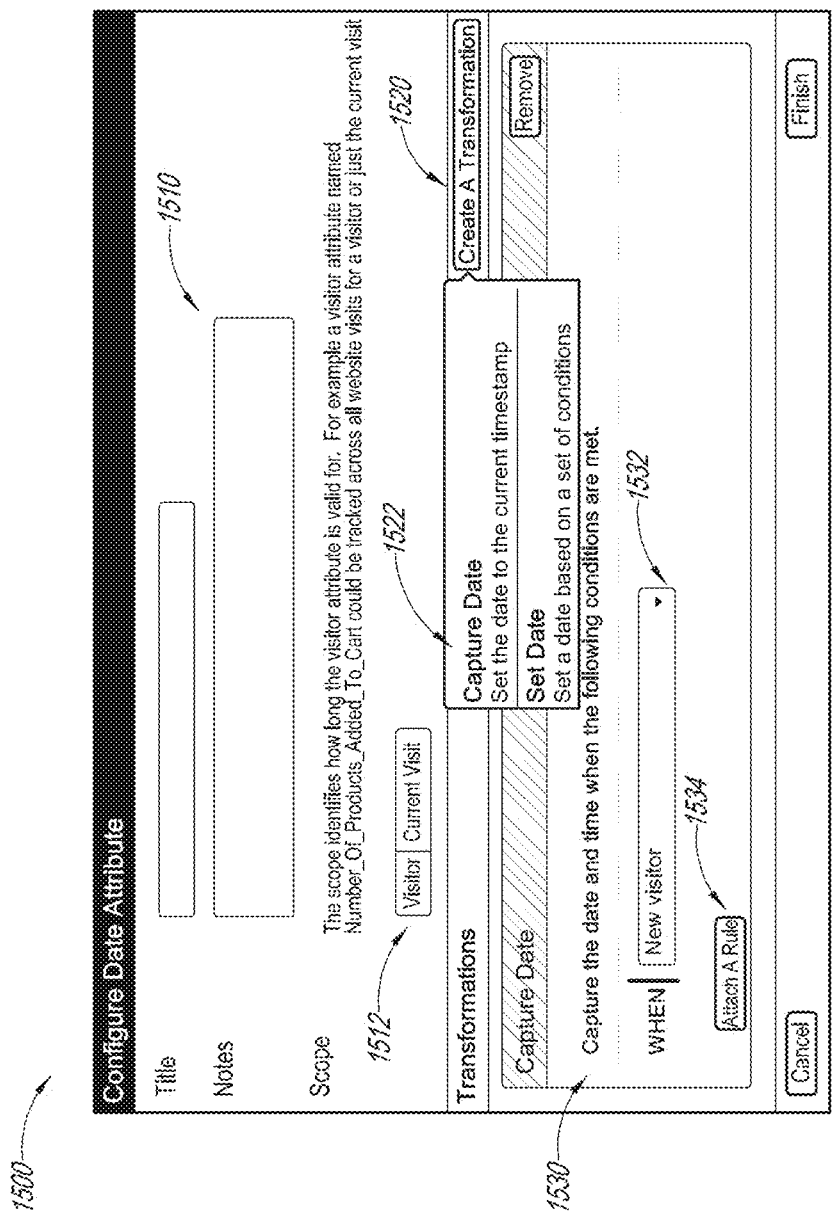

Turning to FIG. 15, an example user interface 1500 is shown for configuring a date attribute. Options 510 are provided for specifying the title of the attribute and optional notes are shown as well as scope buttons 1512 for selecting the scope of the attribute. A creative a transformation button 1520 is shown, which upon selection, enables the user to select from an options popup box 1522 to either "capture the date" to set the date to the current time stamp or to "set a date" based on a set of conditions. In the "capture the date" transformation shown as example transformation 1530, the date attribute can capture the date and time when one or more following conditions are met specified by condition 1532, such as during a visit. A rule may also be attached using button 1534. Thus, the date and time may be captured, for instance, when a user adds an item to a shopping cart or clicks a certain link taking the user to a certain page, etc.

Figure 16:
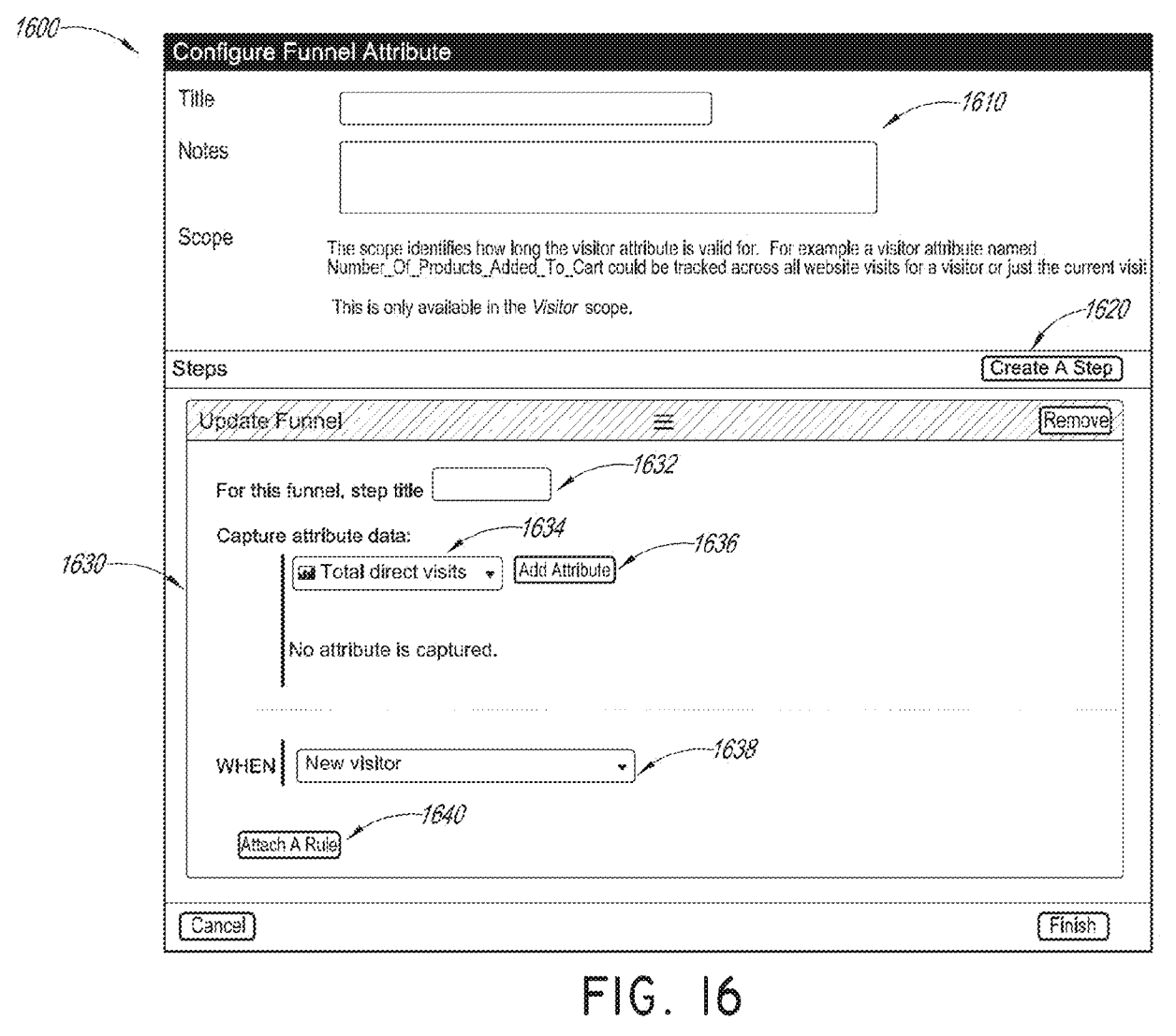

In FIG. 16, an example user interface 1600 is shown for configuring a funnel attribute. Option 1610 for assigning the title and notes are supplied in the depicted embodiment. Scope variables are not provided as the funnel attribute can be determined for a single visit. Alternatively, funnels can be determined from multiple visits. Create a step button 1620 is provided similar to the creative transformation buttons described above. A funnel may include a series of steps including one or more steps that, once satisfied, indicate that the attribute has occurred for a particular visitor. For instance, a funnel attribute can represent a series of steps taken by a visitor prior to (and optionally including) a purchase. Such a purchase funnel can be indicative of how close visitors come to purchasing items; visitors who make it further into the funnel come closer to purchasing, and vice versa.

One example step 1630 is shown to update the funnel, including options 1632 through 1638 for defining when the step has occurred. For instance, a text box 1632 is provided for specifying a title of the step, and a select box 1634 and attribute button 1636 are provided for adding attributes to capture related to the funnel. A condition box 1638 is provided for determining when this step is considered to have occurred. Further, a rule may be attached by selecting a rule button 1640.

In certain embodiments, funnels can provide for the configuration of an expected flow that has a known (or anticipated) start and end. For example, a shopping experience on an electronic commerce website can be modeled as a funnel attribute, with step 1 being viewing a product (e.g., any number of times), step 2 being adding the item to a cart, step 3 being to proceed to checkout, step 4 being filling out shipping information, step 5 including filling out billing information, and step 6 including confirming the order. The funnel attribute can allow the visitor to be traced through the funnel, providing a resulting report of where visitors fall out of the funnel (e.g., by stopping at a certain step in the funnel). This report may be useful to configuration users who wish to determine the conversion rate of end users, among other useful data.

Funnel attributes may be time-ordered, such that in order for a funnel to be associated with a visitor, the visitor must follow the steps of the funnel in order. Other configurations that are not based on time-ordering are possible. Data may be captured at each step of the funnel or at the end of the funnel. For instance, it may be useful to inspect the value of a shopping cart that a user abandoned midway into a purchase funnel. Other funnel attribute features can include the ability to make a step optional, meaning it can be skipped. In the example above, shipping is often skipped because the billing info often provides all the info needed for shipping.

Purchase funnels are merely one example use of funnel attributes. Other example uses for funnels include campaigns, flight check-ins, email sign-ups, or any other sequence of steps that use an online tool on the content site.

Figure 17:
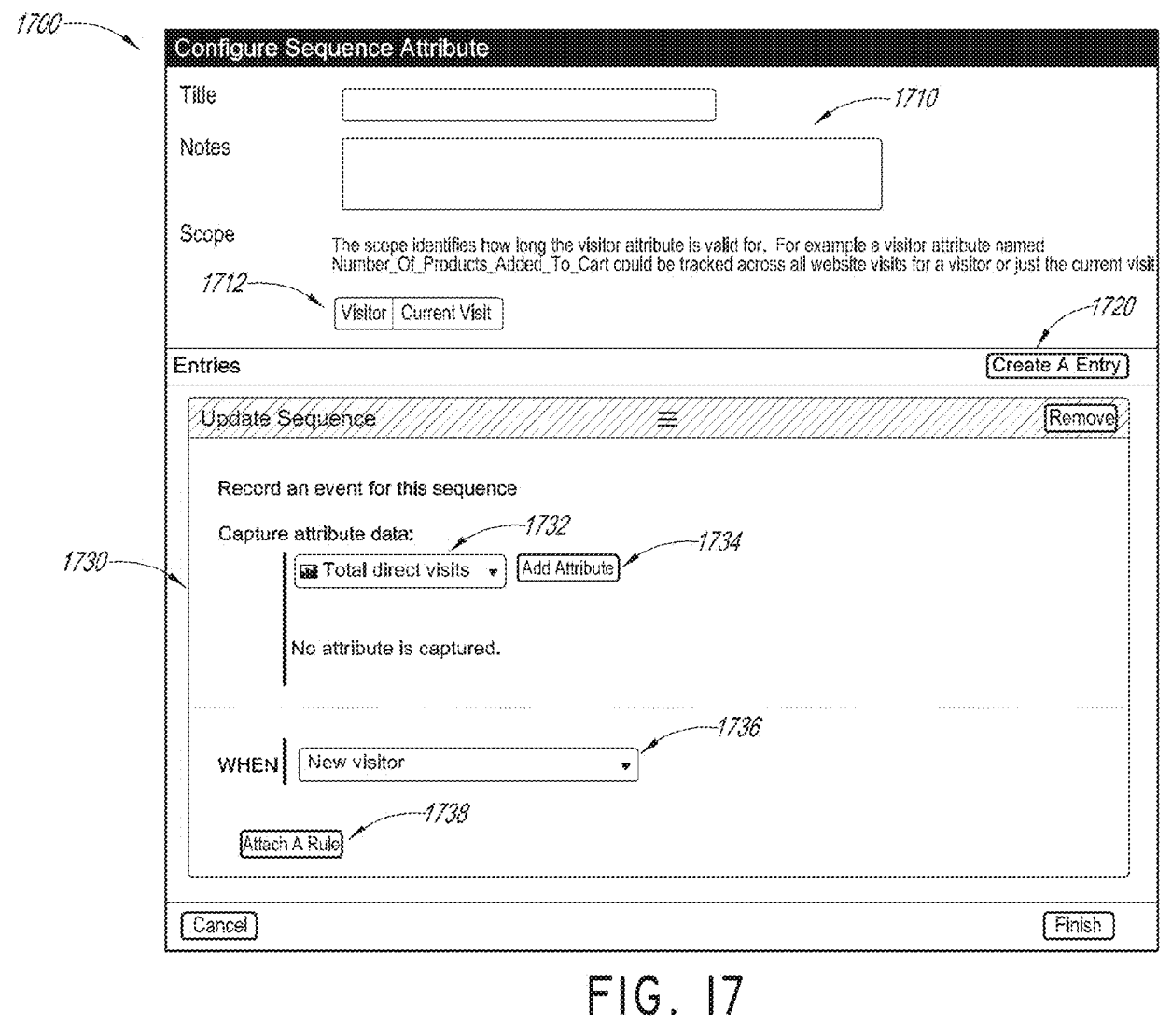

Referring to FIG. 17, an example user interface 1700 is shown for configuring a sequence attribute. The user interface 1700 includes option 1710 for specifying a title and optional notes and a scope button 1712 for selecting the scope. In addition, the user interface 1700 includes a button 1720 for creating an entry, which can be similar to the create transformation buttons described above. One or more entries may be created to update a sequence. An example entry 1730 is shown that records an event for the sequence. The entry 1730 can capture attribute data specified using a select box 1732 and add/or attribute button 1734 upon a condition occurring as specified by the dropdown box 1736. Optionally, a rule may also be attached 1738.

In contrast to funnel attributes, which may have a defined end-goal (such as a purchase), sequences can log or track more general data points, such as click actions or link selection actions of an end user. Sequences can provide a mechanism for logging significant visitor events as a historical trace, without the need to store all the data between the events. For example, an end user's purchase history with respect to an electronic commerce site can be represented by a sequence attribute. The purchase history sequence can include a list of the user's purchases but may not include, for example, each of the user links selected between purchases. Another example of a sequence can be a search keyword history that resulted in a user finding a content page. Yet another example can include a list of movies watched (e.g., in a Netflix™ queue), and the like. Events in a sequence may be associated with a timestamp so that later analysis of the sequence can compare timestamps of the events.

c. Additional Rule Creation Features

Figure 18A:
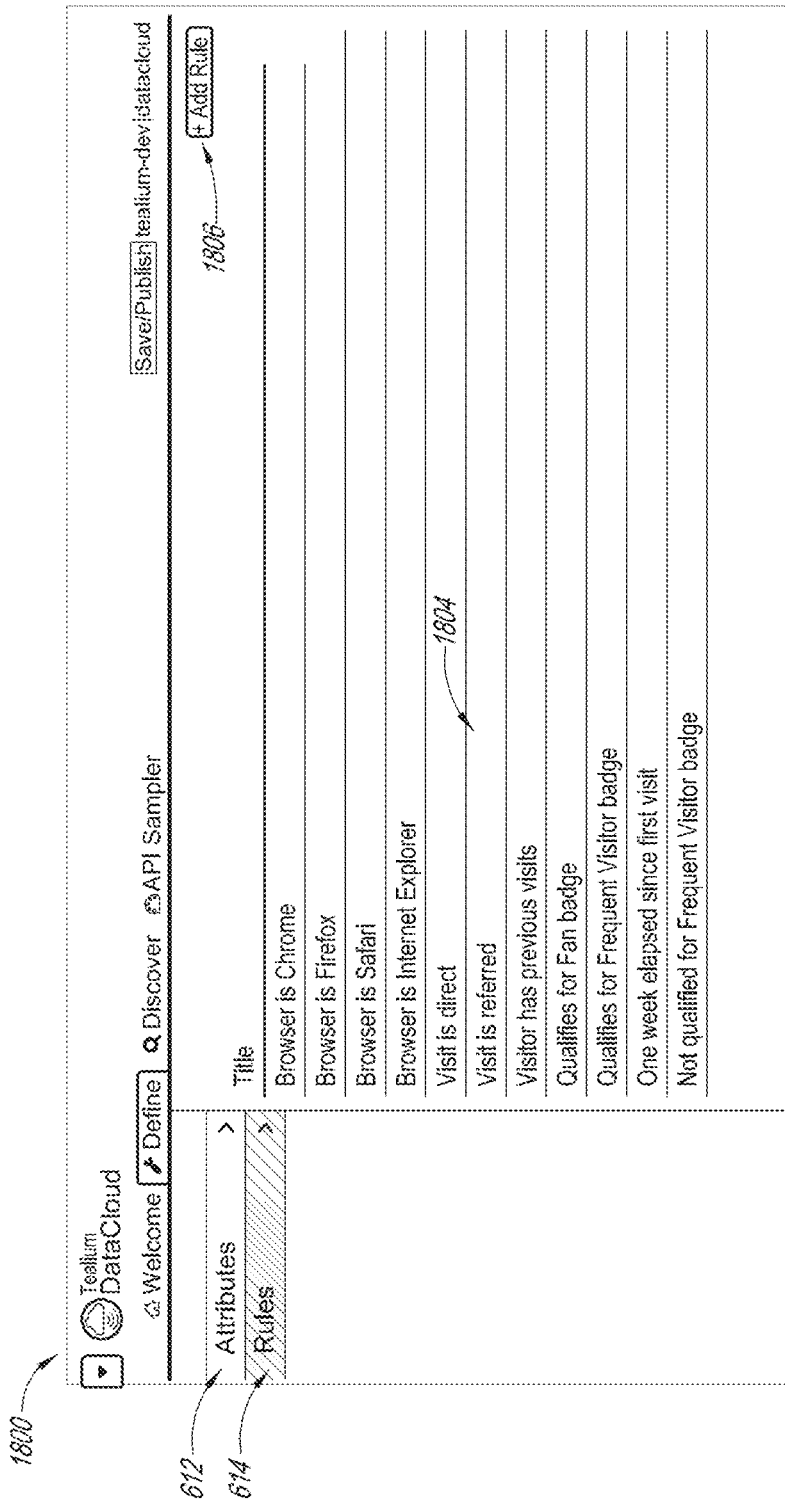

FIG. 18A shows another view of the example user interface 600 of FIG. 6. In particular, the user interface 1800 shows that the rules option 614 of FIG. 6 is selected. A set of rules 1804 is shown, which may have been created by the user or provided by the vendor of the visitor processing system. Each of the rules 1804 may be selected for customization by a configuration user. A new rule may also be created by selecting the add rule button 1806. Various features for creating rules have been described above.

Figure 18B:
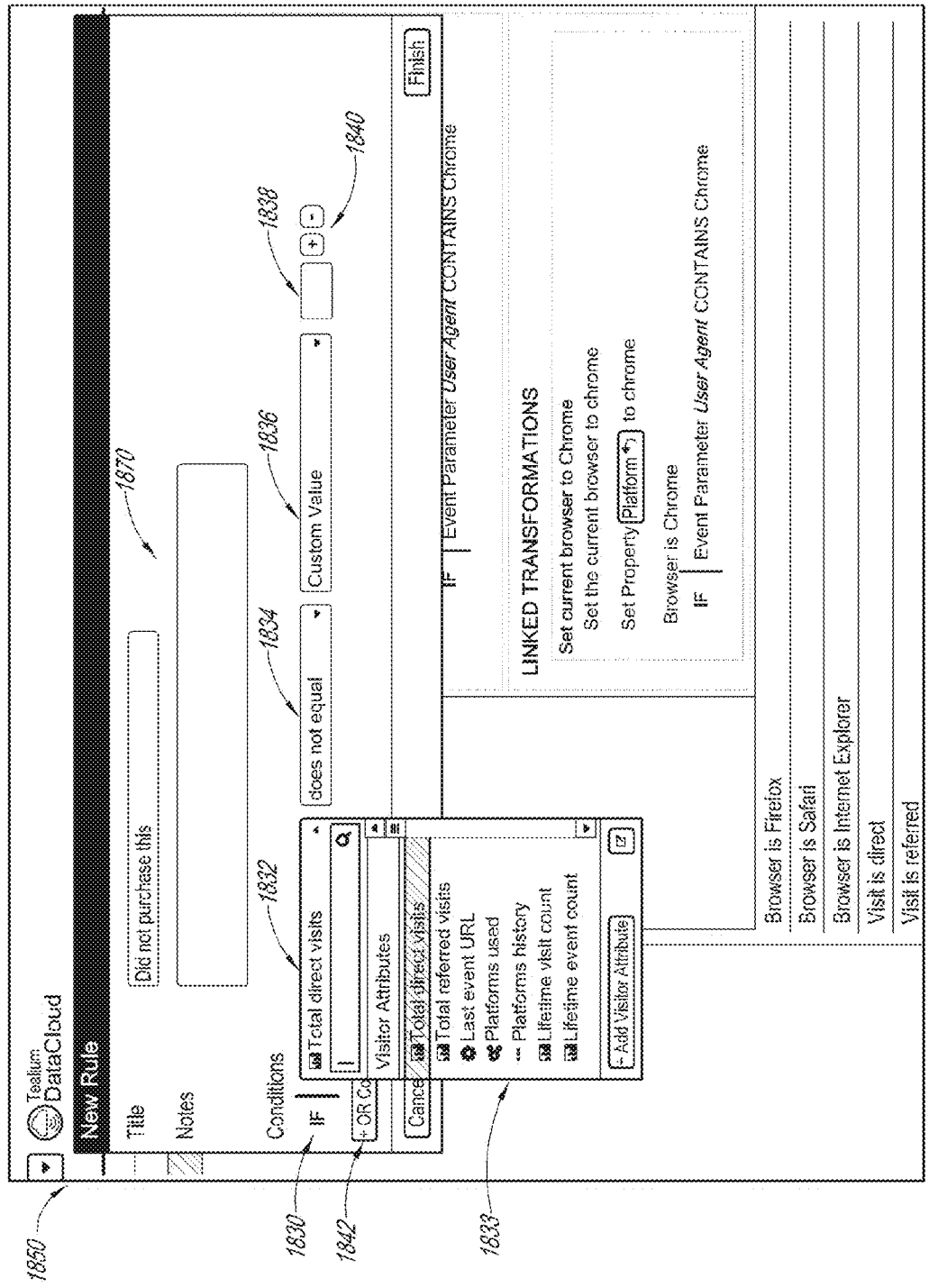

In addition, selecting the add rule button 1806 can show a user interface, such as an example user interface 1850 shown in FIG. 18B. The user interface 1850 provides options 1810 for titling and annotating a rule as well as conditions 1830 to specify for the rule. Selection of these conditions can include dropdown boxes 1832, 1834, and 1836 for specifying subconditions associated with the condition. An example list of attributes 1833 is shown, from which visitor attributes may be selected, data sources may be selected, or the like. Mathematical operators may be selected via the dropdown box 1834 to compare the attribute with a custom value as specified in the dropdown box 1836 or text box 1838. For example, an attribute may be selected from the dropdown box 1832 and compared with a metric or property that is defined elsewhere in the set of attributes described above. Select boxes 1840 can be used to add or take away conditions. An "add or condition" button 1842 can be selected to add one or more additional Boolean "OR" conditions.

Figure 19:
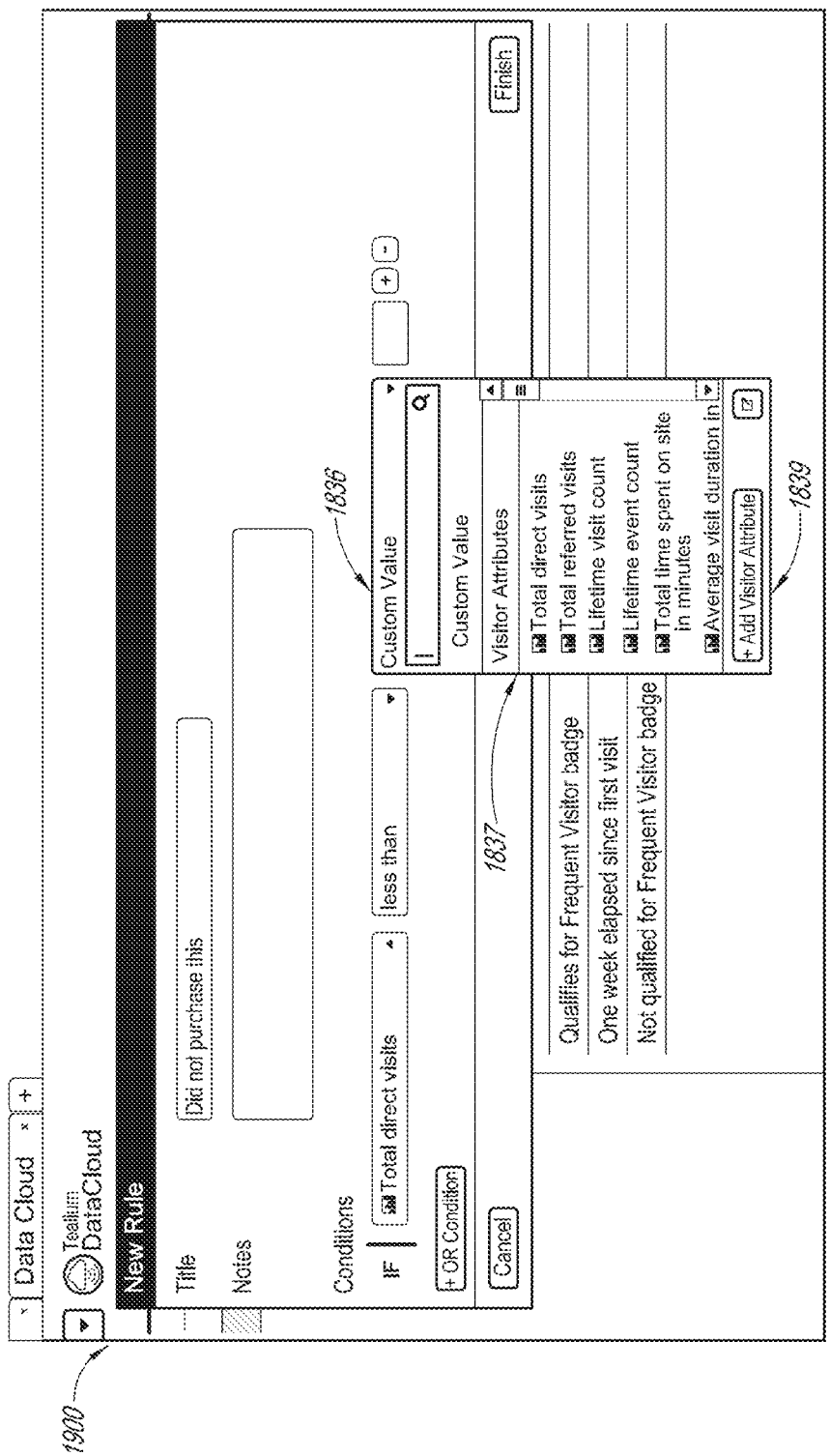

FIG. 19 shows an example user interface 1900 similar to that of FIG. 18B, depicting the custom value dropdown box 1836 selected to show various custom values 1837 that could be specified when creating a rule. In FIG. 20, an example user interface 2000 shows how attributes can be added from within the rule creation process with various attributes types 2010 being selectable. The user interface 2000 may be output for presentation to a user upon selection of an add visitor attribute button 1839 in FIG. 19 and may have similar functionality to the attribution creation user interfaces described above.

d. Example Report Generation Features

Turning to FIG. 21, an example reporting user interface is shown. In the example reporting user interface 2100, options are shown for filtering the various attributes that have been defined for visitors to produce a set of results 2140 that illustrate aggregations or segments of visitor profile data. The filters include metrics filters 2112 that enable a configuration user to select different metrics associated with visitors as well as flag 2114 and badge filters 2116. Other filters may also be included in other embodiments.

A user may select one or more of the metrics filters 2112 to adjust metrics associated with different users to be output in the reporting section 2140. In the depicted embodiment, these metrics include products purchased, orders placed, total visits, language, total purchase count, total purchase amount, and time of sale. These metrics may have been defined using the interfaces described above. Different slider selection tools 2111, 2113, and 2115 allow users to adjust the values of metrics data to be displayed. For instance, the slider 2111 depicts values for a total purchase count that may be selected. In this depicted embodiment, the user selected a total purchase count between 10 and 30 to thereby view a segment of visitors that purchased between 10 and 30 items. Likewise, the slider 2113 has been used to select a total purchase amount between values of 30,000 and 60,000. The slider 2115 shows the metric "time of sale" being selected between 10:00 a.m. and 5:00 p.m.

Within the flag filters 2114, various flags are shown such as "has made purchase," "emailed link," "retweeted link," and "returning visitor," as well as a number of times that those flags have occurred indicated by amount 2119. Check boxes 2117 next to the flags are provided for selectively selecting the flags to filter the output of the reporting area 2140. Similarly, check boxes 2117 are next to different badges in the badge filters 2116. Different badges are shown such as "VIP," "window shopper," "fan boy," and the like, next to amounts 2119 of visitors that have earned these badges or been assigned these badges. Any combination of the badges may be selected with the check boxes 2117 to filter the output of the reporting display 2140.

The output of the reporting display 2140 can also be adjusted by selecting the different perspective to show the reporting data from using a drop down box 2120 that shows (in this embodiment) that the perspective is from the point of view of flags. Thus, different bars 2141 in the reporting display 2140 reflect value amounts 2119 that different flags represent, such as "has made purchase," "emailed link," etc. A query is shown at the top represented by controls 2136 that represents the selections of the filters 2110 to filter the different flags. Each of the subaspects of the query can be deselected by clicking on X buttons 2137. In addition, selection of a particular bar of the bar graph 2142 can show snapshots 2150 of the metrics. The example reporting interface 2100 is illustrative only and may be varied considerably in other embodiments.

e. Example API Data Integration Features

Turning to FIG. 22, an example user interface 2200 is shown for integrating raw data output by the visitor processing system with third party vendor data or systems. The integration user interface 2200 can provide functionality for building a sample query using controls 2210 to query their live feed or other date ranges for data. Additional API access can be provided for developers of third party vendors to access the raw visitor data collected by the visitor processing system and processed using the transformations and rules described above.

The raw data may be used for more than just reporting, either by the visitor processing system itself or these third party vendors. For instance, the data output by the visitor processing system can be used for generating ads or ad campaigns, email campaigns, personalization including ads or recommendations or the like. For instance, in one embodiment the visitor processing system outputs a periodic feed (for example daily, monthly, weekly, hourly) of data from the visitor processing system to external vendors so that the vendors can use this data to update information about visitors. The data in the feed can be used to perform business intelligence, aggregate the data for long-term trends and trend analysis, and the like.

In yet another embodiment, the raw data or processed data output by the visitor processing system can be used to update the content site itself by personalizing the content of the content site based on the visitors and their attributes. For instance, a configuration user may create a "chatter" badge that is assigned to visitors who are influenced by chat because they tend to purchase items when they are using a chat function on the content site. If such a visitor comes to the content site, the content site can programmatically personalize itself to show a chat window more prominently for that particular visitor. As another example, if a visitor is assigned a VIP badge, the content site may not show ads to the user. If the user is a regular buyer, the content site may give a 10% discount offer to that user. As yet another example, if a badge "early adopter" is assigned to a visitor, the content site may show the latest electronic gadgets to the user or prioritize those gadgets in a display to a user over other gadgets or products.

f. Example Data Source Specification and Mapping Features

Referring to FIG. 23, an example data source user interface 2300 is shown. As described above, data sources may be accessed when creating attributes and/or rules to access data that is part of the content page or that is associated with the browser or end user system itself. These data sources may be specified by a configuration user associated with the content site so that the visitor processing system can be aware of these data sources and know to collect their data. For instance, if the content site is an electronic shopping site and has a shopping cart, and if one of its content pages has a "cart value" data source, the configuration user can use this user interface 2300 to specify that the cart value data source is available and should be obtained for analysis in the visitor data.

A button 2302 is provided for adding a data source. Upon selection of this button, a row can be added to the user interface 2300. Data inserted in the new row can be saved in computer storage, such as in a database. The row can include a text box 2310 for specifying the name of the data source, select boxes 2320 for specifying the type of the data source, and a description box 2334 providing a written description of the data source. The name 2310 in the text box 2310 can be the name of the data source used by the content site. Specifying this name can enable the visitor processing system to be aware of which variable or data source to look for when obtaining data using the tag container 114 and/or tag 118 (see FIG. 1).

The type of the data source identified in the dropdown box 2310 can be a data object that is associated with the page itself, it may be a JavaScript page variable or other script value associated with the page, a meta tag associated with the page, a query string parameter associated with an HTTP PUT or GET statement, or a cookie value that is associated with the end user system or browser. Other options are also possible. Thus, if the data sources are specified in the user interface 2300, the visitor processing system can obtain data from the specified data sources using an appropriate tag 118.

As shown in FIG. 24, a user interface 2400 for mapping the data sources can be used for some tags. The user interface 2400 shows example tags added to the tag server(s) 120 from third party vendors. In the depicted embodiment, these tags include a live person tag and a Google™ Analytics tag. Configuration details 2702 for the Google™ Analytics tag are provided and mapped data sources 2710 are also shown. The mapped data source functionality can be provided to enable a user to map the data sources defined in the user interface 2300 to a data source in the tag vendor's tag. However, in certain embodiments, such mapping is not performed by the visitor processing system for the visitor attributes and rules described above. Rather, the mapping may not be needed because the visitor processing system can collect all the data sources specified by the configuration user and can make these available in the attributes and rules configuration displays without further mapping required. Mapping may instead be used with such visitor rules and attributes in other embodiments.

g. Example Tag Management Template User Interfaces

Figure 25A:
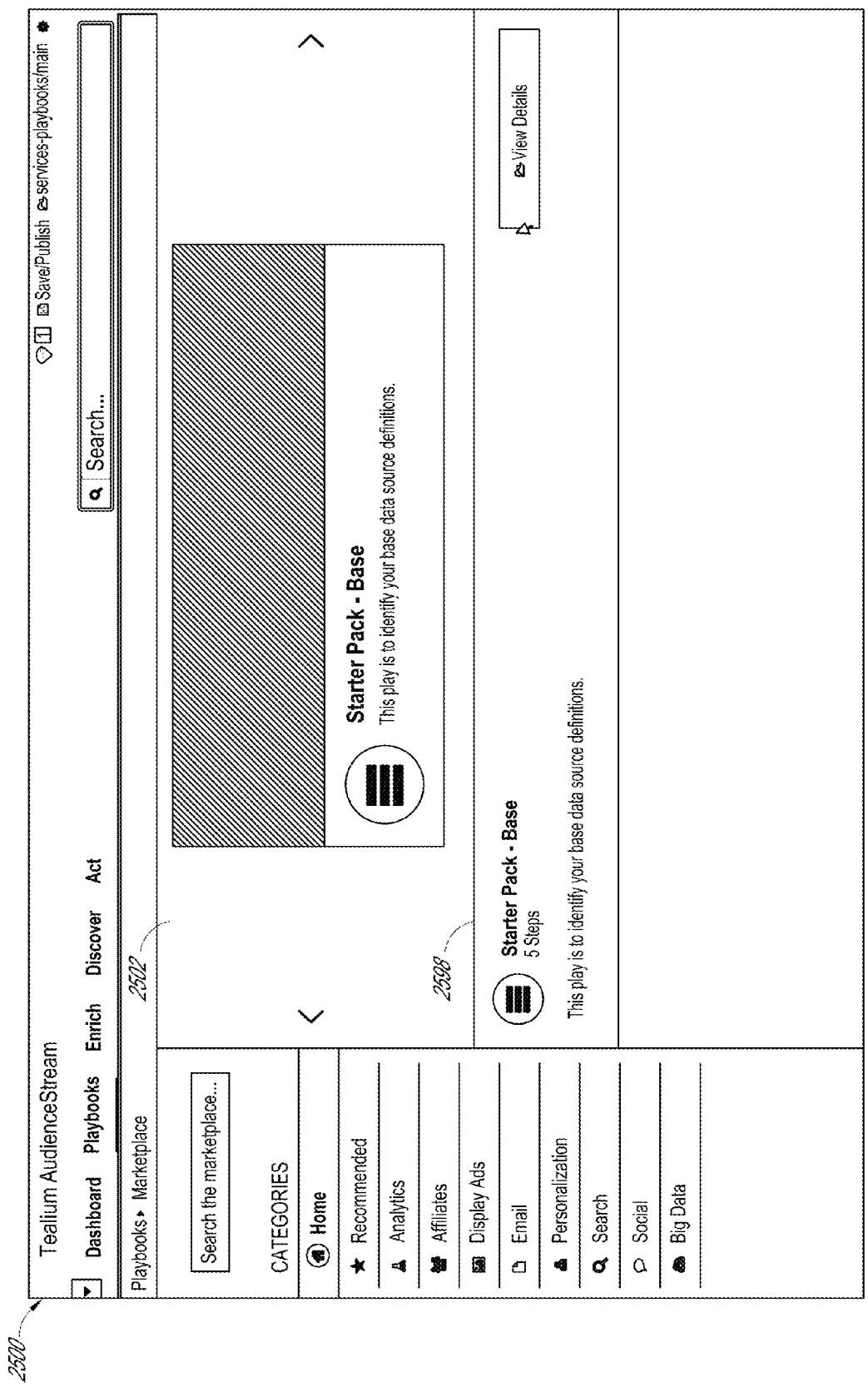

FIGS. 25A through 25I depict example user interfaces corresponding to a template implementation process that can be output by the tag management system 140. In FIG. 25A, the example user interface 2500 includes a template selection area 2502. As depicted, the template selection area 2502 includes a "Starter Pack-Base" template element 2598 that may be selected by a configuration user. The "Starter Pack-Base" template element 2598 may correspond to a template object, as described herein. The example starter template object may be configured to walk a configuration user through identifying back end configurations to configure their content site to track interaction data with the site. An advantage of the example starter pack, is that implementation of the starter template object may be configured to complete or to nearly complete other template objects, which thereby may reduce the configuration time for the content site. In FIG. 25B, once a configuration user has selected to implement the template, the user may be presented with an introduction user interface that indicates inputs or outputs of the template.

FIGS. 25C through 25G depict example prompts and elements of the template user interfaces. In FIG. 25C, the example user interface 2500 includes one or more prompts and one or more corresponding input elements. Generally, the example user interface 2500 of FIG. 25C may prompt the configuration user to identify particular parameters of a uniform resource identifier. For example, the prompts 2503A and 2503B request a configuration user to select a value for the page name attribute. In the example, a default page name option 2504 has already been prepopulated; however, a configuration user may select an alternate option via the dropdown element. The prepopulated value may be based on a pre-existing attribute, such as a pre-existing attribute that was created by another template implementation process or that was created individually by a configuration user. In some embodiments, prompts or user input elements that have an existing value may be suppressed in the user interface. For example, the tag management system 140 may determine a subset of user interface elements to present to the user based on pre-existing components of the template object already being completed or having a value. The tag management system 140 may use the user input such as variable mappings for the template object to generate output, as described herein. In FIG. 25D, the example user interface 2500 includes additional one or more prompts and one or more corresponding input elements. For example, the example user interface 2500 of FIG. 25D includes a prompt requesting user input for the page type of the home page for the content site and a corresponding text input element 2505. Example user input for element 2505 is the input value "home," which may be a textual string. Accordingly, the tag management system 140 may use the user input to generate interaction data associated with uniform resource identifiers (e.g., a uniform resource locator or URL) with the text "?page_type=home", for example. FIGS. 25E through 25G depicts additional one or more prompts and one or more input elements corresponding to example attributes such as end user related information and content site event-related information.

For example, in FIG. 25G, the depicted prompts and input elements relate to content site event-related information. Example content site events that can be identified by the corresponding user input include, but are not limited to, email signup, link selection, user login, user logout, user registration, user updates, file downloads, or playback of media content. As described herein, the input elements may correspond to portions of uniform resource identifiers including attribute pair values such as "?event=userlogout", "?event=userlogin", or "?action=registration," for example. Additionally or alternatively, the input elements may correspond to other methods of tracking in user interactions such as detecting one or more keywords or phrases in a content page or Document Object Model.

Figure 25H:
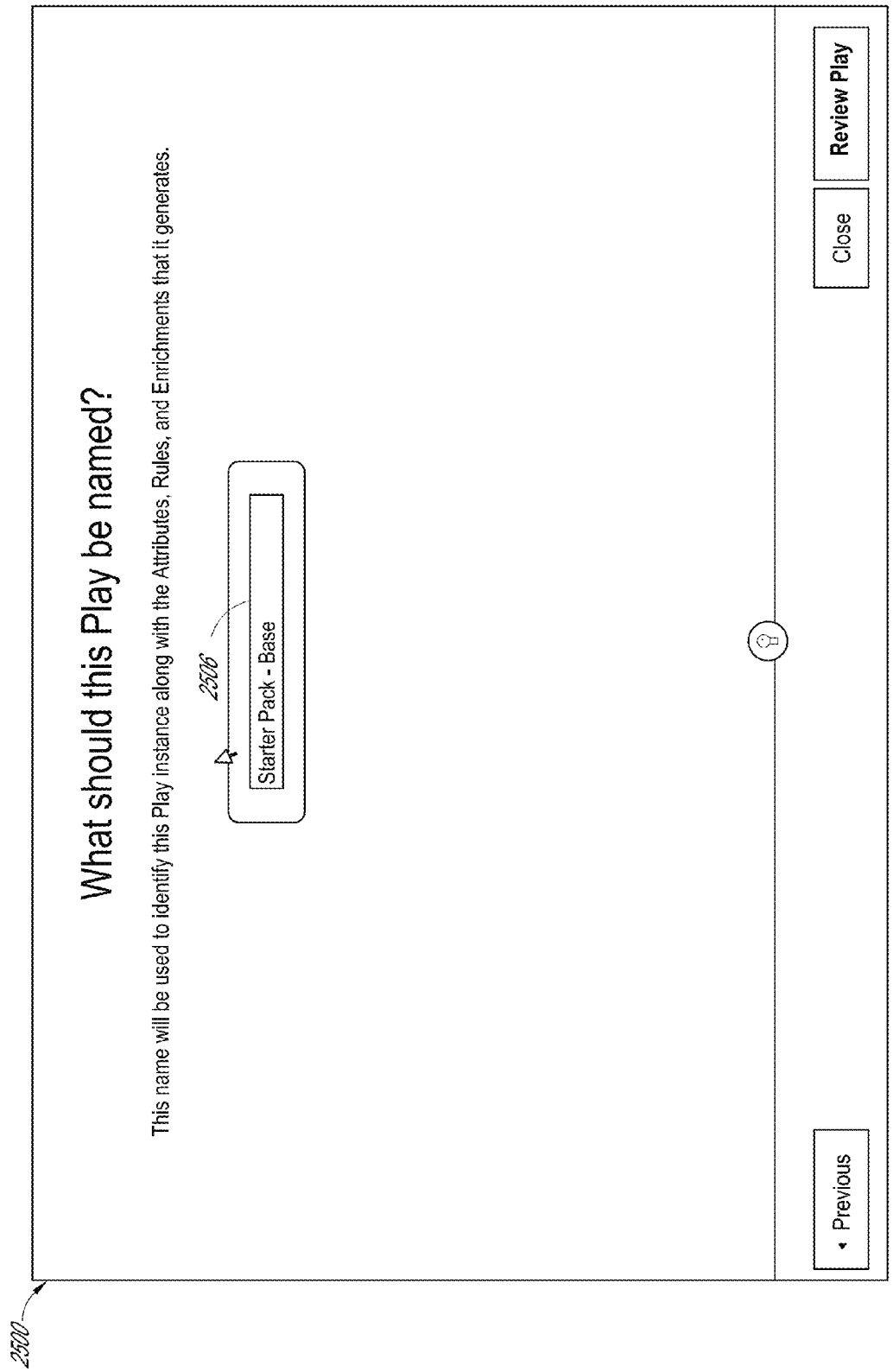
Figure 25I:
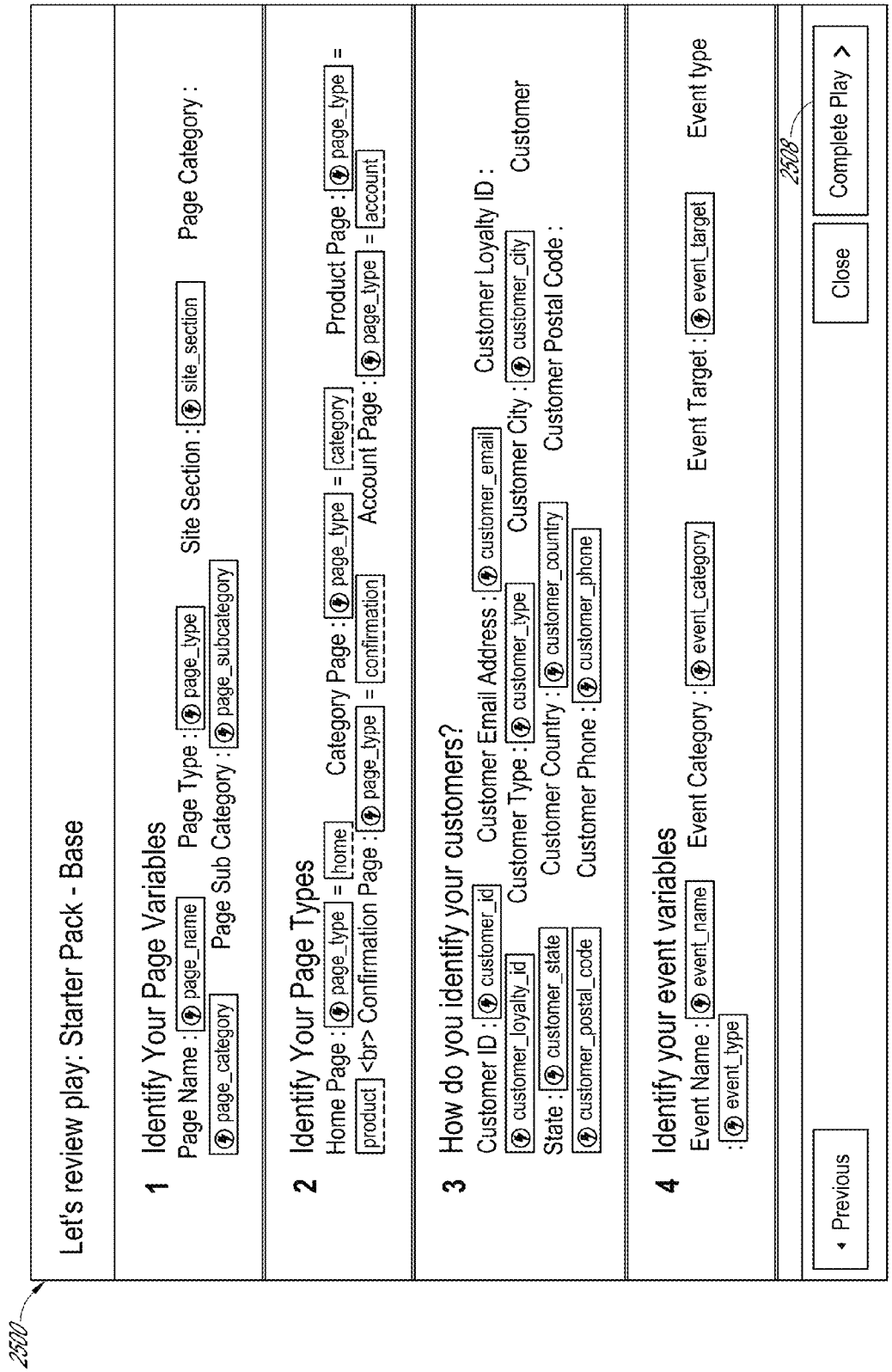

FIGS. 25H and 25I depict example prompts and elements to complete implementation of a template object. In FIG. 25H, the example user interface 2500 includes a naming input element 2506 for a configuration user to name their tag management object that will be generated from the corresponding template. In FIG. 25I, the example user interface 2500 provides a summary of the input values that the configuration user has specified through the template process and includes a complete element 2508 for the configuration user to select when ready to complete the implementation of the template object.

Figure 26A:
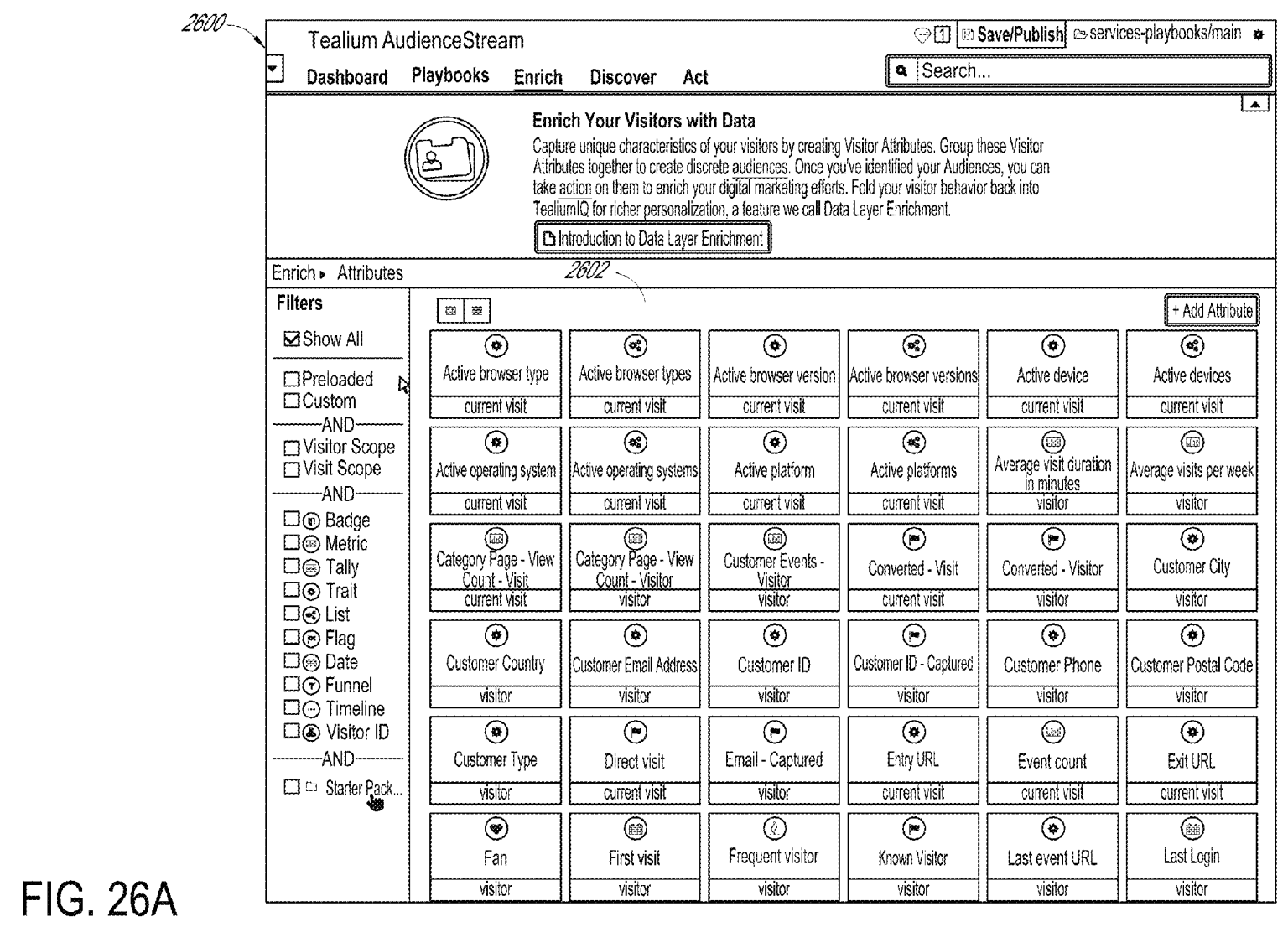
Figure 26B:
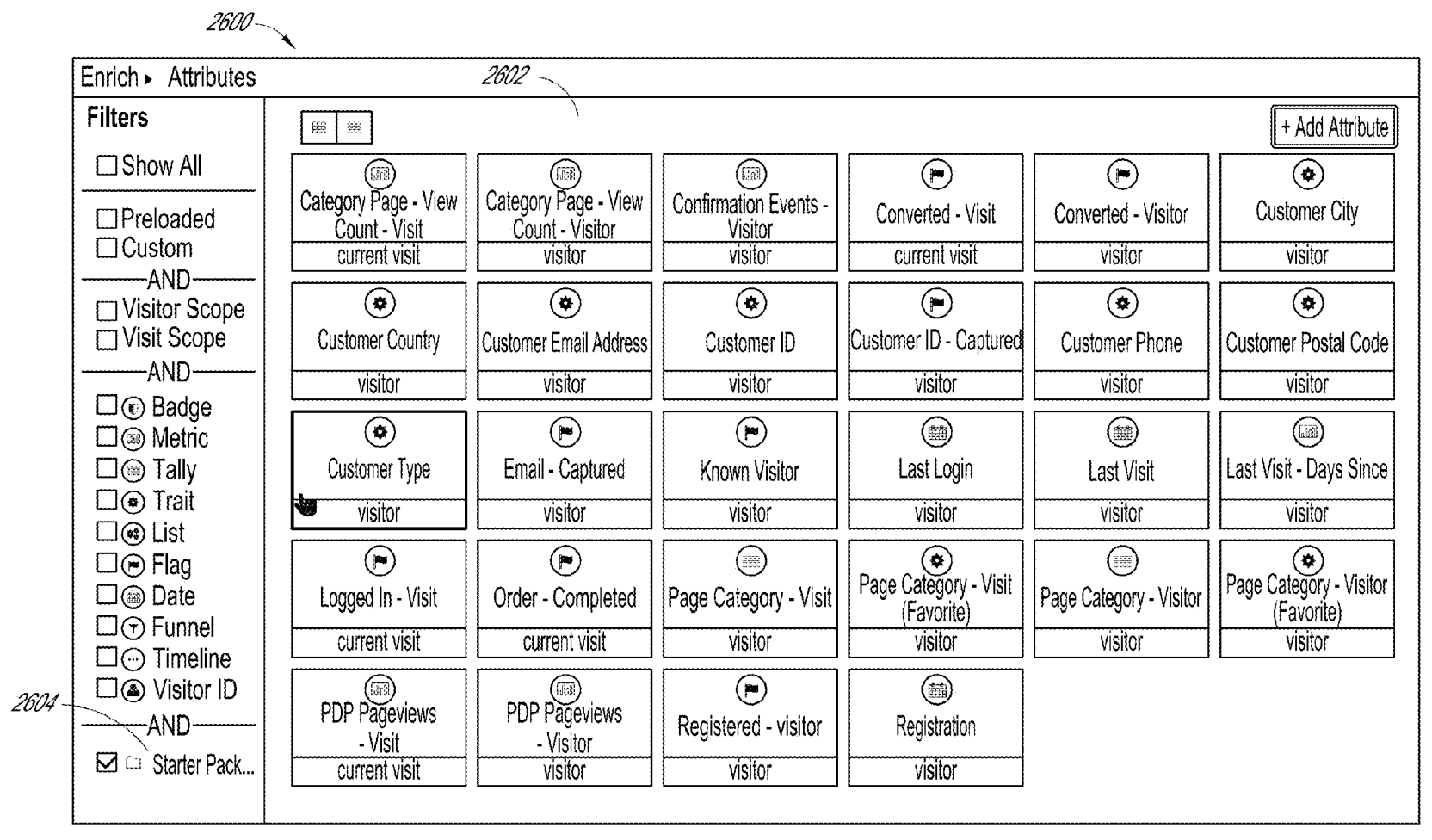
Figure 26C:
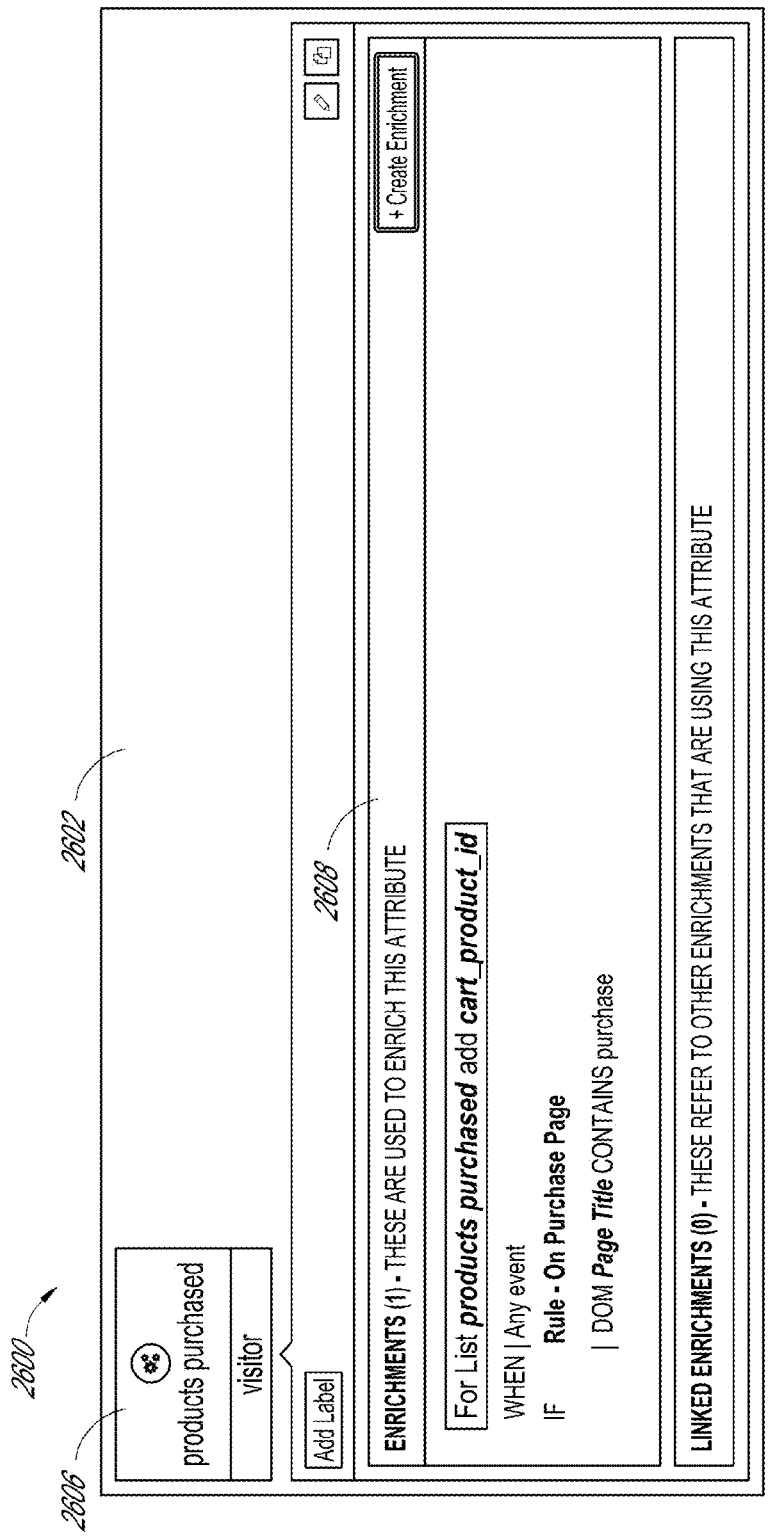

FIGS. 26A through 26C depict example user interfaces that may be available upon implementation of one or more template objects. In FIG. 26A, the example user interface 2600 includes an attribute summary area 2602. The example attribute summary area 2602 may present representations of configured attributes for a particular content site. As depicted, there may be many configured attributes for a content site such as hundreds of different attributes (or more) for tracking or processing interaction data. Example attributes that can be configured from the completion of one or more template objects include determining the end user's browser type, the end user's browser version, the end user's computing device, the end user's operating system, the end user's average visit duration in minutes, the end user's average number of visits per week, view counts of particular content site pages, or various other end user information or categorizations, such as being a first visitor or a frequent visitor.

In FIG. 26B, user selection of the template filter element 2604 may cause the attribute summary area 2602 to present attributes that were generated according to a template process such as the example process depicted by FIGS. 25A through 25I. Accordingly, the example template process, such as the Starter Pack template process, may generate numerous attributes. Example attributes that may be outputted by template process include metrics or tallies for one or more visitors such as a view count of a category page, total page views, confirmation events, or days since a last visit; traits such as end user preferences (e.g., favorite page category) or end user information-customer city, email address, social media identifiers, user name, identification number, phone number, postal code; flags or events such as logging in, completing an order, converting, registering; date information such as a date or timestamp or last login, visit, or registration. In some embodiments, a configuration user may select an attribute representation within the attribute summary area 2602 to view more information about a particular attribute.

In FIG. 26C, the example user interface 2600 depicts an example attribute that was the output of a template process. For example, the attribute representation 2606 may be selected within the attribute summary area 2602 to present the attribute detail area 2608. As depicted by the attribute detail area 2608, one attribute (of many that may be generated by a template process) may include instructions for determining summary data from interaction data. The example attribute instructions of within the attribute detail area 2608 indicate a product may be determined to be purchased if the page title, in a content page or Document Object Model, contains the text "purchase." Accordingly, the tag management system 140 may efficiently generate the attribute for a user that completes the template process without having to understand or construct the underlying instructions of various tag management configurations.

Figure 27A:
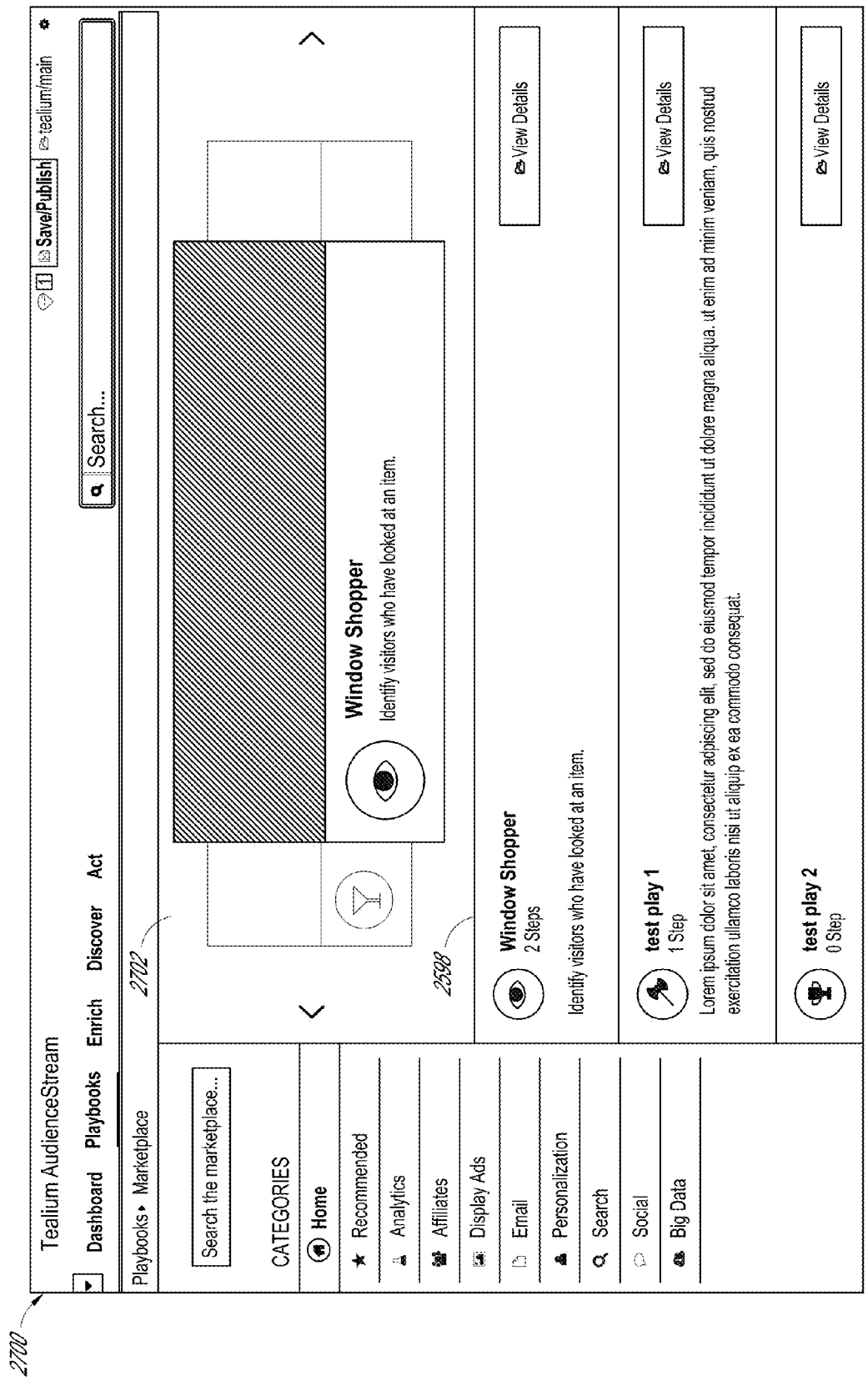

FIGS. 27A through 27M depict example user interfaces corresponding to another template implementation process that can be output by the tag management system 140. Aspects of the example user interface 2700 may correspond to a first template process that is a prerequisite to a second template process. In FIG. 27A, the example user interface 2700 includes a template selection area 2702. Elements of the example user interface 2700 of FIG. 27A may be similar to elements of the user interface 2500 of FIG. 25A. As depicted, the template selection area 2702 includes a "Window Shopper" template element that may be selected by a configuration user. Other example templates that may be selected through the template selection area 2702 include: "Identify Active Shopper," "Set up Back End Data Layer," and "Category Affinity" (not illustrated).

Figure 27B:
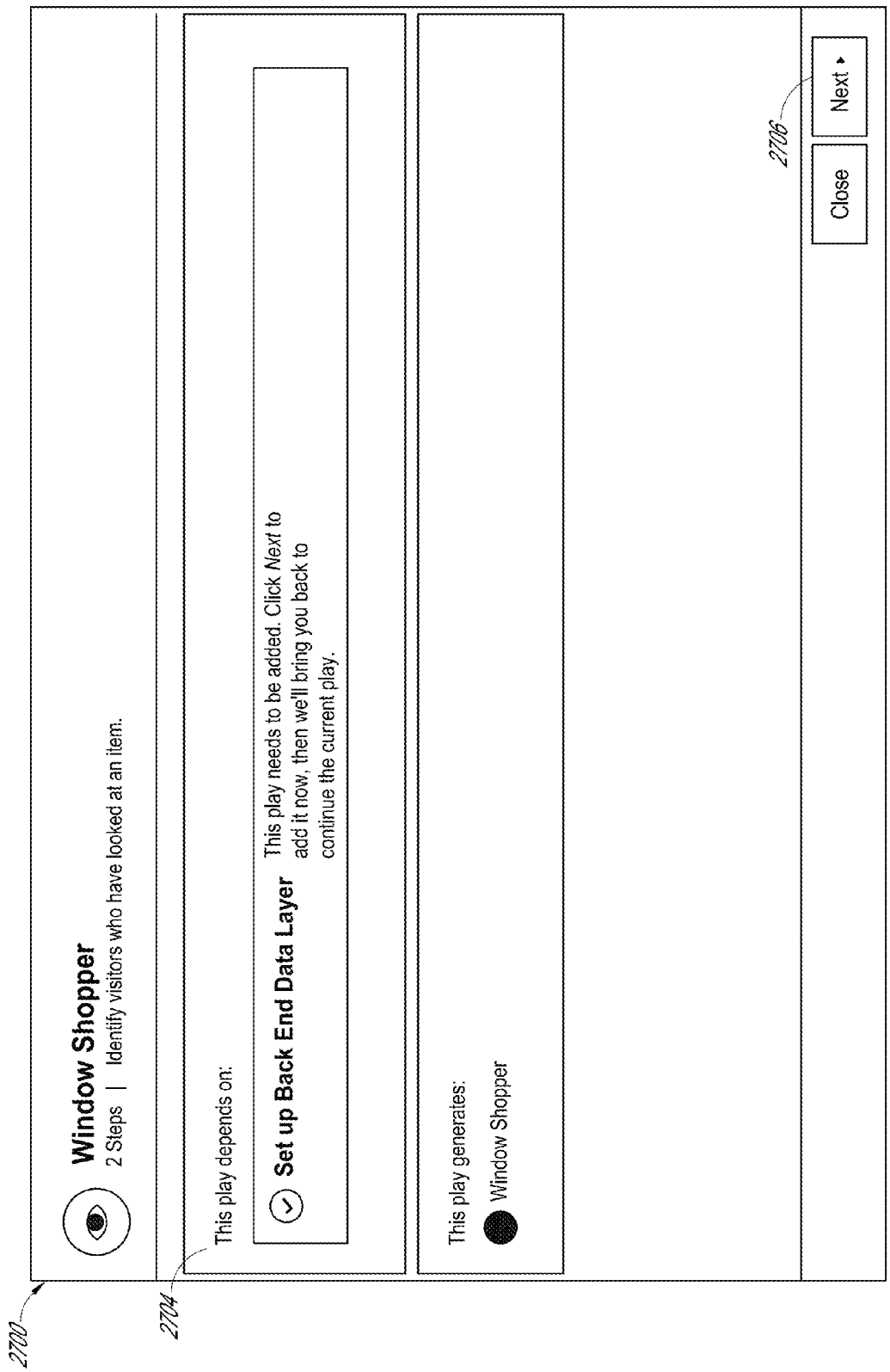

In FIG. 27B, the example user interface 2700 includes a notification area 2704 indicating that the "Set up Back End Data Layer" template is a prerequisite to completing the "Window Shopper" template. Accordingly, user selection of the next element 2706 causes the example user interface 2700 to progress through the "Set up Back End Data Layer" template seamlessly before permitting the user to complete the "Window Shopper" template.

FIGS. 27C and 27F depict additional example prompts and elements of a template user interface. In FIG. 27C, the example user interface 2700 includes one or more prompts and one or more corresponding input elements, which may be similar to the example user interface 2500 of FIGS. 25C through 25G. However, in contrast to the examples user interface 2500 of FIG. 25C, which had default options preselected, example user interface 2700 may not have preselected input options. Accordingly, in FIG. 27D, a user may select an option from the option selector 2708. Again, similar to the mappings specified in the example user interface 2500 of FIGS. 25C through 25G, the user input corresponding to the example user interface 2700 may specify the content site mappings to implement one or more templates. In this case, to implement the "Set up Back End Data Layer" template, the prompts of the user interface 2700 request user input corresponding to a product identifier, a product category, an order identifier, an order total, and an order customer identifier, that may be inputs to the template process for generating the outputs of the "Set up Back End Data Layer" or "Window Shopper" templates, as described herein. As described herein, the configuration details that a user may specify within the input elements of FIGS. 27C and 27D may correspond to portions of uniform resource identifiers, content pages, or a document object model for detecting end user interactions.

Figure 27E:
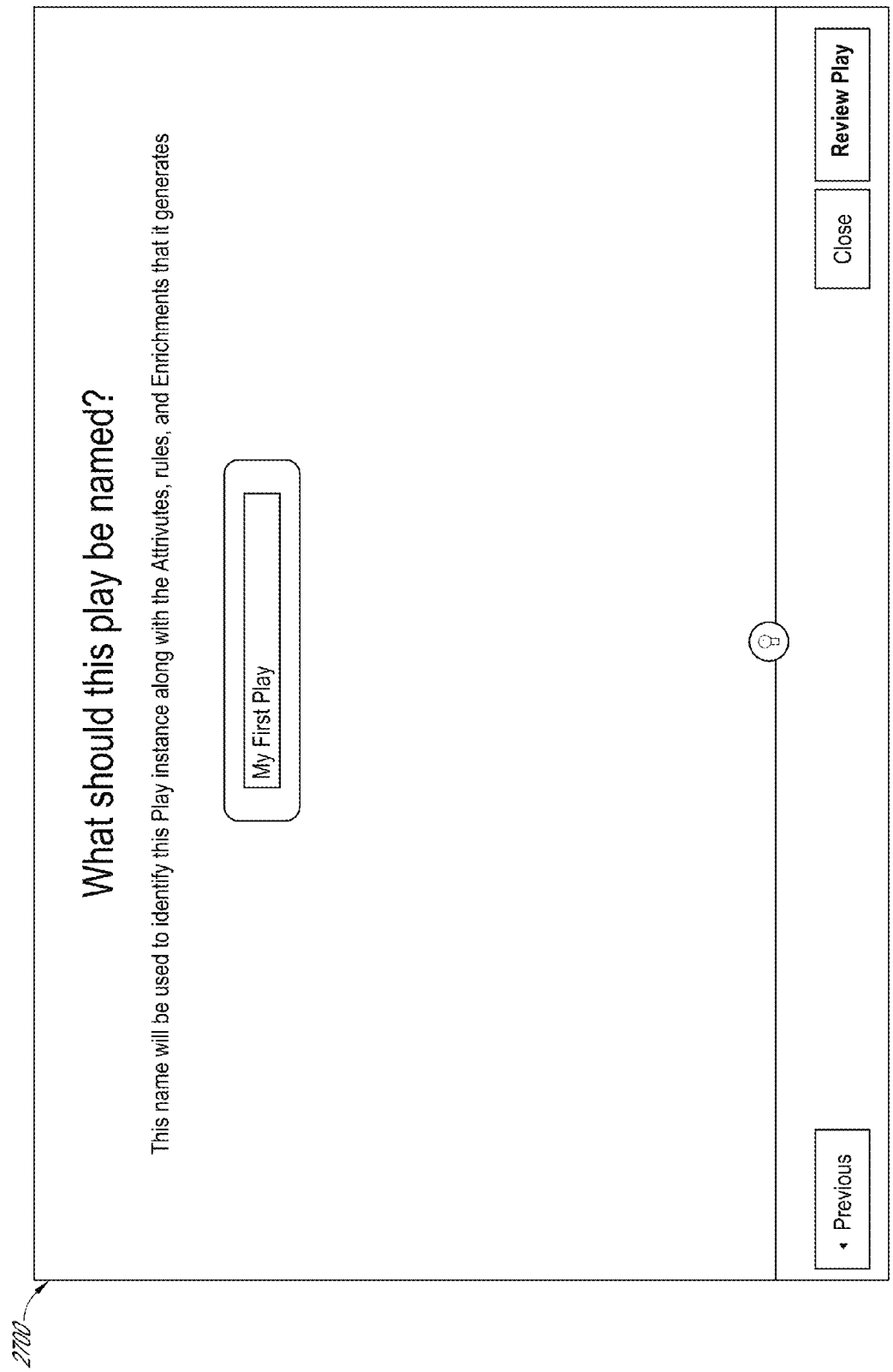

FIGS. 27E and 27F depict example prompts and elements to complete implementation of another template object, which may be similar to the elements of the example user interfaces 2500 of FIGS. 25H and 25I.

Figure 27G:
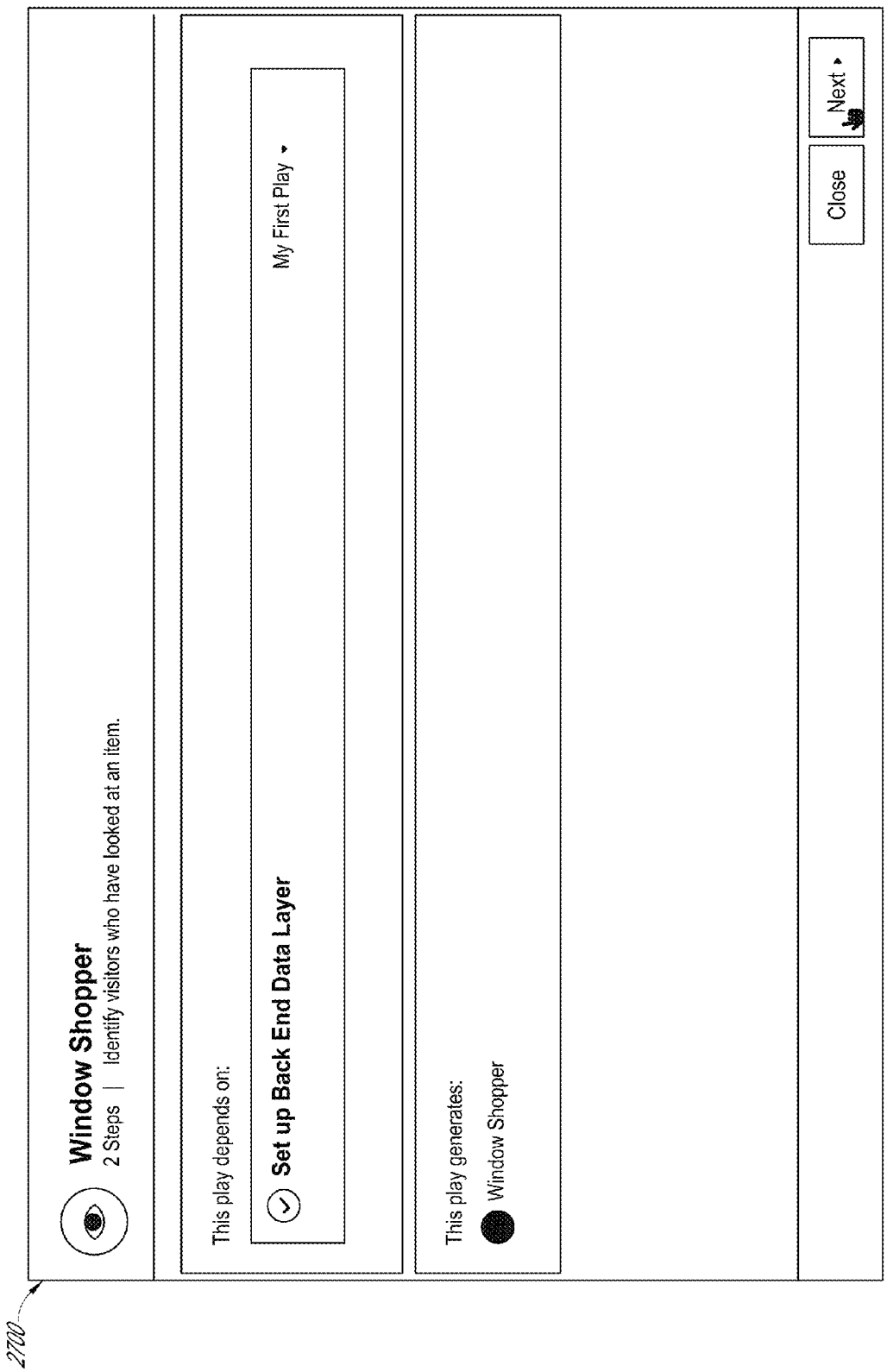
Figure 27H:
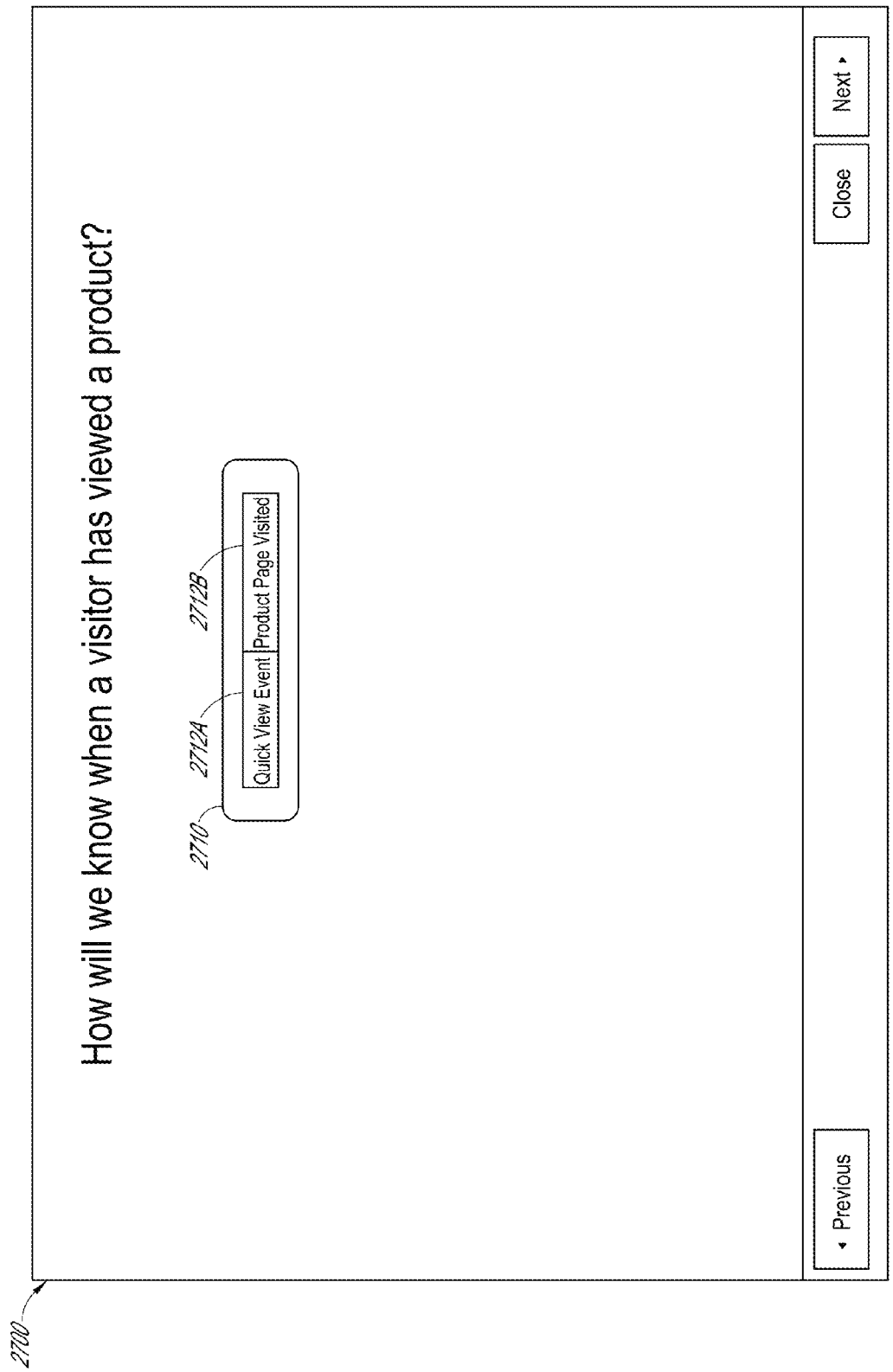
Figure 27I:
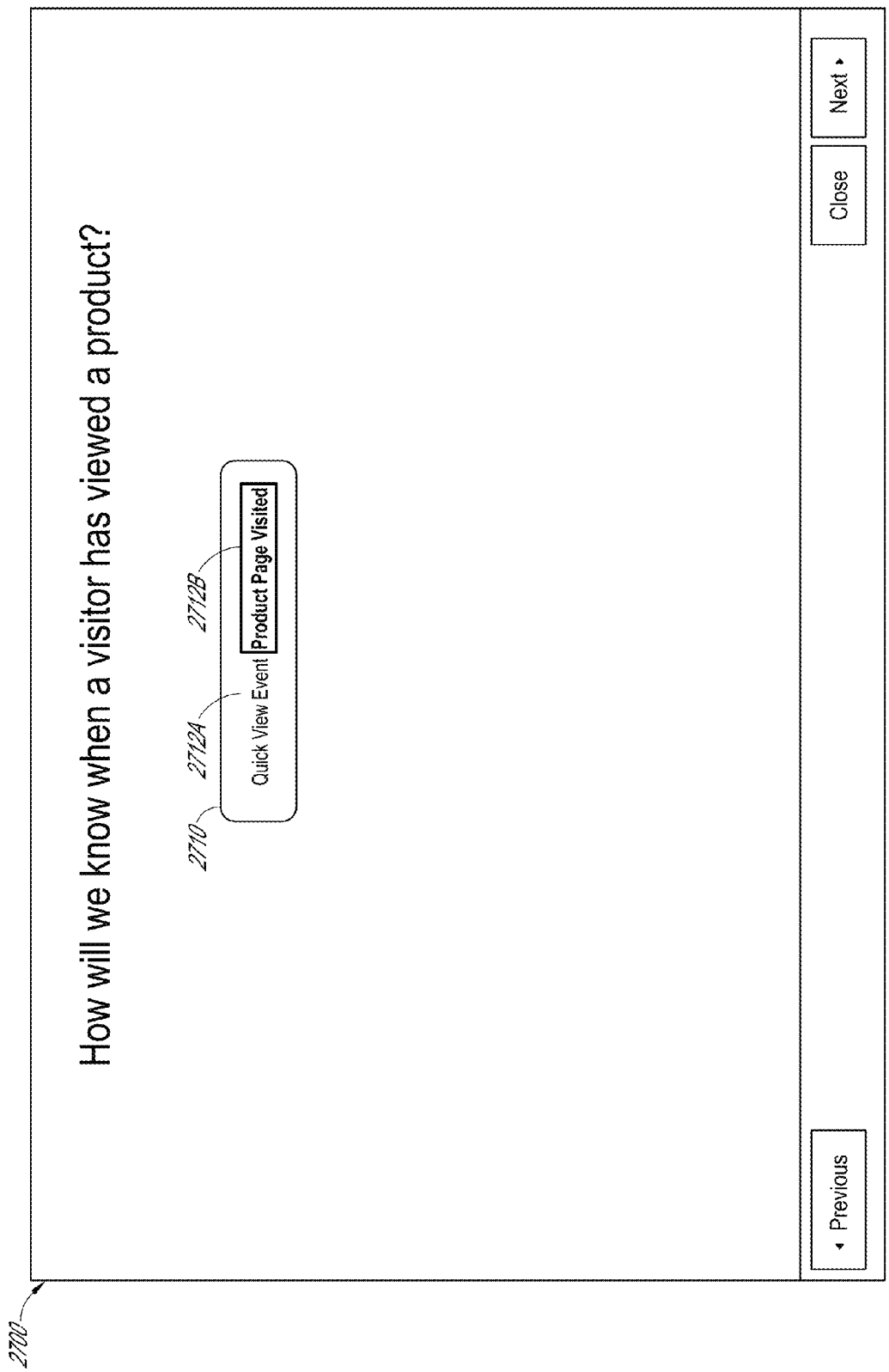
Figure 27J:
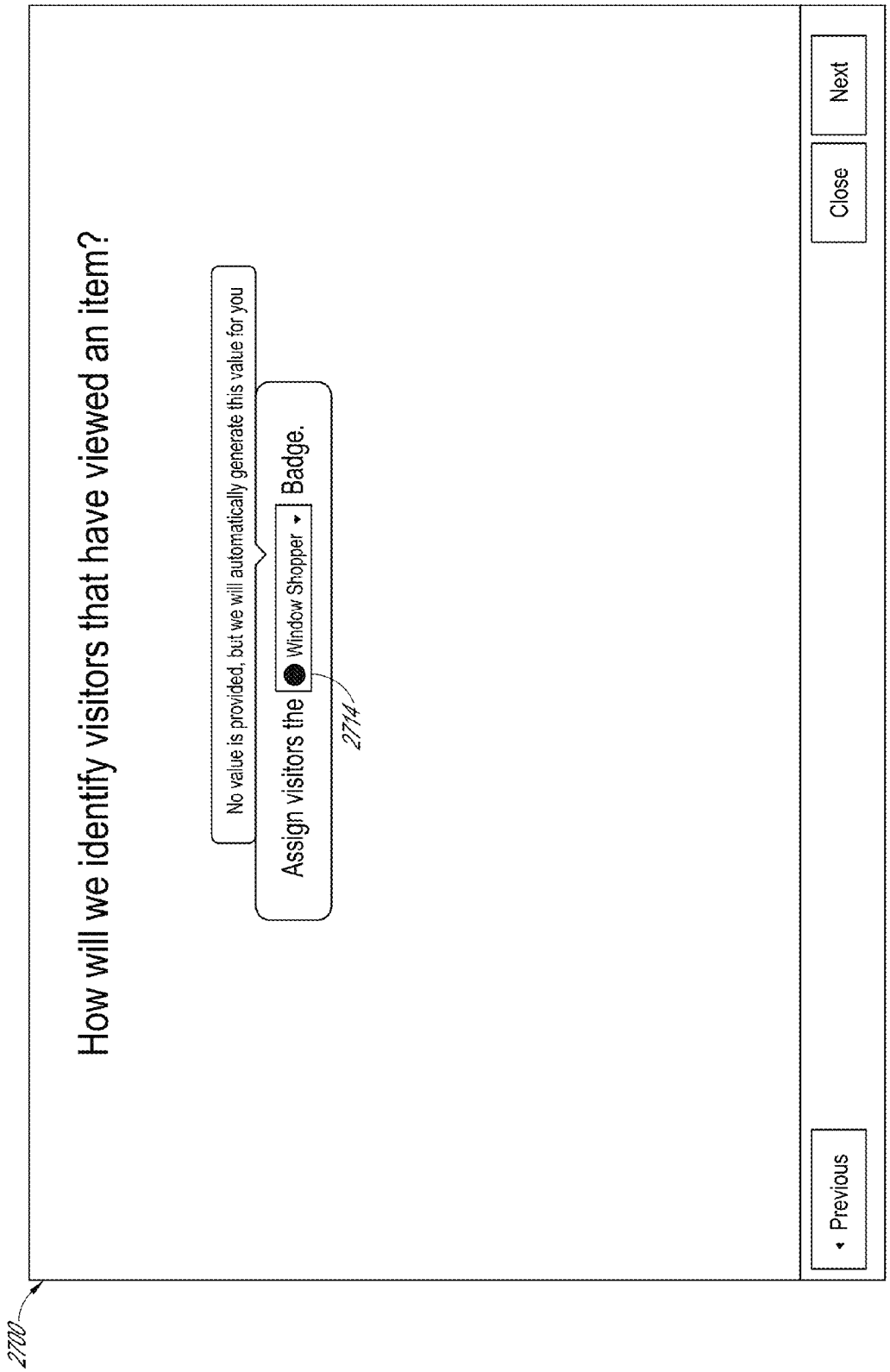
Figure 27K:
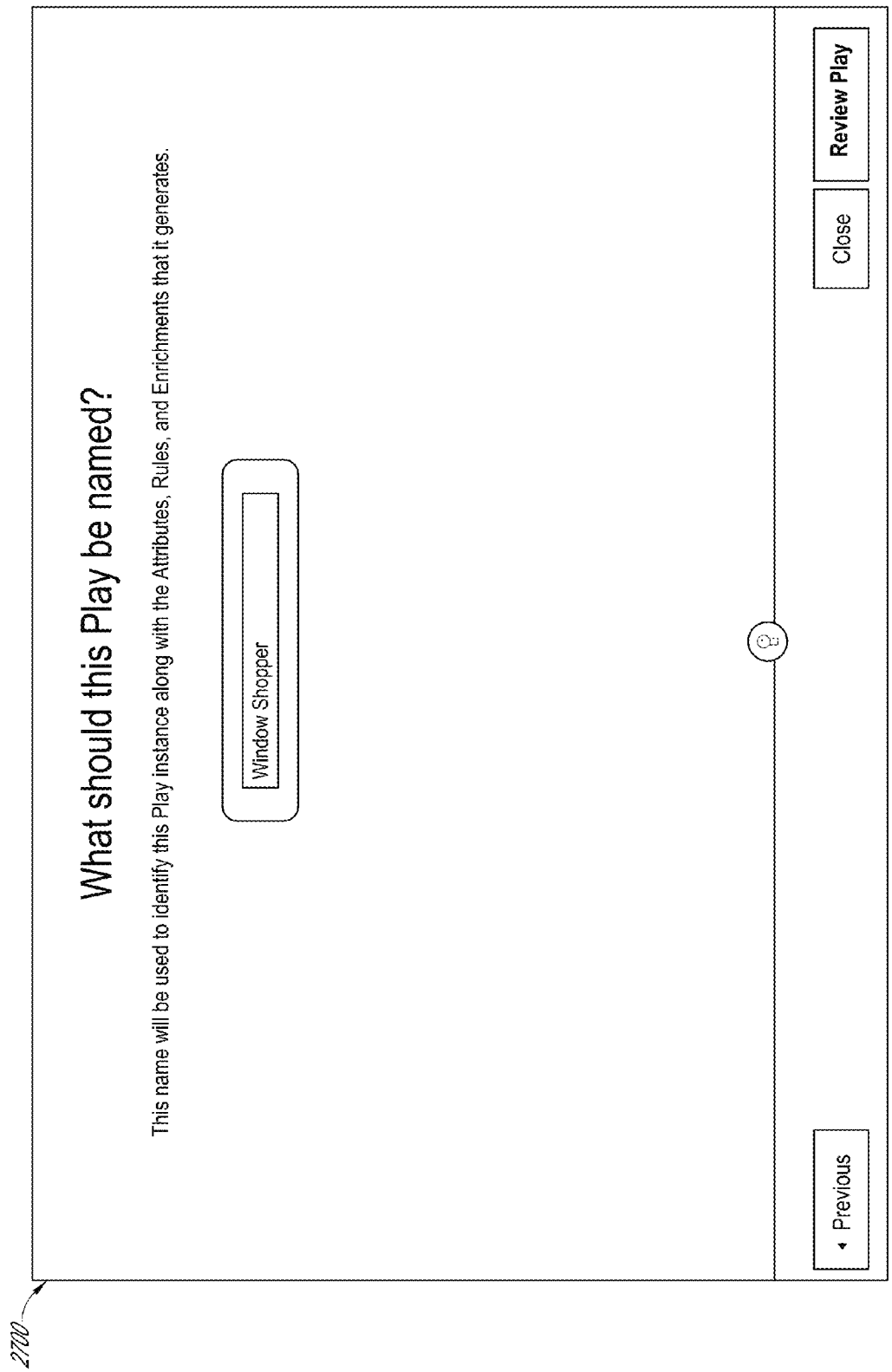
Figure 27M:
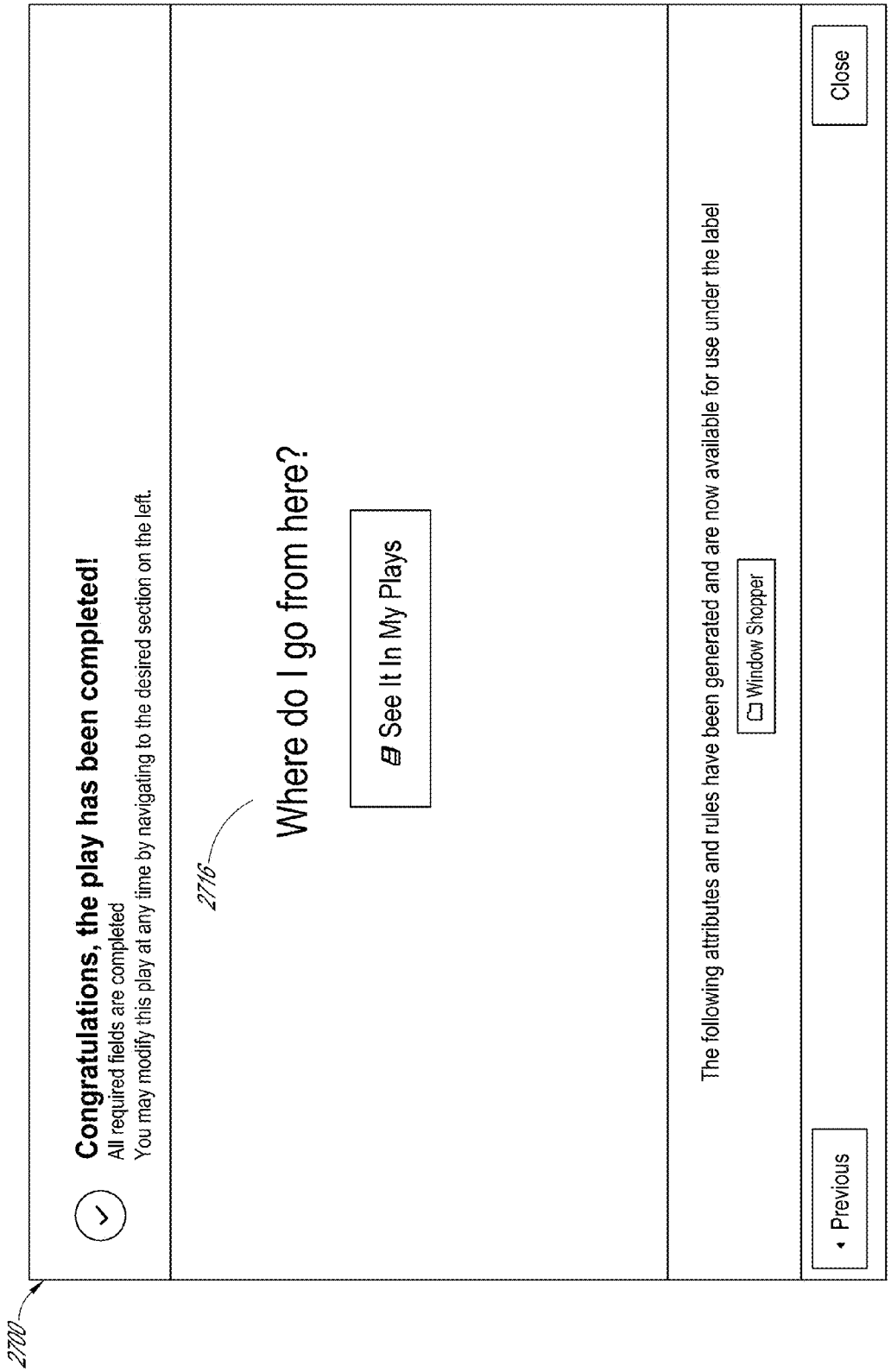

FIGS. 27G and 27M depict additional prompts and elements of a template user interface that may be presented following completion of a prerequisite template user interface. In FIG. 27G, the example user interface 2700 indicates that the "Set up Back End Data Layer" template process has been completed and user interfaces corresponding to the "Window Shopper" template will be presented. In FIG. 27H, the example user 2700 includes an attribute selector 2710 where the options for selection include options 2712A and 2712B. As depicted in FIG. 27I, the product page visited option 2712B has been selected instead of the quick view event 2712A. The options corresponding to element 2710 relate to the determination of when a visitor has viewed a product within the content site. For example, determination of a product page visit by the tag management system 140 may be based on the processing of interaction data indicating that a specific "product_page" has been requested by a user, in the alternative, a determination based on a quick view event may include a user expanding a product in a product page with multiple items.

In FIG. 27J, the example user interface 2700 includes a prompt for the configuration user to select a badge attribute to assign to a visitor and a corresponding user input element 2714. For example, in one embodiment, the tag management system 140 may generate an output attribute, such as the window shopper badge example here, which may be automatically assigned to end users of a content site when the conditions specified by the template object are satisfied.

FIGS. 27K and 27L depict example prompts and elements to complete implementation of another template object, which may be similar to the elements of the example user interfaces 2500 of FIGS. 25H and 25I. In FIG. 27M, example user interface 2700 includes an example notification area 2716 that indicates the configuration user has completed the template implementation process. The template user interfaces described herein may include a similar notification or completion page to the user interface 2700 of FIG. 27M.

Figure 28:
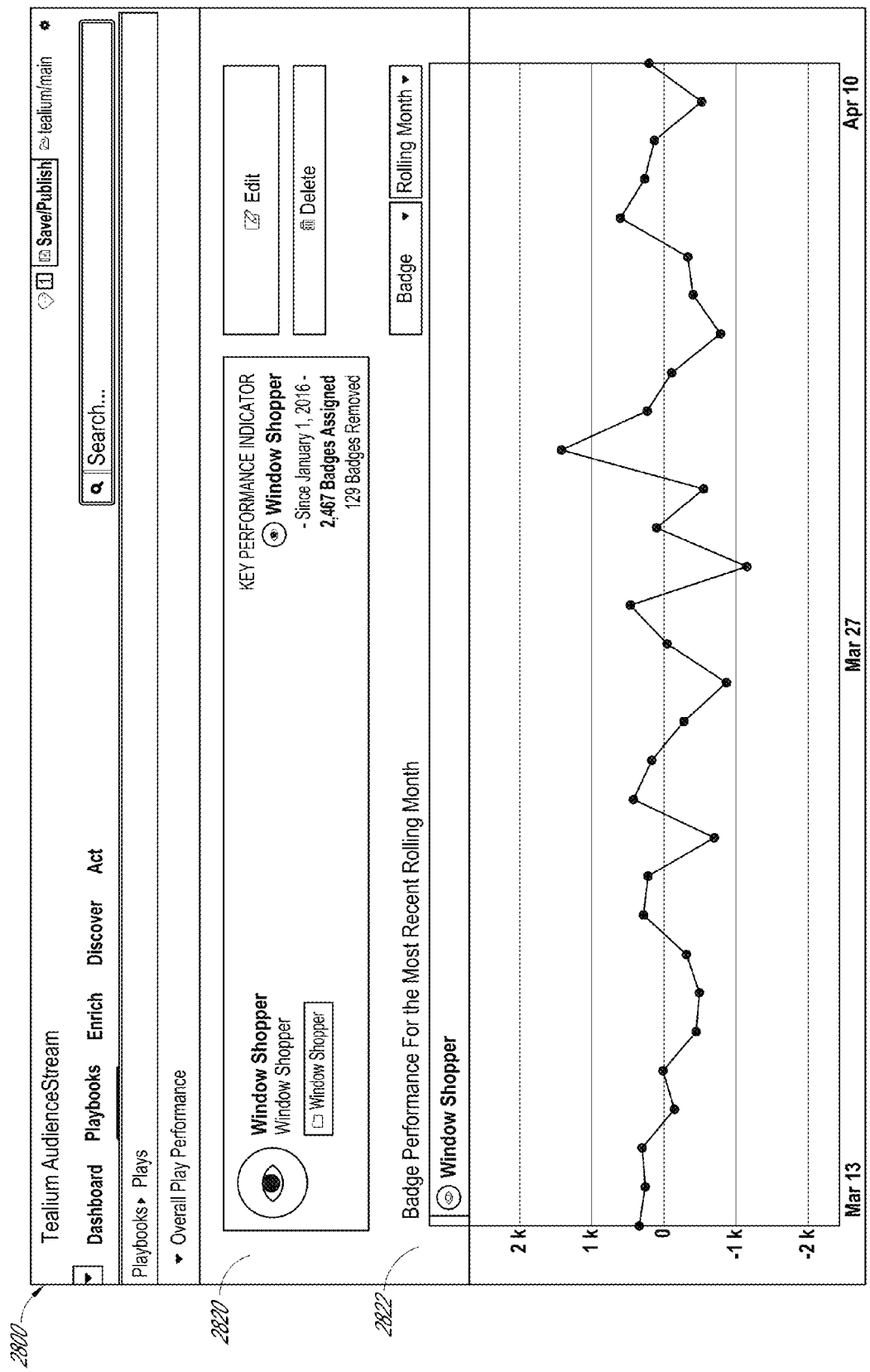
FIG. 28 depicts an example user interface to display implemented templates, tag management objects, or visualizations.

FIG. 28 depicts an example user interface to display implemented templates or tag management objects. The example user interface 2800 includes a template display area 2820. As illustrated, the template display area 2820 may include user interface controls for viewing, editing, or deleting an implemented template. The template display area 2820 may also include one or more visualizations that are automatically generated by completing a template process. For example, completion of the template process depicted in FIGS. 27A through 27M corresponding to a window shopper template may generate the visualization for viewing window shopper badge counts for a time period such as the most recent rolling month. As described herein, the template object may include instructions for generating one or more relevant visualizations corresponding to the output of a template object thereby reducing the configuration time of the tag management system or saving configuration time or effort by configuration users. Example visualizations also include bar graphs such as the graphs depicted in FIG. 21.

V. Example Tag Management Template Data Model

FIGS. 29 through 32 depict example template objects or template components that may be used by the tag management system 140. The template object 2900A-2900B of FIG. 29, the template attribute 3000 and the template operator 3050 of FIG. 30, the template rule 3100 and the transformation template 3150 of FIG. 31, or the template audience 3200 and the template collection 3250 of FIG. 32 may be in the same data format. The template attribute 3000 and the template operator 3050 of FIG. 30, the template rule 3100 and the transformation template 3150 of FIG. 31, or the template audience 3200 may be components of a template object, as described herein. An example data format is a JavaScript Object Notation (JSON) data format. The example template objects or template components may be stored in the template data source 162. As described herein, the tag management system 140 may use the template objects or template components to present the template user interfaces to implement the templates and to further configure the tag management system 140. The example template objects or template components are illustrative and may not be executable or implementable in the format shown.

Figure 29:
FIG. 29 depicts an example template object.

In FIG. 29, the example template object 2900A-2900B includes property-value pairs that can define a template user interface. For example, the example template object 2900A-2900B includes a template identifier 2902, an array of one or more prerequisite templates, a corresponding account or profile, a name, a description, an associated graphic or color, or any other customizable properties, which may configure the presentation of template user interfaces in the tag management system 140, such as any of the example user interfaces FIGS. 25A through 27M.

The example template object 2900A-2900B includes inputs 2912 and outputs 2914. The prompts of the example template object 2900A-2900B may generate mappings between the inputs 2912 and the outputs 2914. For example, the prompt 2916 includes text configured to be display to a configuration user and a body property 2918. The example body property 2918 may have the value "%% attributes.event_name %% contains %%% attributes.334fa162-5f85-45aa-a450-688e809eb8c/f%%%," which may correspond to a custom template syntax. In some embodiments, the custom template syntax specifies that read-only variables may be indicated by a special character such as "%%" and editable variables may be specified by another special character such as "%%%". In other embodiments, the special character such as "%%" may correspond to an editable value, but that may be editable with a warning. Accordingly, the value of the example body property 2918 configures a template user interface to present the read only attribute event_name (an input) and the configuration user is prompted to select user input for the attribute "334fa162-5f85-45aa-a450-688e809eb8cf". Thus, the example body property 2918 may correspond to a user interface 2500 that includes an example input element 2505 of FIG. 25D. As described herein, identifiers of template objects or components may reference respective template objects or components that may be defined in separate objects. The example template object 2900A-2900B includes version and revision property-value pairs 2922 and a publish status 2924 for distribution to different tag management systems. Example status values for the publish status 2924 includes IN_PROGRESS, READY_FOR_PUBLISH, PUBLISHED, READY_FOR_UNPUBLISH, OUTDATED_IN_PROGRESS, OUTDATED_READY_FOR_PUBLISH, OUTDATED_PUBLISHED, or OUTDATED_READY_FOR_UNPUBLISH.

Example identifiers of template objects or components may include a string or Globally Unique Identifier ("GUID"). The strings "334fa162-5f85-45aa-a450-688e809eb8cf" or "event_name" are examples of valid identifiers. In some embodiments, identifiers may not be guaranteed to be unique, however, the chances of a repeating unique identifier may be extremely low and/or negligible due to their implementation. For example, a unique identifier may be generated from random or pseudorandom numbers with 122 random bits such that the total number of unique identifiers is $2^{122}$. Thus, the unique identifiers are so large that the probability of the same number being generated randomly and/or pseudo-randomly twice is negligible. In some embodiments, shorter and/or longer identifiers may be used.

The tag management system 140 may determine prerequisites for templates. For example, the template object 2900A-2900B ("Identify Outdoor Shopper") includes the input 2912 that specifies an attribute input of "event_name". The event_name attribute may be output of another template, "Set up Back End Data Layer," for example. Thus, the "Set up Back End Data Layer" template may be a prerequisite for the "Identify Outdoor Shopper". Accordingly, the tag management system 140 may determine prerequisites of template objects, or prerequisites of prerequisites, etc., using the identifiers. Additionally or alternatively, the template object 2900A-2900B may include a prerequisites property-value pair attribute 2904, which may optionally explicitly identify prerequisite templates. The example prerequisites attribute 2904 is a list or array containing identifiers identifying other template objects. In some embodiments, the prerequisites attribute 2904 may be for convenience of walking a configuration user through a work flow. In other embodiments, a process for determining prerequisites may rely on the prerequisites attribute 2904 instead of using identifiers for individual template components. Generally, aspects of template objects may facilitate efficient configuration tag management systems. For example, a first template object may be curated by an administrator or analyst to identify the base configurations for additional second template objects such that the first template object is a prerequisite for the second template objects.

In FIG. 30, the example template attribute 3000 includes property-value pairs that can define an attribute. The example template attribute 3000 is a VIP badge, which may be input or output of a template object. For example, the template object may include instructions configured to assign end users to the VIP badge attribute 3000. The example template operator 3050 includes property-value pairs that can define an operator that may be used by a template object. Example operator functions include exists, contains, equals, equals ignore case, or contains ignore case, or between.

In FIG. 31, the example template rule 3100 includes property-value pairs that can define a rule; the example transformation template 3150 includes property-value pairs that can define a transformation. The example template rule 3100 or the example transformation template 3150 can include sets of instructions. The example transformation template 3150 includes an identifier, which may correspond to the value of the transformation identifier 2906 of the template object 2900A-2900B. Thus, the transformation may be configured by implementation of the template object 2900A-2900B. For example, the transformation sets the target attribute (53ab5740-3482-4b74-b907-ad59949e5df6) to the value attribute (24550880-7568-4172-84d8-e7ce9014b930), both of which may be components of the template object 2900A-2900B.

The transformation template 3150 includes one or more rule identifiers that refer to one or more rules. When the one or more rules are satisfied the transformation template 3150 may be configured to cause a transformation via instruction sets. In this example, the transformation template 3150 is configured to set an end user trait to complete_visit when one or more conditions of the sets of instructions are satisfied. The example transformation template 3150 refers to the template rule 3100 (identifier fd2f3db8-2e58-4b11-b025-ca892ec19275). The transformation template 3150 includes the conditions component 3102 that specifies an operator such as "contains". The "contains" operator may be a known operation of the tag management system 140. Alternatively, the value of an operator may be an identifier, such as the identifier "a63e2e86-eb9b-4471-ba46-e2353efa4e12" of the example template operator 3050 of FIG. 30. Accordingly, template operators may be customized. Continuing with the example, the conditions component 3102 specifies an instruction set to apply the operator (contains) to first and second operands (again, which may be components of the template object 2900A-2900B). The instruction set may determine whether the first operand (event_name) contains the value of the attribute (334fa162-5f85-45aa-a450-688e809eb8cf) that was specified by the user completing the template process. For example, where event_name contains "log_out" (which is the value specified by the configuration user) the instruction set may return true, which may then trigger the rule corresponding to template rule 3150 to set the shopper trait to complete_visit. In some embodiments, example instruction sets may include one or more operands. An example instruction set for three or more operands include a "between" operation that may check for a first variable being between second and third operands. Other example instructions sets include complex logic such as ((A=B) OR (C=D)) AND (E contains I)). An example instruction set for one operand includes an operation for the "exists" operator.

Another example instruction set includes frequent home page visitor logic. For example, the home page configuration, which indicates when a user accesses the particular home page of a content site, can be used by additional template objects that include instruction set logic. The instruction set logic can use, for example, the "exists" operator to identify instances of home page visits by a user from the home page configuration that serves as the basis for determining a frequent home page visitor badge. For example, the frequent home page visitor logic can assign the frequent home page visitor badge when the number of home page visits for a particular users exceeds a threshold. In some embodiments, the frequent home page visitor logic further uses a time period, such as number of visits within a one month, two month, or one year time period.

In FIG. 32, the example template audience 3200 includes property-value pairs that can define an audience. An audience may be a collection of end user or visitor attributes. The tag management system 140 may take actions on the audience to track end users or perform data analytics on those end users, as described herein.

The example template collection summary 3250 may specify a collection of components or templates. The template collection summary 3250 may be used by the tag management system 140 for presentation of groups of templates to configuration users. In some embodiments, a template collection may be a logical grouping of related templates such as templates for configuring back end data or identifying various related-attributes of end users. As used herein, a collection of templates may also be referred to as a "playbook."

VI. Example Implementation Mechanisms

Figure 33:
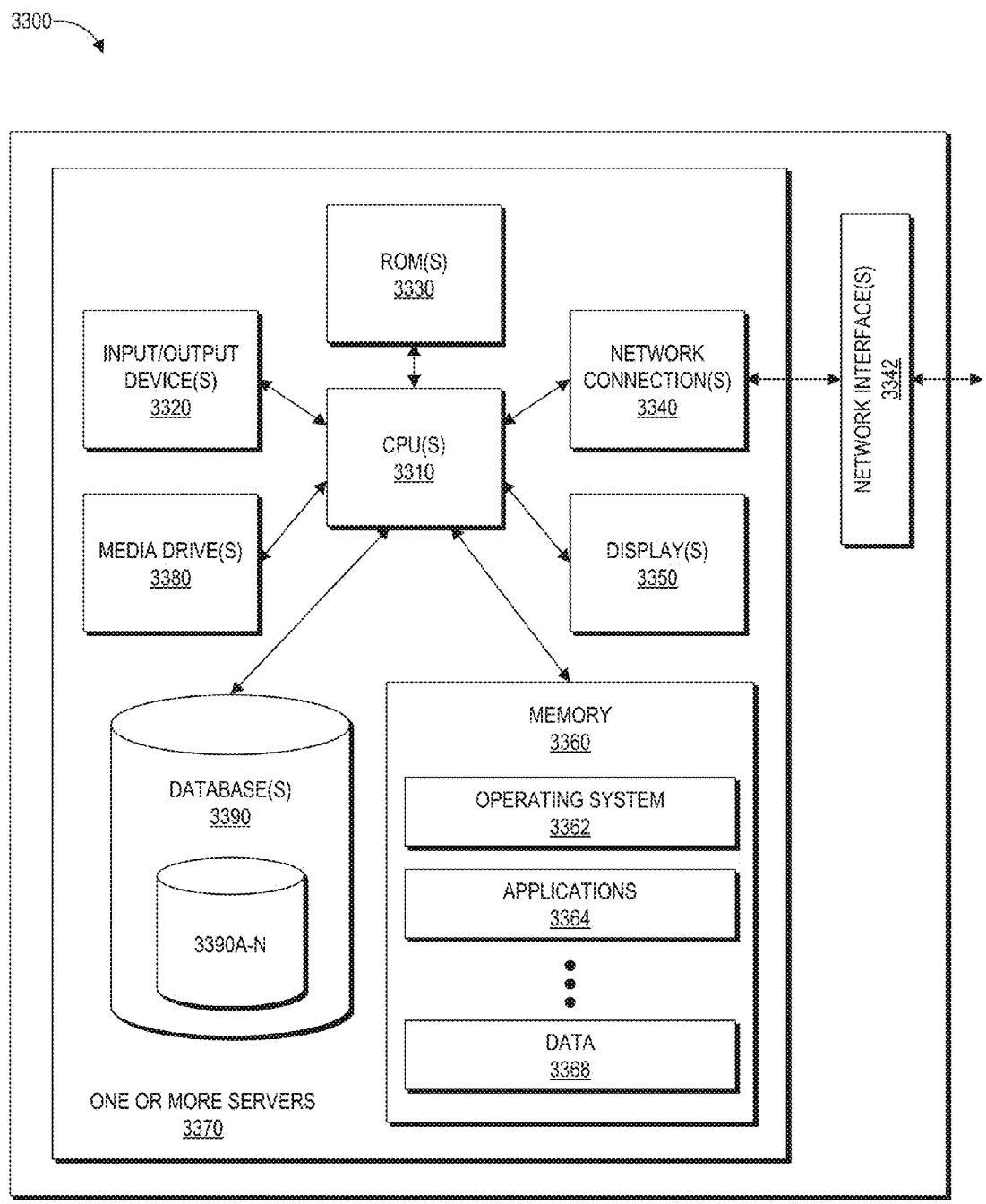
FIG. 33 illustrates an analytics system configuration on which may be implemented various embodiments of systems and methods in accordance with the disclosure.

FIG. 33 illustrates a computer system 3300 usable to implement one or more of the systems (for instance, the end user system 102, the tag management user system 104, analytics system 130, or the tag management system 140) or servers (for instance, the site server 110 or tag server 120) within the computing environment 100 of FIG. 1.

As shown in FIG. 33, system 3300 can include (i) one or more hardware processors (CPUs) 3310, (ii) an input/output device(s) 3320 configured to allow users to input and output information and interact with the system 3300 as well as transfer and receive data, (iii) one or more read only memory (ROMs) devices 3330 or equivalents to provide nonvolatile storage of data or programs, (iv) one or more displays 3350 such as a computer monitor or other display device, (v) one or more network connections 3340 and associated network interfaces 3342 configured to allow the system 3300 to connect to other systems, servers or portable devices, as well as one or more memory spaces 3360 and one or more databases 3390. Database(s) 3390 may be further divided or distributed as one or more sub-databases 3390a-3390n, with the sub-databases storing feature or function specific information associated with a particular feature or function. The various components shown in FIG. 33 may be incorporated in one or more physical servers 3370. It is noted that the various components shown in FIG. 33, including database 3390, are typically included as part of server(s) 3370, however, they may be external to server(s) 3370 in some embodiments. For example, database(s) 3390 may be external to server(s) 3370 and may be part of a separate database server system or networked database system. In some instances, the system may not be a server but rather a computing device like a desktop computer or mobile device.

One or more memory spaces 3360 may comprise DRAM, SRAM, FLASH, hard disk drives or other memory storage devices, such as media drives 3380, configured to store operating systems 3362, application programs or data 3364, and one or more memory spaces 3360 may be shared with, distributed with or overlap with the memory storage capacity of database 3390. In some embodiments, one or more memory spaces 3360 may include database 3390 or in some embodiments database 3390 may include data 3368 as shown in memory space 3360. Data stored in memory space 3360 or database 3390 may include information, such as tag management system information or other types of data described herein.

VII. Additional Embodiments and Terminology

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines or computing systems that can function together.

In some embodiments, one or more parts of or all of the analytics system 130 or tag sever 120 can be implemented in a distributed cloud platform that provides redundant or geographically dispersed access. Although not illustrated herein, one such example implementation is described and illustrated with respect to FIG. 25 of U.S. Pat. No. 8,805, 946, titled "SYSTEM AND METHOD FOR COMBINING CONTENT SITE VISITOR PROFILES," which was previously incorporated by reference herein in its entirety.

Although the network 108 is shown as one connected network, the network 108 can be subdivided into one or more separate networks which may not directly communicate with one another. For example, the analytics system 130 can communicate with the tag management user system 104 via a separate and different network from the network that the tag server 120 uses to communicate with the end user system 102.

While the present disclosure includes examples for an electronic commerce site, the systems and methods described herein may be used for any content site, such as a social network site, for example.

The various illustrative logical blocks, modules, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, combinations of the same, or the like. A hardware processor can include electrical circuitry or digital logic circuitry configured to process computer-executable instructions. In another embodiment, a processor includes an FPGA or other programmable device that performs logic operations without processing computer-executable instructions. A processor can also be implemented as a combination of computing devices, e.g., a combination of a DSP and a microprocessor, a plurality of microprocessors, one or more microprocessors in conjunction with a DSP core, or any other such configuration. A computing environment can include any type of computer system, including, but not limited to, a computer system based on a microprocessor, a mainframe computer, a digital signal processor, a portable computing device, a device controller, or a computational engine within an appliance, to name a few.

The steps of a method, process, or algorithm described in connection with the embodiments disclosed herein can be embodied directly in hardware, in a software module stored in one or more memory devices and executed by one or more processors, or in a combination of the two. A software module can reside in RAM memory, flash memory, ROM memory, EPROM memory, EEPROM memory, registers, hard disk, a removable disk, a CD-ROM, or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements or states. Thus, such conditional language is not generally intended to imply that features, elements or states are in any way required for one or more embodiments or that one or more embodiments necessarily include logic for deciding, with or without author input or prompting, whether these features, elements or states are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. Further, the term "each," as used herein, in addition to having its ordinary meaning, can mean any subset of a set of elements to which the term "each" is applied.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, certain embodiments described herein can be embodied within a form that does not provide all of the features and benefits set forth herein, as some features can be used or practiced separately from others.

What is claimed is:

1. A system to automatically configure tags to track end user interactions in a computer data network, the system comprising:

non-transitory physical computer storage; and
a hardware processor configured to:
> access a first template object, the first template object comprising a prompt and a first identifier indicative of a home page attribute, the home page attribute being associated with a tag object capable of gathering first interaction data indicative of first end user interactions with a first content page;
> present the prompt in a user interface, the prompt comprising textual information requesting user input for the home page attribute;
> receive, via the user interface, user input comprising a first value for the home page attribute;
> generate a home page configuration from a property of the home page attribute and the first value;
> store the home page configuration in the non-transitory physical computer storage;
> determine that a second template object comprises the first identifier that is indicative of the first template object being a prerequisite for the second template object and the home page configuration being an input for the second template object, the second template object comprising second data indicative of an instruction set, the instruction set comprising an exists operator and a first operand comprising the first identifier;
> determine, using the first identifier, a second value for the first operand, the second value corresponding to the first value for the home page attribute;
> determine, using the instruction set, that the exists operator is satisfied by the value for the first operand that indicates a home page visit;
> in response to determining that the operator is satisfied, generate second interaction data by assigning a trait to the first interaction data, wherein the trait indicates a frequent home page visitor; and
> transmit the second interaction data.

2. The system of claim 1, wherein the first template object further comprises a first input, the first input comprising a second identifier, and wherein the hardware processor is configured to:
> determine that the second identifier corresponds to a second attribute;
> determine that a data value of the second attribute is unassigned;
> access a third template object, wherein an output of the third template object is the second attribute; and
> in response to determining that the data value of the second attribute is unassigned, present, in the user interface, a workflow as defined by the third template object, wherein the workflow includes a second prompt for user input to assign the data value of the second attribute.

3. The system of claim 1, wherein the first template object further comprises a first input, the first input comprising a second identifier, and wherein the hardware processor is configured to:
> determine that the second identifier corresponds to a second attribute;
> determine that a data value of the second attribute is assigned;
> access a pre-existing value for the data value of the second attribute; and
> in response to determining that the data value of the second attribute is assigned, present, in the user interface, the pre-existing value.

4. The system of claim 1, wherein the first template object further comprises a first input, the first input comprising a second identifier and a third identifier, and wherein the hardware processor is configured to:
> determine that the second identifier corresponds to a second attribute and a second template attribute;
> determine that a second data value of the second attribute is assigned;
> determine that the third identifier corresponds to a third template attribute;
> determine that a third data value of the third template attribute is unassigned;
> in response to determining that the second data value of the second attribute is assigned and that the third data value of the third attribute is unassigned, determine a subset of user interface elements from the first template object, wherein the subset of user interface elements includes a first user input element corresponding to the third template attribute, and wherein a second user input element corresponding to the second template attribute is not present in the subset of user interface elements; and
> present, in the user interface, the subset of user interface elements.

5. The system of claim 1, wherein the second template object further comprises third data indicative of a recipient, and wherein transmitting the second interaction data comprises transmitting the second interaction data to the recipient.

6. The system of claim 1, wherein the home page configuration corresponds to a portion of a uniform resource locator, and wherein the data value comprises a textual string for the portion of the uniform resource locator.

7. Non-transitory physical computer storage comprising instructions stored thereon that, when executed by a hardware processor, are configured to implement a process comprising:
> accessing a first template object, the first template object comprising a prompt and a first identifier indicative of a first template attribute, the first template attribute being associated with a tag object capable of gathering first interaction data indicative of first end user interactions with a first content page;
> presenting the prompt in a user interface, the prompt comprising textual information requesting user input for the first template attribute;
> receiving, via the user interface, user input comprising a data value for the first template attribute;
> generating a first attribute from a property of the first template attribute and the data value;
> storing the first attribute in non-transitory physical computer storage;
> determining that a second template object comprises the first identifier that is indicative of the first template object being a prerequisite for the second template object and the first attribute being an input for the second template object, the second template object comprising second data indicative of an instruction set, the instruction set comprising an operator, a first operand, and a second operand, the second operand comprising the first identifier;
> determining, using the first identifier, a value for the second operand, the value for the second operand corresponding to the data value for the first template attribute;

determining, using the instruction set, that the operator is satisfied by the first operand and the value for the second operand; and in response to determining that the operator is satisfied, generating second interaction data by assigning a trait to the first interaction data, wherein the trait indicates behavior of the first end user interactions with the first content page.

8. The non-transitory physical computer storage of claim 7, wherein the first template object further comprises a first input, the first input comprising a second identifier, and wherein the process further comprises:

determining that the second identifier corresponds to a second attribute;

determining that a data value of the second attribute is unassigned;

accessing a third template object, wherein an output of the third template object is the second attribute; and in response to determining that the data value of the second attribute is unassigned, presenting, in the user interface, a workflow as defined by the third template object, wherein the workflow includes a second prompt for user input to assign the data value of the second attribute.

9. The non-transitory physical computer storage of claim 7, wherein the first template object further comprises a first input, the first input comprising a second identifier, and wherein the process further comprises:

determining that the second identifier corresponds to a second attribute;

determining that a data value of the second attribute is assigned;

accessing a pre-existing value for the data value of the second attribute; and in response to determining that the data value of the second attribute is assigned, presenting, in the user interface, the pre-existing value.

10. The non-transitory physical computer storage of claim 7, wherein the first template object further comprises a first input, the first input comprising a second identifier and a third identifier, and wherein the process further comprises:

determining that the second identifier corresponds to a second attribute and a second template attribute;

determining that a second data value of the second attribute is assigned;

determining that the third identifier corresponds to a third template attribute;

determining that a third data value of the third template attribute is unassigned;

in response to determining that the second data value of the second attribute is assigned and that the third data value of the third attribute is unassigned, determining a subset of user interface elements from the first template object, wherein the subset of user interface elements includes a first user input element corresponding to the third template attribute, and wherein a second user input element corresponding to the second template attribute is not present in the subset of user interface elements; and presenting, in the user interface, the subset of user interface elements.

11. The non-transitory physical computer storage of claim 7, wherein the first template object further comprises first data indicative of a recipient, and wherein the process further comprises:

transmitting the first interaction data to the recipient.

12. The non-transitory physical computer storage of claim 7, wherein the first template object further comprises instructions that configure a visual presentation of the prompt in the user interface.

13. The non-transitory physical computer storage of claim 7, wherein the process further comprises retrieving the first template object from second non-transitory physical computer storage.

14. A system comprising:

non-transitory physical computer storage; and a hardware processor configured to:

access a first template object, the first template object comprising a prompt and a first identifier indicative of a first template attribute, the first template attribute being associated with a tag object capable of gathering first interaction data indicative of first end user interactions with a first content page;

present the prompt in a user interface, the prompt comprising textual information requesting user input for the first template attribute;

receive, via the user interface, user input comprising a data value for the first template attribute;

generate a first attribute from a property of the first template attribute and the data value;

store the first attribute in the non-transitory physical computer storage;

determine that the first template object is a prerequisite for a second template object, the second template object comprising second data indicative of an instruction set, the instruction set comprising an operator, a first operand, and a second operand, the second operand comprising the first identifier;

determine, using the first identifier, a second value for the second operand, the second value corresponding to the first value for the first template attribute;

determine, using the instruction set, that the operator is satisfied by the first operand and the second value for the second operand; and in response to determining that the operator is satisfied, generate second interaction data by assigning a trait to the first interaction data, wherein the trait indicates behavior of the first end user interactions with the first content page.

15. The system of claim 14, wherein the first template object further comprises an input, the input comprising a second identifier, and wherein the hardware processor is configured to:

determine that the second identifier corresponds to a second attribute;

determine that a data value of the second attribute is unassigned;

access a third template object, wherein an output of the third template object is the second attribute; and in response to determining that the data value of the second attribute is unassigned, present, in the user interface, a workflow as defined by the third template object, wherein the workflow includes a second prompt for user input to assign the data value of the second attribute.

16. The system of claim 14, wherein the first template object further comprises an input, the input comprising a second identifier, and wherein the hardware processor is configured to:

determine that the second identifier corresponds to a second attribute;

determine that a data value of the second attribute is assigned;

access a pre-existing value for the data value of the second attribute; and in response to determining that the data value of the second attribute is assigned, present, in the user interface, the pre-existing value.

17. The system of claim 14, wherein the first template object further comprises an input, the input comprising a second identifier and a third identifier, and wherein the hardware processor is configured to:

determine that the second identifier corresponds to a second attribute and a second template attribute;

determine that a second data value of the second attribute is assigned;

determine that the third identifier corresponds to a third template attribute;

determine that a third data value of the third template attribute is unassigned;

in response to determining that the second data value of the second attribute is assigned and that the third data value of the third attribute is unassigned, determine a subset of user interface elements from the first template object, wherein the subset of user interface elements includes a first user input element corresponding to the third template attribute, and wherein a second user input element corresponding to the second template attribute is not present in the subset of user interface elements; and present, in the user interface, the subset of user interface elements.

18. The system of claim 14, wherein the first template object further comprises first data indicative of a recipient, and wherein the hardware processor is configured to:

transmit the first interaction data to the recipient.

19. The system of claim 14, wherein determining the prerequisite for the second template object further comprises:

determining that the second template object comprises the first identifier; and identifying, from a plurality of template objects, the first template object as also comprising the first identifier.

20. The system of claim 14, wherein the first template object further comprises instructions that configure a visual presentation of the prompt in the user interface.

* * * * *